United States Patent
Kuramoto et al.

(10) Patent No.: US 7,818,354 B2
(45) Date of Patent: Oct. 19, 2010

(54) CONTENT REPRODUCTION APPARATUS, CONTENT REPRODUCTION METHOD, AND PROGRAM

(75) Inventors: Shin Kuramoto, Tochigi (JP); Takanao Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 11/436,758

(22) Filed: May 19, 2006

(65) Prior Publication Data
US 2007/0005164 A1    Jan. 4, 2007

(30) Foreign Application Priority Data
May 20, 2005 (JP) .............................. 2005-147546

(51) Int. Cl.
G06F 17/30    (2006.01)
(52) U.S. Cl. ........................................ 707/830; 700/94
(58) Field of Classification Search ................. 707/204, 707/1, 830; 705/51; 725/46; 700/94
See application file for complete search history.

(56) References Cited

U.S. PATENT DOCUMENTS

| 6,356,914 | B1 * | 3/2002 | deCarmo et al. | 707/104.1 |
| 2002/0099661 | A1 * | 7/2002 | Kii et al. | 705/51 |
| 2003/0159145 | A1 * | 8/2003 | Kaltz | 725/46 |
| 2003/0187654 | A1 * | 10/2003 | Hoshino | 704/270 |
| 2006/0200769 | A1 * | 9/2006 | Chevallier et al. | 715/727 |

FOREIGN PATENT DOCUMENTS

| JP | 11-265566 | 9/1999 |
| JP | 2001-265795 | 9/2001 |
| JP | 2003-123448 | 4/2003 |

* cited by examiner

Primary Examiner—James Trujillo
Assistant Examiner—Amresh Singh
(74) Attorney, Agent, or Firm—Finnegan, Henderson, Farabow, Garrett & Dunner, L.L.P.

(57) ABSTRACT

The present invention is intended to provide a content reproduction apparatus for accessing desired content with a simple user operation. The content reproduction apparatus has a flash memory for storing content, a flash memory reader, a CODEC, an amplifier, and headphones for reproducing this content, a microcomputer system for controlling these components. The microcomputer reproduces group identification information for identifying each of content groups and detects key operations during the reproduction of group identification information, thereby reproducing other group identification information.

17 Claims, 28 Drawing Sheets

FIG. 4

| FILE NAME | MUSIC TITLE (THIRD LAYER) | GENRE 1 (FIRST LAYER) | GENRE 2 (SECOND LAYER) | AGE | ARTIST | "BRIDGE" ADDRESS |
|---|---|---|---|---|---|---|

FIG. 5

| 1000 | MAIN STATION 1 NAVIGATION |
|---|---|
| 1001 | SUB STATION 1 NAVIGATION |
| 1002 | FIRST MUSIC TITLE (M1 · S1) |

⋮

| 100F | 14TH MUSIC TITLE (M1 · S1) |
|---|---|
| 1010 | |
| 1011 | SUB STATION 2 NAVIGATION |
| 1012 | FIRST MUSIC TITLE (M1 · S2) |

⋮

| 10FF | 14TH MUSIC TITLE (M1 · S16) |
|---|---|
| 1100 | MAIN STATION 2 NAVIGATION |
| 1101 | SUB STATION 1 NAVIGATION |
| 1102 | FIRST MUSIC TITLE (M2 · S1) |

⋮

| 1FFF | 14TH MUSIC TITLE (M16 · S16) |
|---|---|

FIG. 14

| 2000 | MAIN STATION 1 POINT COUNT |
|---|---|
| 2001 | SUB STATION 1 POINT COUNT |
| 2002 | FIRST MUSIC TITLE (M1・S1) POINT COUNT |

⋮

| 200F | 14TH MUSIC TITLE (M1・S1) POINT COUNT |
|---|---|
| 2010 | |
| 2011 | SUB STATION 2 POINT COUNT |
| 2012 | FIRST MUSIC TITLE (M1・S2) POINT COUNT |

⋮

| 20FF | 14TH MUSIC TITLE (M1・S16) POINT COUNT |
|---|---|
| 2100 | MAIN STATION 2 POINT COUNT |
| 2101 | SUB STATION 1 POINT COUNT |
| 2102 | FIRST MUSIC TITLE (M2・S1) POINT COUNT |

⋮

| 2FFF | 14TH MUSIC TITLE (M16・S16) |
|---|---|

CONTENT REPRODUCTION APPARATUS, CONTENT REPRODUCTION METHOD, AND PROGRAM

CROSS REFERENCES TO RELATED APPLICATIONS

The present invention contains subject matter related to Japanese Patent Application JP 2005-147546 filed in the Japanese Patent Office on May 20, 2005, the entire contents of which being incorporated herein by reference.

BACKGROUND OF THE INVENTION

The present invention relates to a content reproduction apparatus, content reproduction method, and a program that are intended to select a desired piece of content from among a plurality of pieces of content and reproduce the selected piece of content.

Recently, types of media for transmitting content are wide-ranging, such as movie, broadcast, text information, telephone information, and package media information, for example. Especially, the capacities of content that can be accumulated in package media have been increasing every year, providing users with extremely wide ranges and huge amounts of content that are selectable by users.

Such a drastic increase in the size of content requires content reproduction apparatuses that allow users to promptly access desired content. For content reproduction apparatuses satisfying such a requirement, one is known that allows users to select any one of shown genres to access desired content (refer to Japanese Patent Laid-open No. Hei 11-265566).

SUMMARY OF THE INVENTION

However, in selecting any one of genres to access (or reaching) desired content, each user must make a selection of one of plural pieces of information, thereby making it cumbersome for the user to access desired content.

Therefore, the present invention addresses the above-identified and other problems associated with related art methods and apparatuses and solves the addressed problems by providing a content reproduction apparatus that allows each user to easily access desired content with simple operations.

According to the present invention, there is provided a content data reproduction apparatus including: a content data store section for accumulating content data related with additional information including attribute information indicative of each attribute, the content data being grouped in accumulation; a reproduction section for reproducing information; an operation input section for entering operation information; and a controller for controlling the reproduction section to reproduce group identification information for identifying a group configured on the basis of the attribute and, if predetermined operation information is entered through the operation input section during reproduction of the group identification information, reproduce group identification information for identifying a group different from a group identified by the group identification information being reproduced.

According to the present invention, there is provided a reproduction method for a content data reproduction apparatus for reproducing content data related with additional information including attribute information indicative of each attribute, including the steps of: reproducing group identification information for identifying a group configured by the attribute; and reproducing group identification information for identifying a group other than a group to be identified by the group identification information being reproduced if predetermined operation information is entered during reproduction of the group identification information.

According to the present invention, there is provided a computer readable carrier including computer program instructions that cause a content data reproduction apparatus to implement a method, the method including the steps of: reproducing group identification information for identifying a group configured by the attribute; and reproducing group identification information for identifying a group other than a group to be identified by the group identification information being reproduced if predetermined operation information is entered during reproduction of the group identification information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows a concept of tag information that is attached to content according to an embodiment of the present invention;

FIG. 5 is an arrangement diagram illustrating content files according to an embodiment of the present invention;

FIG. 14 is an arrangement diagram illustrating point counts according to an embodiment of the present invention;

DETAILED DESCRIPTION OF THE PREFERRED EMBODIMENTS

Figure 1:
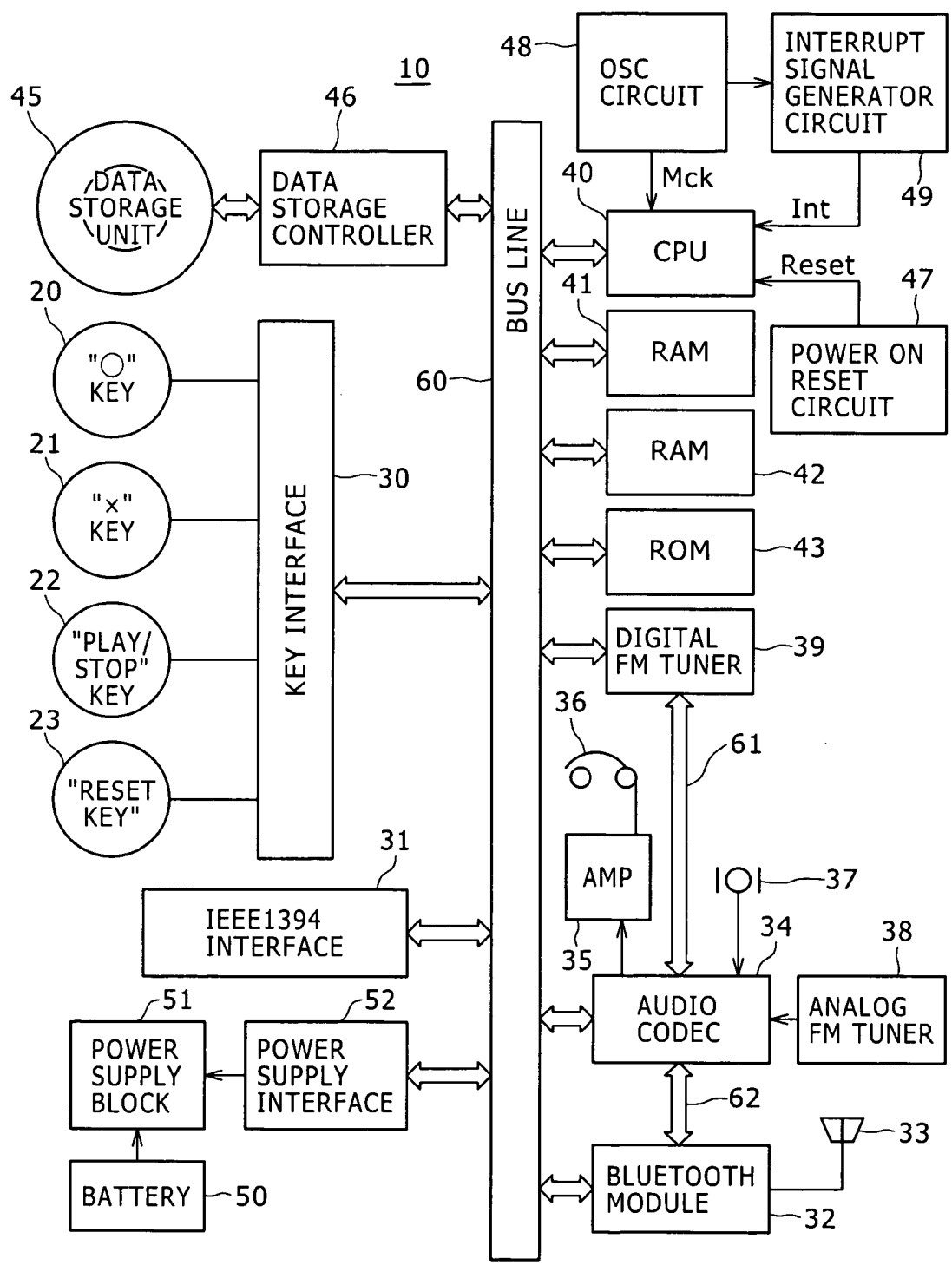
FIG. 1 is a block diagram illustrating an audio content reproduction apparatus according to an embodiment of the present invention.

This invention will be described in further detail by way of embodiments thereof with reference to the accompanying drawings. Now, referring to FIG. 1, there is shown a block diagram illustrating an audio content reproduction apparatus 10 practiced as one embodiment of a content reproduction apparatus according to the invention. The following describes the audio content reproduction apparatus 10 with reference to FIG. 1.

The audio content reproduction apparatus 10 has a data storage unit 45 that functions as one example of a content accumulating section in the present embodiment and a data storage controller 46 for controlling the data storage unit 45. The audio content reproduction apparatus 10 also has an audio CODEC 34 and headphones 36 that function as one example of a content reproduction section in the present embodiment. The audio content reproduction apparatus 10 further has a plurality of keys that function as one example of an operation input section through which operation information based on inputs by the user is entered in the present embodiment, a key interface 30, a CPU 40, and a program associated with key operations. The audio content reproduction apparatus 10 still further has the CPU 40, a RAM (Random Access Memory) 41, a RAM 42, a ROM (Read Only Memory) 43 that function as one example of a controller for controlling a content accumulation section and a content reproduction section in accordance with the operation information, a program associated with the control of the data storage controller 46, and a program associated with the control of the audio CODEC 34.

As one example of group identification information, navigation message and "bridge" information are equivalent thereto in the present embodiment. As one example of first operation information, pressing of "x" key 21 (referred also to as a "No" key) is equivalent thereto in the present embodiment. The first operation information is indicative of an intention not to select content or grouped content (hereafter referred to a content group). As one example of second operation information, pressing "o" key 20 (referred also to a "Yes" key) is equivalent thereto in the present embodiment. The second operation information is indicative of an intention to select a content group. Further, if a key operation signal has not been received for a certain period of time, it is regarded that the operation information for selecting this content group has been received. In this case also, it is regarded that the second operation information has been entered.

The CPU 40 is a 16-bit CPU in which 16 bits are processed as one word and has a general configuration in which one instruction is executed every clock. The CPU 40 also has a reset terminal and an interrupt terminal (both not shown).

As devices peripheral to the CPU 40, an OSC (Oscillation) circuit 48, an interrupt signal generator circuit 49, and a power-on reset circuit 47. The OSC circuit 48 oscillates a master clock Mck that is a clock signal basic to the operation of the CPU 40 and supplies the oscillated signal to the CPU 40 and the interrupt signal generator circuit 49. In the present embodiment, the OSC circuit 48 is made up of a crystal oscillator. The interrupt signal generator circuit 49 is connected so as to supply an interrupt signal Int to an interrupt terminal of the CPU 40. The power-on reset circuit 47 is connected so as to supply a reset signal Reset to a reset terminal of the CPU 40 when a predetermined voltage has been reached when power is supplied from a power supply block 51 by connecting a battery 50 thereto.

In the present embodiment, the data storage unit 45 is made up of a flash memory that is accessible for reproduction and recording. The data storage controller 46, arranged between the CPU 40 connected to a bus line 60 and the data storage unit 45, controls the data storage unit 45 in accordance with commands given by the CPU 40.

The data storage controller 46 has a capability of DMA (Direct Memory Access) transfer to the audio CODEC 34, thereby transferring data from the data storage unit 45 directly to the audio CODEC 34 over the bus line 60 to mitigate the processing load of the CPU 40. DMA transfer is executed in a data amount matching the storage capacity of a temporary storage (not shown) of the audio CODEC 34.

In addition, the data storage controller 46 has a "read sequence specification sequencer" (not shown) for specifying a sequence of reading. When the CPU 40 identifies file names of pieces of content to be read and specifies a read sequence thereof for the read sequence specification sequencer, the DMA transfer is executed from the data storage controller 46 to the audio CODEC 34 in specified sequence. The data storage controller 46 also has a "currently read address value register" (not shown) indicative of which part of content data is being read. The CPU 40 and the audio CODEC 34 can get information about the progress of current reproduction (or a reproduction status) by this currently read address value register.

Specific contents of the currently read address value can be identified by a read file name and address information included in the content having that file name (generally, this address information is included in each piece of content as an elapsed time from the beginning of each music title).

Data management in the audio content reproduction apparatus 10 is executed in a hierarchical structure. Namely, arrangement information indicative of which main station (a first layer), which sub station (a second layer) in that main station, and which music title (a third layer) in that sub station one title of music identified by a file name is arranged in is managed by an address number written with the file name of that title of music.

In addition, reproduction priority, or which title of music is to be reproduced in preference to others, is related with each address number. Namely, the priority of file names written to smaller addresses is higher than that written to larger addresses. This file name is also written to a predetermined address in the RAM 42.

A point count to be described later is also related with a file name and managed in another area of the RAM 42. Each piece of audio content to be identified by a file name contains a tag area to manage an attribute of that audio content. Consequently, the CPU 40 can search the RAM 42 for freely identifying file names of music titles arranged in a predetermined layer and sequentially write the retrieved file names to the read sequence specification sequencer of the data storage unit 45, thereby reproducing the audio content in a desired sequence. It should be noted that navigation messages are also managed by file name, so that writing the file name to the read sequence specification sequencer allows the insertion of a navigation message into an interval between the reproducing operations of music titles.

In the present embodiment, in order to simplify the processing to be executed by the CPU 40, the navigation messages to be described later are stored in a memory having a predetermined storage capacity arranged in the data storage controller 46 in advance. Consequently, if the data storage unit 45 is replaced in its entirety, the navigation messages of user preference can be stored.

Further, in which stage the current reproduction status is can be known by reading the value of the currently read address value register of the data storage controller 46. To be more specific, a comparison is made between the value of the read sequence specification sequencer and the value of the currently read address value register to know up to which position control specified by the read sequence specification sequencer has advanced, to be more detail, up to which position the address in the currently reproduced content has advanced (an elapsed time from the beginning). Therefore, on the basis of the value of the currently read address value register, the CPU 40 can correctly obtain the information about status transitions, such as a navigation message of main station 1 is currently being reproduced or "bridge" of eighth music title in "bridge part" of sub station 4 belonging to main station 3 is being reproduced, for example.

The audio content reproduction apparatus 10 has the RAM 41. Connected to the bus line 60, the RAM 41 is accessed for information reading and writing under the control of the CPU 40. The data stored in the RAM 41 is erased upon discontinuation of power supply. However, the RAM 41 provides high-speed data storage and read operations in accordance with commands of the CPU 40 that is executing instructions in accordance with a program sequence. The RAM 41 is made up of a DRAM (Dynamic Random Access Memory), for example.

In addition, the audio content reproduction apparatus 10 has the RAM 42. Connected to the bus line 60, the RAM 42 is accessed for information reading and writing under the control of the CPU 40. Although lower than the RAM 41 in processing speed, the RAM 42 is capable to retaining the data stored therein when power supply is discontinued. The RAM 42 is made up of a flash memory, for example. The RAM 42 has a predetermined area for storing such information to be stored also after power-off as the layer structure of music (including all audio content), the number of points (or point count) of each title of music, and the settings set by the user for the operation of the audio content reproduction apparatus 10.

The audio content reproduction apparatus 10 also has the ROM 43. The ROM 43 stores a program that instructs the CPU 40 to execute processing in a predetermined procedure, in which the address contents in the ROM 43 indicated by a PC (Program Counter) arranged in the CPU 40 are sequentially loaded into the CPU 40, step by step, in synchronization with a master clock Mck, the loaded address contents being interpreted for the execution of instructions. The ROM 43 is made up by a mask ROM with program contents fixed by hardware. Alternatively, the ROM 43 may be made up by a flash memory. In the present embodiment, a flash memory is used. It should be noted that a flash memory allows rewriting of data, but a flash memory is not rewritten with data during the operation of the audio content reproduction apparatus 10, so that the flash memory functions as the ROM 43.

The program written to the ROM 43 constitutes parts of a content data store section, a operator section, and controller, thereby controlling hardware components of the audio content reproduction apparatus 10, such as the data storage controller 46, the key interface 30, and the audio CODEC 34, for example. The ROM 43 also stores program parts for reproducing group identification information for identifying a content group of a different classification than another content group in accordance with the entry of first operation information during the reproduction of group identification information.

The audio content reproduction apparatus 10 has an IEEE 1394 interface 31. Therefore, the audio content reproduction apparatus 10 can communicate an external computer (not shown) through the IEEE 1394 interface 31. The audio content reproduction apparatus 10 can download programs from the external personal computer into the ROM 43 and music data into the data storage unit 45, made up by flash memories as described above.

The audio content reproduction apparatus 10 also has a digital FM tuner 39. The digital FM tuner 39 receives a reception signal of digital FM broadcast and transmits the received reception signal to the audio CODEC 34 over an individual data line 61 in DMA transfer manner. Since the data processing speed in the audio CODEC 34 and the data transfer speed of the reception signal from the digital FM tuner 39 are set substantially the same level, the reception signal from the digital FM tuner 39 is processed by the audio CODEC 34 without interruption. The tuning by the digital FM tuner 39 is controlled by the CPU 40 through the bus line 60.

The audio CODEC 34 executes error correction and demodulation on music signals (including all audio content signals) received from the data storage controller 46 via the bus line 60 and digital reception signals received from the digital FM tuner 39 via the data line 61 and transmits the resultant analog audio signals to an amplifier 35, thereby sounding the analog audio signals from the headphones 36 connected to the amplifier 35 to the ear of the user. It should be noted that, in order to increase the capacity of audio content stored in the data storage unit 45, audio information is stored in a compressed form in general, so that the audio CODEC 34 is adapted to decompress the compressed audio information to be reproduced real time.

Also, the audio CODEC 34 has an analog input terminal (not shown). An audio signal supplied from an analog FM tuner 38 is entered at this analog input terminal. The audio analog signal is then amplified by the amplifier 35 and the reproduced audio analog signal is supplied to the headphones 36. A microphone 37 is also connected to the audio CODEC 34, in which a response to a message supplied through telephony is enabled even during the reproduction of music. In addition, use of this microphone allows the user to give operation commands to the audio content reproduction apparatus 10.

Besides, the audio content reproduction apparatus 10 has a Bluetooth module 32. The Bluetooth module 32 is connected to the bus line 60, through which the Bluetooth module 32 is controlled. The audio CODEC 34 and the Bluetooth module 32 are interconnected with the data line 62. An antenna 33 is connected to the Bluetooth module 32. This configuration allows wireless communication with a telephone equipped with a Bluetooth module. A signal from the telephone is encoded and decoded by the audio CODEC 34 for communication with wirelessly connected telephone which is kept in a bag for example. Consequently, the use of the telephone is enabled even during the reproduction of music.

In addition, the audio content reproduction apparatus 10 has the key interface 30 in addition to a plurality of keys. The plurality of keys include the "o" key 20, the "x" key 21, the play/stop key 22, and the reset key 23. The functions of these keys will be detailed later. The key interface 30 is arranged between each of these keys and the bus line 60 to notify the CPU 40 of the operation event of each key. Each of these keys is a touch-sensitive switch and therefore has a contact, which generates so-called chattering. Consequently, the key interface 30 has a capability of preventing the error detection of each key from being caused by the chattering.

Further, the audio content reproduction apparatus 10 has the power supply block 51, the power supply interface 52, and the battery 50. The power supply block 51 is supplied with voltage from the battery 50 to generate a power having a voltage level necessary for driving the audio content reproduction apparatus 10 and detects a signal from the play/stop key 22 via the power supply interface 52, thereby supplying power to each component of the audio content reproduction apparatus 10. Further, the power supply block 51 is adapted to stop power to components of the audio content reproduction apparatus 10 via the power supply interface 52 upon a power supply stop command from the CPU 40, thereby powering off the audio content reproduction apparatus 10. It should be noted that, in the present embodiment, when five minutes pass after the audio content reproduction apparatus 10 is put in the stop status by user's operating the play/stop key 22, the CPU 40 starts a power-off sequence. Besides, the power supply block 51 has a clock (not shown) to always enable the detection of current time.

Figure 2:
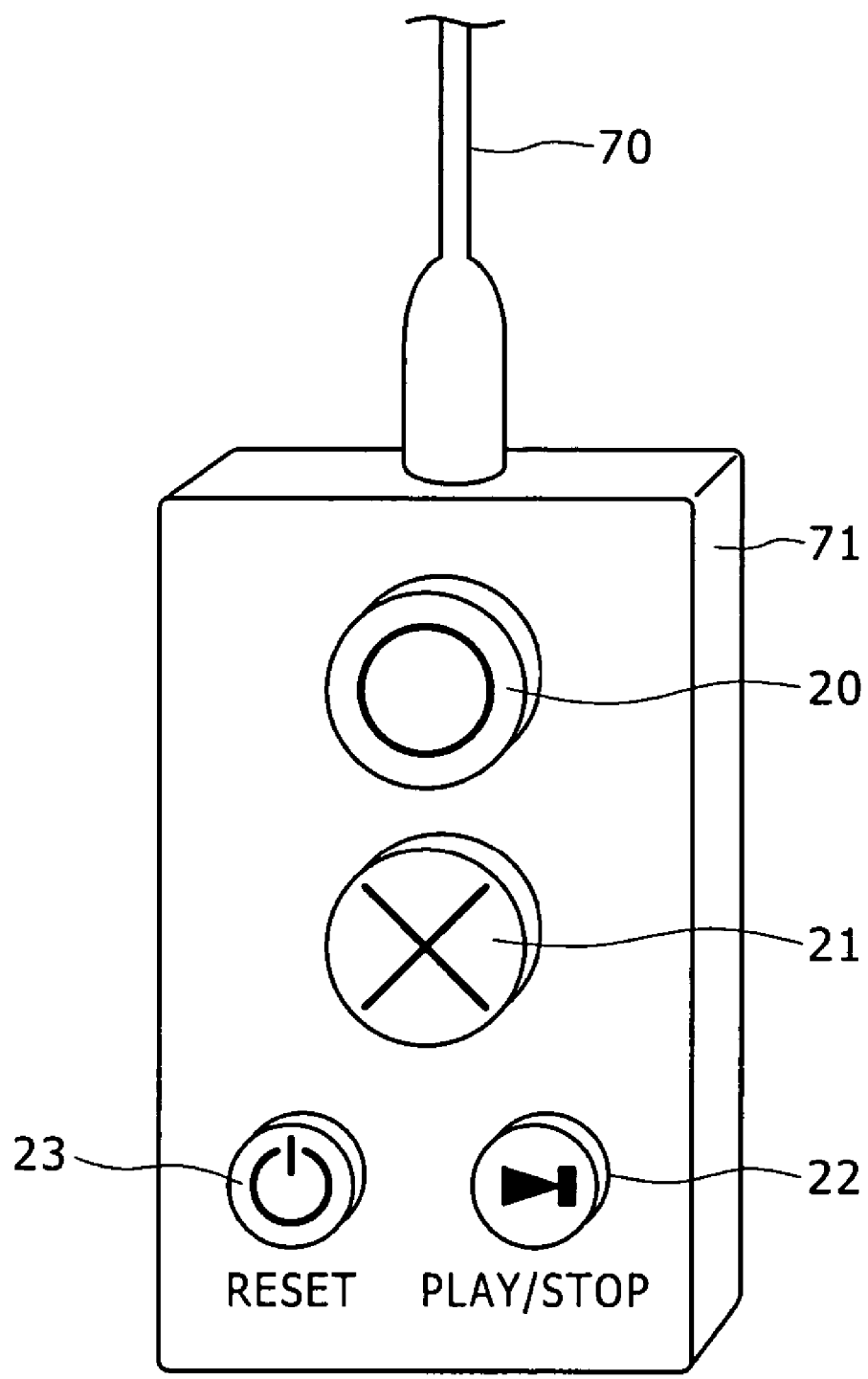
FIG. 2 is a perspective view illustrating a key block of the above-mentioned audio content reproduction apparatus.

In the present embodiment, in order to let the user operate keys at hand, these keys (the "o" key 20, the "x" key 21, the play/stop key 22, and the reset key 23) are arranged on a housing 71 which is connected to an equipment main (not shown), another configurational part of the audio content reproduction apparatus 10 with headphones cord 70 (a wire), as shown in FIG. 2.

Figure 3:
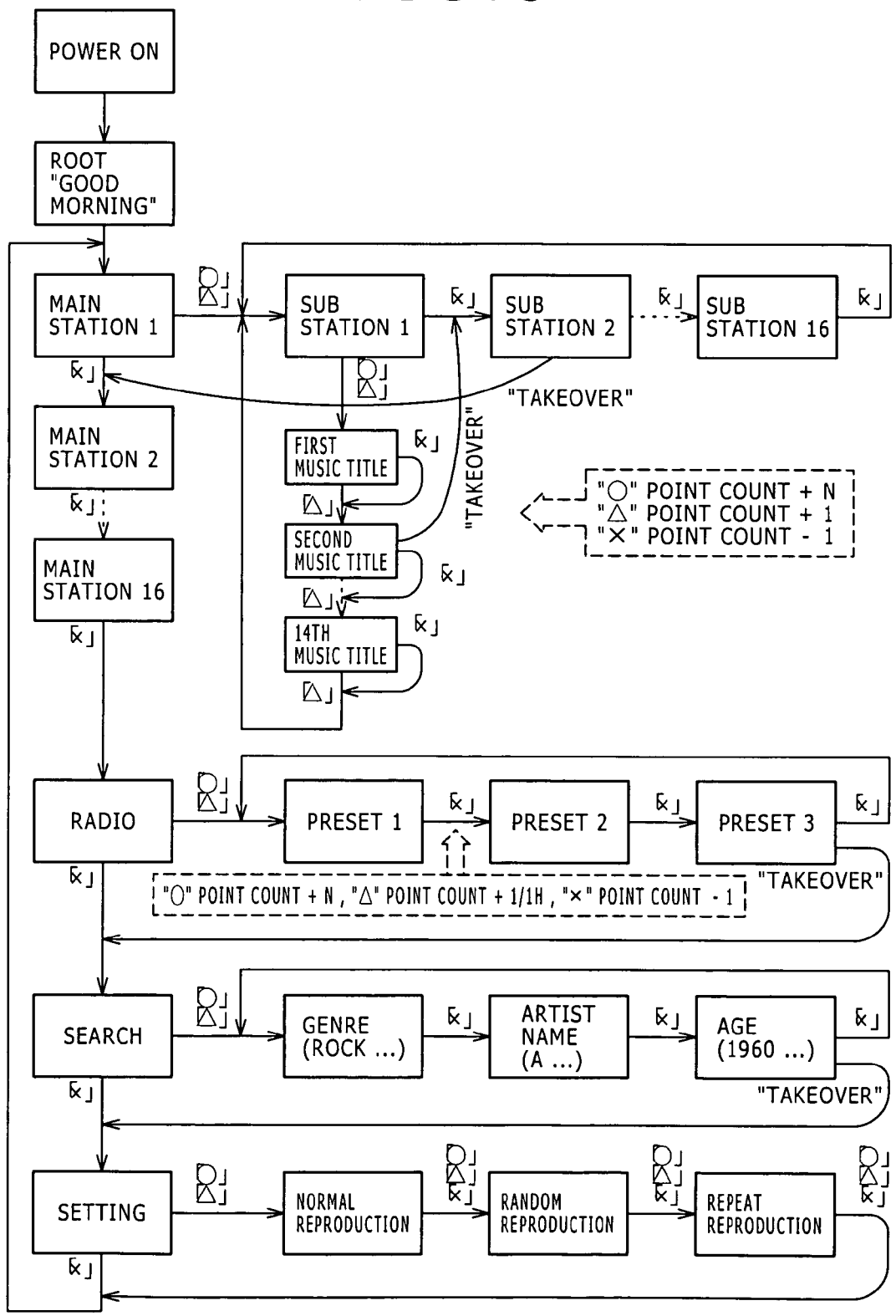
FIG. 3 is a status transition diagram of the above-mentioned audio content reproduction apparatus.

The following describes how the audio content reproduction apparatus 10 operates with reference to FIGS. 3 through 5. First, how the audio content handled in the audio content reproduction apparatus 10 is classified into layers will be described. Next, the operation of the audio content reproduction apparatus 10 will be outlined in terms of reproduction status transitions.

Classification of Content:

First, a content group and content handled in the audio content reproduction apparatus 10 will be described. A content group and content are handled with attributes thereof classified in layers. A plurality of main stations and radios are one example of a content group (or a main group) belonging to a first layer, a plurality of sub stations are one example of a content group (or a sub group) belonging to a second layer, and audio content represented by a first music title, a second music title, and so on is one example of content belonging to a third layer.

Referring to FIG. 3, there is shown a status transition indicative of which content group or content is reproducible by a reproduction section in the above-mentioned hierarchical structure. It should be noted that not all main stations, sub stations, and music titles belonging thereto are shown for the purpose of brevity of illustration.

In the present embodiment, the number of main stations is 16, the number of sub stations is 16, and the number of music titles is 14, however, there is no theoretical limitation to the numbers of content groups and pieces of content in these layers. Also, FIG. 3 shows only three presets for the brevity of illustration; however, there is no theoretically limitation to the number of presets. FIG. 3 also shows "search" and "setting". "Search" and "setting" also have each a hierarchical structure, with only three groups in the first layer shown. However, there is no theoretical limitation to the number of these groups. With FIGS. 28 and 29 to be described later, the same omission as described above is made. The detail contents of FIG. 3 will be described later.

Referring to FIG. 4, the content attributes shown here are written to a tag attached to each piece of content beforehand as a part thereof. For example, the contents of a tag include genre 1 (rock for example) as the classification information of the first layer, genre 2 (Japanese rock for example) as the classification information of the second layer, and music title as the classification information of the third layer. The tag also includes a time address of "bridge" in each music title so as to allow quick access to "bridge" to be described later. The tag further appropriately includes other pieces of classification information such as age and artist. Besides, the tag includes a unique file name for each piece of music title so as to allow the reading of file names without confusion in the data storage unit 45, thereby correctly identifying each piece of content.

Because this tag information is indicative of content attributes, a plurality of content groups classified (or grouped) on the basis of this tag information are formed. Namely, on the basis of tag information, content is classified into content groups or content layers in advance. This classification (or grouping) and this layering are done by use of a table in the RAM 42.

To be more specific, the tag information is entered when a computer (not shown) manipulates music data so as to be downloaded from a CD to the audio content reproduction apparatus 10 in offline processing. The tag information is attached by automatically analyzing the music data or, on the basis of the data attached to a CD jacket, the tag information is entered from the keyboard of the computer. Then, classification information is also automatically obtained when audio content is captured into the data storage unit 45. At the same time, in downloading the first content to the audio content reproduction apparatus 10, the classification (or grouping) and layering data are written to the RAM 42. Then, use of the tag allows the audio content reproduction apparatus 10 itself to execute layering and grouping that are different from those executed at the time of content acquisition, by use of a "search" function to be described later.

The reproduction of content by the audio content reproduction apparatus 10 requires the prioritization of reproduction specifying a sequence in which to reproduce pieces of music content. Initially, the information about the prioritization of reproduction is automatically acquired at the time of audio content acquisition. Namely, the priority is set depending on in which sequence (or with which address number) each file name is stored in the RAM 42 in downloading the content to the audio content reproduction apparatus 10. Then, the audio content reproduction apparatus 10 is able to change this setting of priority.

It should be noted that, in the relationship with the layering of content groups, as the layer goes up, the priority of reproduction goes up and the content groups belonging to the same layer or the priority of content reproduction in the same layer is set in accordance with the predetermined rules. This setting of priority will be detailed later. This priority is stored in the RAM 42, a nonvolatile memory, so that powering-off of the apparatus or unloading of the battery 50 will not lose the priority data stored in the RAM 42.

Referring to FIG. 5, there is shown an exemplary arrangement of content in the RAM 42. A reproduction priority setting area is arranged in a predetermined area in the RAM 42. The size of this area depends on the number of pieces of data settable as the first layer, the number of pieces of data settable as the second layer, and the number of pieces of data settable as the third layer. In the present embodiment, the number of main stations providing the first layer is set to 16, the number sub stations providing the second layer is set to 16, and the number of music titles providing the third layer is set to 14. Setting these numbers allows the setting of the reproduction priority setting area in a 12-bit address space.

As shown in FIG. 5, each address is expressed in hexadecimal notation and a recorded entity indicated thereby is a file name stored in the data storage unit 45. In the present embodiment, the arrangement is made such that, as the address of the reproduction priority setting area gets smaller, the reproduction priority gets higher, thereby allowing easy access in accordance with the reproduction priority. It should be noted that, in the present embodiment, the reproduction priority is managed by the number of points for each music title and preset, so that the audio content reproduction apparatus 10 itself can automatically update file name storage addresses, immediately after downloading of audio content, the priority of each of the first layer through the third layer is set in the sequence of downloading as described above.

It should also be noted that the number of layers is not theoretically limited to the above-mentioned values. The number of layers may be appropriately determined on the basis of the storage size of the data storage unit 45, the storage size of the reproduction priority setting area of the RAM 42, the number of bits necessary for identifying the reproduction priority setting area (or address space), and the number of bits making up the status flag, for example.

Referring to FIG. 5, address "1000" (it should be noted that the addresses shown in FIG. 5 are all in hexadecimal notation) is indicative of the file name of a navigation message of main station 1, address "1001" is indicative of the file name of a navigation message of sub station 1, and addresses "1002" through "100F" are indicative of the file name of music titles belonging to sub station 1. Address "1010" is blank. Address "1011" is indicative of the file name of a navigation message of sub station 2. Address "1012" is indicative of the file name of the first music title of sub station 2. Address "10FF" is indicative of the file name of the 14th music title of sub station 2. As for main station 2, address "1100" is indicative of the file name of a navigation message of main station 2, address "1101" is indicative of the file name of a navigation message of sub station 1, addresses "1002" through "100F" are indicative of the file name of music titles belonging to sub station 1. Address "1FFF" is indicative of the file name of the 14th music title of sub station 16 of main station 16. It should also be noted that a combination of a letter and a number, such as M16 for example, is indicative of main station 16, likewise, S16 is indicative of sub station 16. In FIG. 5, only the portion corresponding to the above description is shown, the other portions being omitted.

How a Reproduction Status Makes a Transition:

The following describes in detail a reproduction status transition with reference to FIG. 3. It should be noted that, referring to FIG. 3, "x" is indicative that the "x" key 21 has been pressed, "o" is indicative that the "o" key 20 has been pressed, and "Δ" is indicative that the "x" key 21 or the "o" key 20 has not been pressed a predetermined period of time (ten seconds for example) after the end of a message.

Power Turn-On:

When the play/stop key 22 is pressed by the user in the power-off status, the CPU 40 gets from a so-called resume mode to the operation mode. Then, the CPU 40 puts all the other components of the audio content reproduction apparatus 10 that have been kept in the standby status for power saving into the operation mode and writes, to the PC (Program Counter) of the CPU 40, the same address as the address to which a jump is made by an interrupt when the power-on reset circuit 47 operates, starting the processing from this address.

Reproduction in "Root":

Next, a jump is automatically made to "root" shown in FIG. 3, sending an audible navigation message "Good morning" for example to the headphones 36. If the "o" key 20 is pressed or ten seconds have passed since the end of the message with no key pressed, then a transition is made to sub station 1 belonging to main station 1.

On the other hand, if an audible navigation message such as "Good morning" for example starts in "root" and the "x" key 21 is pressed within ten seconds after the end of the message, a transition is made from halfway in the navigation message to main station 1.

Subsequent to "root", if the user operating the audio content reproduction apparatus 10 does not operate any keys, a predetermined status transition is made, thereby sequentially reproducing music titles. The "x" key 21 is used to make a jump from a predetermined sequential status to another status. The "o" key 20 is mainly used to establish a status transition. Namely, the "0" key 20 is used to positively indicate that the "x" key 21 is not pressed. To be more specific, once the "o" key 20 is pressed, the pressing of the "x" key 21 in the same status is ignored. However, in the present embodiment, is also used to realize a sub function for directly jumping from the bridge part to a desired music title to reproduce this music title and positively adding the number of points (or a point count).

Status Transition in Main Station:

Next, a status transition occurs from "root" to main station 1.

A status transition in main station is characterized by that, during the reproduction of group identification information, a content group attribute, the operation information for not selecting a content group identified by that group identification information is entered, thereby reproducing other group identification information for identifying a content group of a different classification from that content group.

To be more specific, when a status transition has occurred from "root" to main station 1, group identification information indicative of a classification on the basis of a content attribute is reproduced. For the group identification information, navigation message "This is a rock music station" for example is sounded in a high-pitched male voice in a disc jockey manner for example.

Next, when the "x" key 21 is pressed within ten seconds after the end of message "This is a rock music station", a status change takes place to main station 2 and another navigation message "This is a love song station" is sounded in a soothing female voice, for example.

When the "x" key 21 is pressed within ten seconds after the end of the message "This is a love song station", a status transition takes place to main station 3 and still another navigation message "This is a recent hits station" is sounded in a pop female voice, for example.

Thus, the operation information for not selecting a content group is entered by operating the "x" key 21 to reproduce the group identification information for identifying a content group of a different classification from that content group, thereby reaching a desired piece of content. It should be noted that "reproduce group identification information" denotes not only a status subsequent to the start of the reproduction of group identification information, but also a reproducible status, namely, a silent status preceding the reproduction of group identification information after the input of first operation information becomes detectable. The operation of the "x" key 21 is executed during the reproduction of group identification information. "During the reproduction" in this case includes a period of time from when navigation message "This is a rock station" which is group identification system becomes reproducible up to a predetermined period (for example, ten seconds after the end of the message) inclusive. Therefore, this configuration, before the contents of each navigation message become known, allows the user who knows the contents of each particular station to quickly access a target and gives a time for a decision to the user who cannot make up his mind whether to select a particular content group.

On the other hand, if, during the reproduction of group identification information, an operation section gets operation information for selecting a content group, the content belonging to this content group can be reproduced. To be more specific, when the "o" key 20 is pressed or if ten seconds passes after the end of the message with no key operated, the status of main station 1 is established.

It should be noted that, although not shown in FIG. 3, 14 music titles belong to each of sub station 2 through sub station 16 and 16 sub stations are linked to each of main station 2 through main station 16 in a tree structure.

Status Transition in Sub Station:

The status transition in a sub station is generally the same as that in a main station. To be more specific, when a status transition takes place from main station 1 to sub station 1, group identification information indicative of a classification based on a content attribute. For the group identification information, navigation message "This is a Japanese rock station" is sounded, for example.

Then, if the "x" key 21 is pressed within ten seconds after the end of the message "This is a Japanese rock station", a status transition takes place to sub station 2, in which navigation message "This is a Western rock station" is sounded, for example.

On the other hand, if the "o" key 20 is pressed while message "This is a Japanese rock station" is sounded or ten seconds have passed since the end of the message with no key pressed, the status of sub station 1 can be established.

With the status shifted to sub station 1, the group identification information indicative of a classification based on a content attribute is reproduced, this group identification information being of a more detailed classification than the classification in the first layer. Namely, a navigation message indicative the type of sub station 1, for example, "This is a Japanese rock station", is sounded.

Then, a bridge of a music title belonging to that sub station 1 is sounded.

Term "bridge" as used herein denotes one of pieces of group identification information and a relatively short (about ten seconds for example) feature part of a music title. In the present embodiment, a bridge is a part as near to the beginning of a music title as possible. If the beginning of a particular music title is soundless or inconspicuous, the bridge thereof is arranged as such a position as near to the beginning as possible as providing the identification of that music title. Forming a bridge as described above allows the user to know the whole image of each particular music title belonging to sub station 1 by listening to the bridge thereof that is relatively brief in duration. This bridge arrangement also allows the user to enjoy the rest of music that follows the bridge if the music title is continuously reproduced from the bridge. In the present embodiment, the position of bridge is registered in advance as shown in FIG. 4. To be more specific, the bridge is registered as information indicative of a range of time in units of minutes and seconds, for example, in the entire length of each particular music title.

In addition, in the present embodiment, a bridge part composed of all bridges belonging to that sub station is used as group identification information. Reproducing this bridge part allows the sequential reproduction of a plurality of bridges in a time-dependent manner. This arrangement allows the user to grasp the outlines of many music titles in a relatively short time. Pressing the "o" key 20 during the reproduction of the bridge part gives second operation information to the operation section for selecting a music title containing the bridge currently reproduced, thereby reproducing the selected music title continuously from that bridge.

In this case, if the bridge part has been heard in its entirety with the "o" key 20 not pressed, then a jump is automatically made to the beginning of the first music title.

Takeover Status Transition:

The basic status transitions of reproduction in the audio content reproduction apparatus 10 have been described above. The present embodiment also provides a status transition referred to as "takeover" that is an exceptional status transition in the audio content reproduction apparatus 10. The following describes this takeover status transition.

In a takeover status transition, during the reproduction of the content belonging to one content group, if the operation section has acquired, by a predetermined number of times, first operation information for discontinuing the reproduction of the content, another piece of content belonging to another content group of a different classification from that of the content group currently reproduced.

In the present embodiment, if the "x" key 21 has been pressed for three music titles continuously in the process of the above-mentioned music reproduction or if "x" key 21 has been pressed five or more times in the nearest 10 music titles, then a sub station takeover occurs. Namely, if a requirement has been satisfied, "takeover" in a form in which a jump is made to a next sub station is referred to as "sub station takeover".

FIG. 3 shows an example of a takeover in sub station 1, thereby making a jump to the beginning of sub station 2. Namely, sub station 2 takes over the second music title of sub station 1 if the "x" key 21 is pressed at the 14th music title, the first music title and the second music title of sub station 1 or if the "x" key 21 is pressed in five or more music titles in the 7th music title through the second music title (via the 14th music title) shown in FIG. 3.

In the above-mentioned example, a takeover was made by a next station, namely, sub station 2, however, a takeover of another form is made also by a next main station. If all sub stations belonging to that main station are rejected, namely, if none of the music titles belonging to that main station has been heard (if a music title has been heard only for as short as within ten seconds, such a music title is regarded as not heard at all), a takeover is made by a next main station. Also, if the pressing of the "x" key 21 is detected in 10 music titles among the nearest 20 music titles over a plurality of sub stations, a takeover is made by a next main station. Then, a status transition is made to the beginning of a next main station. The takeover in this form is referred to as the takeover by main station.

Referring to FIG. 3, there is shown an example in which a takeover is made by main station 2 in sub station 2 belonging to main station 1. Namely, if the "x" key 21 is pressed in a range from sub station 3 to sub station 2 (via sub station 16), a music title with the "x" key 21 pressed on the 10th music title among 20 music titles in main station 1 independent of sub station number has occurred.

If the user wants to exit sub station 1 and shifts a status transition to another sub station, another main station, "radio", "search", or "setting" without waiting for the satisfaction of takeover conditions, the user presses the reset key 23 to return to "root" from which to shift to a desired status.

A status transition with main station 1 as main has been described above. With other main stations, a status transition takes place by following generally a similar process. This holds true with the takeover capability.

A status transition between main stations is summarized as follows. A status transition takes place from main station 1 to main station 2 if a transition has been made from main station 1, namely, if a transition is made by the "x" key 21 in the stage of main station 1 or a takeover is made by main station 2 in stages of sub stations belonging to main station 1. Likewise, a status transition takes place from main station 2 to main station 3 if a transition from main station 2 takes place, namely, a transition is made by the "x" key 21 in a stage of main station 2 or if a takeover is made by main station 3 in stages of sub stations belonging to main station 2. A status transition between other main stations is made in generally the same manner as above.

It should be noted that the last main station (the main station 16 in FIG. 3) is not followed by another main station. In this case, when the "x" key 21 is pressed in the stage of main station (last), a transition takes place to "radio". If the takeover condition is satisfied in main station (last), a takeover is made by ratio that is a status in the same first layer as that of main station.

Point Count:

In the present embodiment, the reproduction status of each piece of content is detected and, on the bases of the detected reproduction status, the reproduction priority of pieces of content in a content group or the reproduction priority of pieces of content in a plurality of content groups is determined. In one example of the reproduction status detection, in the audio content reproduction apparatus 10 uses a point count (or the number of points). A point count herein denotes a value indicative of user preference. Namely, as a point count rises, user preference rises and vice versa. A point count takes a positive or negative value.

To be more specific, if the "x" key 21 is pressed halfway in a music title being reproduced, a jump is made to a next music title, for example, from halfway in the first music title to the beginning of the second music title. Then, the point count of the first music title (the jump source) is decremented by one (counted −1).

On the other hand, if the "o" key 20 is pressed halfway in a music title, the point count of that music title is incremented by one (counted +1). If the "o" key 20 is pressed two or more times in a same music title, the point count of that music title is incremented by the number of times the "o" key 20 has been pressed.

If a same music title has been heard through with the "o" key 20 not pressed, the point count of that music title is also incremented by one.

Radio:

The following describes an example in which a status transition takes place to "radio". Referring to FIG. 3, a status transition takes place to "radio" if a status transition has been made from main station 3, namely, if a status transition is made by the "x" key 21 in a stage of main station 3 or a takeover has been made by "radio" in stages below sub stations belonging to main station 3.

When a status has shifted to "radio", navigation message "This is a radio" is sounded.

At this moment, if the "o" key 20 is pressed or ten seconds pass after the end of the message with no key pressed, then a status shifts to the preset 1.

After shifting of a status to preset 1, navigation message "Frequency XX kHz. This is FM YY station" for example is sounded, indicating what kind of a broadcast station that preset 1 is.

It is also practicable to store a daily, weekly, or monthly program guide to transmit navigation message "Frequency XX kHz. This is FM YY station. We are broadcasting classical music until ZZ o'clock" for example, upon detection of the current time.

If the "x" key 21 is pressed after the start of this navigation message and before the passing of a certain time (one minute for example), a status shifts to preset 2, a next broadcast station. Then, the point count of the preceding broadcast station, preset 1 in this example, is decremented by one.

On the other hand, if the "o" key 20 is pressed after the start of message "Frequency XX kHz. This is FM YY station", the point of that broadcast station is incremented by the number of times the "o" key 20 has been pressed. If a same broadcast station is tuned in for a predetermined period of time (one hour for example) without interruption, the point count is incremented by one for every predetermined time.

If the "x" key 21 is pressed after the start of a navigation message of a last preset (preset 3 in FIG. 3), a status transition takes place to preset 1, the first broadcast station. Then, the point count of the source broadcast station, preset 3 in this example, is decremented by one.

The subsequence status transition is generally the same as that of the above-mentioned process.

Takeover in Radio:

If all presets belonging to "radio" have been rejected, namely, if none of the all presets has been heard for a predetermined period of time (ten seconds for example), then the current status is taken over by "search". Then a status shifts to the beginning of "search".

It should be noted that, if the user wants to exit "radio" to shift a status to another main station, another sub station, "search", or "setting", the user presses the reset key 23 to return to "root", thereby moving to a desired status.

Search:

"Search" is a capability of allowing the user to quickly reach a target music title to use the retrieved music title. "Search" is layered deep enough for quickly reaching a target music title. A first layer provides most generic concept information, a second layer and a third layer providing more detail "search" information. Namely, as compared with the above-described example in which the user sequentially enters operation information in the above-mentioned main station, the "search" approach allows the user who is not well familiar with the contents of content to reach desired content more quickly.

First, an example in which a status transition to "search" takes place will be described. Referring to FIG. 3, a status shifts to "search" if a status transition from "radio" takes place, namely, if a status transition is made by the "x" key 21 in the stage of "radio" or a status transition is taken over by "search" in the stage of preset belonging to "radio".

When a status has shifted to "search", navigation message "This is search" is sounded. If the "o" key 20 is pressed at this moment or ten seconds pass after the end of the message with no key pressed, a navigation message in the first layer is sounded.

On the other hand, if the "x" key 21 is pressed within ten seconds after the end of the navigation message "This is search", then a status shifts to "setting".

The navigation message in the first layer is first "This is genre" for example.

If the "x" key 21 is pressed within ten seconds after the end of navigation message "This is a genre", second navigation message in the first layer "This is an artist name" is sounded without delay. If the "x" key 21 is pressed within ten seconds after the end of navigation message "This is artist name", third navigation message in the first layer "This is an age" is sounded.

Thus, when the "x" key 21 is pressed, the user can reach the information associated with the desired content in the first layer.

On the other hand, if the "o" key 20 is pressed after the start of navigation message "This is a genre", a navigation message of the second layer belonging to the first layer is sounded without delay.

If none of the keys is operated for ten seconds or more after the end of navigation message "This is a genre", then a navigation message of the second layer belonging to the first layer is sounded.

Thus, from any of plural pieces of information associated with the content of the first layer, the user is able to enter the more detailed second layer belonging to that first layer. It should be noted that, in FIG. 3, only the first layer is shown and the lower layers are omitted.

The navigation message in the second layer is "This is a rock" for example. If the "x" key 21 is pressed within ten seconds after the end of message "This is a rock" for example, second navigation message of the second layer "This is a long song" is sounded without delay. Further, if the "x" key 21 is pressed within ten seconds after the end of navigation message "This is a love song", third navigation message of the second layer "This is a pop" is sounded without delay.

Thus, pressing the "x" key 21 allows the user to reach the information associated with the desired content in the second layer.

On the other hand, if the "o" key 20 is pressed after the start of navigation message "This is a rock", a navigation message for music titles arranged in the third layer belonging to that second layer is sounded without delay.

If none of the keys has been pressed for ten seconds or more after the end of navigation message "This is a rock", a navigation message for music titles arranged in the third layer belonging to that second layer is sounded.

Thus, from any of plural pieces of information associated with the content of the second layer, the user is able to enter the more detailed third layer belonging to that second layer.

Then, a navigation message for music titles arranged in the third layer belonging to the second layer is sounded.

Thus, the user is able to know a corresponding music title from any of plural pieces of information about the content in the third layer.

In the present embodiment, for the navigation messages for music titles arranged in the third layer, generally the same navigation messages as described above sounded in sub station 1 are used, hereby sequentially sounding the bridge parts of music titles belonging to the third layer.

The operation to be executed after the sequential sounding of bridge parts may be executed in generally the same manner as the music title selection in sub station described above.

Since "search" is layered as described above, at least operating only the "x" key 21 allows the user to reach a desired music title, thereby enjoying the reproduction of music.

It should be noted that "rock" that is the contents of an item in the second layer match the contents of sub station 1, however, the contents of items layered in "search" need not always match the contents of sub station.

In "search", the audio content reproduction apparatus 10 itself executes the necessary classification and layering that are different from those made in advance. Whether or not to newly register the newly created classification and layering as a main station or a sub station is determined in "setting" to be described later.

It should be noted that if the user wants to exit "search" to shift a status to another main station, another sub station, "radio", or "setting", the user presses the reset key 23 to return to "root", thereby moving to a target status.

Setting:

"Setting" selects any of the capabilities of the audio content reproduction apparatus 10 in accordance with user preference and stores the contents of the selected "setting" in the audio content reproduction apparatus 10, thereby providing an operation environment easy to use by the user.

The following describes an example in which a status transition takes place to "setting". Referring to FIG. 3, a status transition to "setting" takes place when a status transition takes place from "search", namely, when a status transition is made by the "x" key 21 in the stage of "search".

When a status transition has taken place to "setting", navigation message "This is "setting"" is sounded.

At this moment, if the "o" key 20 is pressed or none of the keys has been pressed for 10 or more seconds after the end of the message, "setting" status is maintained, status transition taking place to "normal reproduction".

On the other hand, if the "x" key 21 is pressed during ten seconds after the end of message "This is "setting"", a status returns to main station 1.

After a status shifted to "normal reproduction", a navigation message indicative of what kind of reproduction "normal reproduction" is sounded, such as "Normal reproduction is set, as the point count increases, the reproduction is preferentially executed" for example.

If the "o" key 20 is pressed after the start of this navigation message or none of the keys has been pressed for a certain period of time (ten seconds for example) after the start of this navigation message, the setting of this "normal reproduction" becomes provisionally valid.

On the other hand, if the "x" key 21 is pressed after the start of navigation message "This is "setting"" and before passing of a certain period of time (ten seconds for example), a status transition takes place from "setting" to main station 1.

If any one of the above-mentioned key operations is executed (including no-operation), a status transition takes place to "random reproduction" for specifying a next setting.

When a status transition has taken place to "random reproduction", one or all of navigation messages indicative of what kind of reproduction "random reproduction" are sounded, such as "This is random reproduction: selection of music titles in sub station is randomly executed", "This is random reproduction: selection of sub station and music title is randomly executed", and "This is random reproduction: selection of music titles is completely randomly executed regardless of genre and age", for example, in this order if all of navigation messages are sounded.

If the "o" key 20 is pressed after the start of the above-mentioned navigation message or none of the keys has been operated for a certain period (ten seconds for example) after the start of the navigation message, then the setting of "normal reproduction" made last is canceled, thereby making the setting of "random reproduction" provisionally valid.

On the other hand, if the "x" key 21 is pressed after the start of the above-mentioned navigation message and before passing a certain period of time (less than ten seconds), the setting of "normal reproduction" made last remains valid, thereby canceling this setting of "random reproduction".

If any one of the above-mentioned key operations is executed (including no-operation), a status transition takes place to "repeat reproduction" for specifying a next setting.

It should be noted that, in "random reproduction", a random number is generated by the CPU 40 and a file name written to an address indicated by the generated random number is written as a content group or a content to be reproduced to the read sequence specification sequencer.

When a status transition has taken place to "repeat reproduction", one or all of navigation messages indicative of what kind of reproduction "random reproduction" are sounded, such as "This is repeat reproduction: a music title selected first is repetitively reproduced" and "This is repeat reproduction: music titles of a sub station selected first are sequentially repetitively reproduced", for example, in this order if all of navigation messages are sounded.

If the "o" key 20 is pressed after the start of the above-mentioned navigation message or none of the keys has been operated for a certain period of time (ten seconds for example) after the start of the above-mentioned navigation message, this setting of "repeat reproduction" is made valid.

On the other hand, if the "x" key 21 is pressed after the start of the above-mentioned navigation message and before passing a certain period of time (less than ten seconds for example) after the start of the navigation message, this setting of "repeat reproduction" is made invalid.

It should be noted that, if two or more of the above-mentioned settings are contradictory with each other at the same time ("normal reproduction" and "random reproduction" for example), the contents of the setting made valid last after exiting "setting" are used, if two or more of the above-mentioned settings are not contradictory ("normal reproduction" and "repeat reproduction" for example), then the both settings are made valid. Also, it should be noted that, when the power is on, "normal reproduction" is made valid. If all settings are invalid, "normal setting" is made valid.

Although not shown in FIG. 3, the present embodiment has, with respect to "setting", a capability of setting registration of a group to which a music title reach by "search" belongs newly as sub station or main station, a capability of setting equalizer characteristics, a capability of setting enabling/disabling telephone interrupt, a capability of setting rules of point count addition and subtraction, a capability of setting a predetermined wait time for a transition to move to a next status, and a capability of setting "takeover" conditions.

When the above-mentioned settings have all been made valid or invalid as described above, a status transition takes place to main station 1.

Use of Point Count:

In an initial setting status or if "normal reproduction" is set in "setting", a point count plays an important role. As the number of points increases, it indicates that the preference of the user of the audio content reproduction apparatus 10 for that music title and the sub station, main station, and preset to which that music title belongs is high, so that the music title and the preset can be reached easily and quickly.

Namely, the point count in the present embodiment is indicative of one form of a reproduction situation of content (music titles) belonging to each of content groups (or sub groups) or a reproduction situation of content groups (or sub groups) belonging to each of content groups (or main groups). In accordance with a point count corresponding to this reproduction situation, the reproduction priority of content groups or the reproduction priority of content is varied.

To be more specific, in the present embodiment, a music title having the highest point count is the first music title, other music titles being subsequently arranged in each sub station in a descending order of point counts.

A total number of points of all music titles or an average thereof (a value obtained by dividing the total number of points by the number of music titles belonging to a sub station) in each sub station is the point count of that sub station. The sub station having the highest point count is "sub station 1", other sub stations subsequently being arranged in each main station in a descending order of point counts.

A total number of points or an average of the music titles belonging to a main station is the point count of that main station. The main station having the highest point count is "main station 1", other main stations being subsequently arranged in a descending order of point counts.

As shown in FIG. 5, the replacement of the sequences of main station 1 through main station 16, sub station 1 through sub station 16, and music title 1 through music title 16 is executed on the basis of the point counts obtained as described above.

In the present embodiment, also in "radio", a preset having the highest point count is "preset 1", other presets being subsequently arranged in "radio" in a descending order.

It should be noted that, if an increase or a decrease occurs in point count, the rearrangement of the order is executed after the status exits that layer. This prevents a trouble from happening in which, when a transition to a next status occurs, a music title with the point count decreased immediately before is accessed again, a phenomenon that is encountered when there occurs a change in point count.

To be more specific, immediately after exiting sub station 1, the rearrangement of the order of the music titles is executed in the sub station 1, immediately after exiting main station 1, the rearrangement of the order of the sub stations is executed in the main station, immediately after exiting the main station, the rearrangement of the order in the main station is executed, and immediately after exiting "radio", the rearrangement of the order of presets is executed.

Detail Explanation of One Embodiment:

The status transitions in the audio content reproduction apparatus 10 in one embodiment have been described above with reference to FIG. 3. The following describes more specifically how to control the content data store section and the content reproduction section of the audio content reproduction apparatus 10 having the configuration shown in FIG. 1, thereby causing the above-described status transitions, with reference to the flowcharts shown in FIGS. 6 through 13 and FIGS. 15 through 26. It should be noted that hardware units associated with steps in these flowcharts will also be described along with the processing to be executed in these steps.

Figure 6:
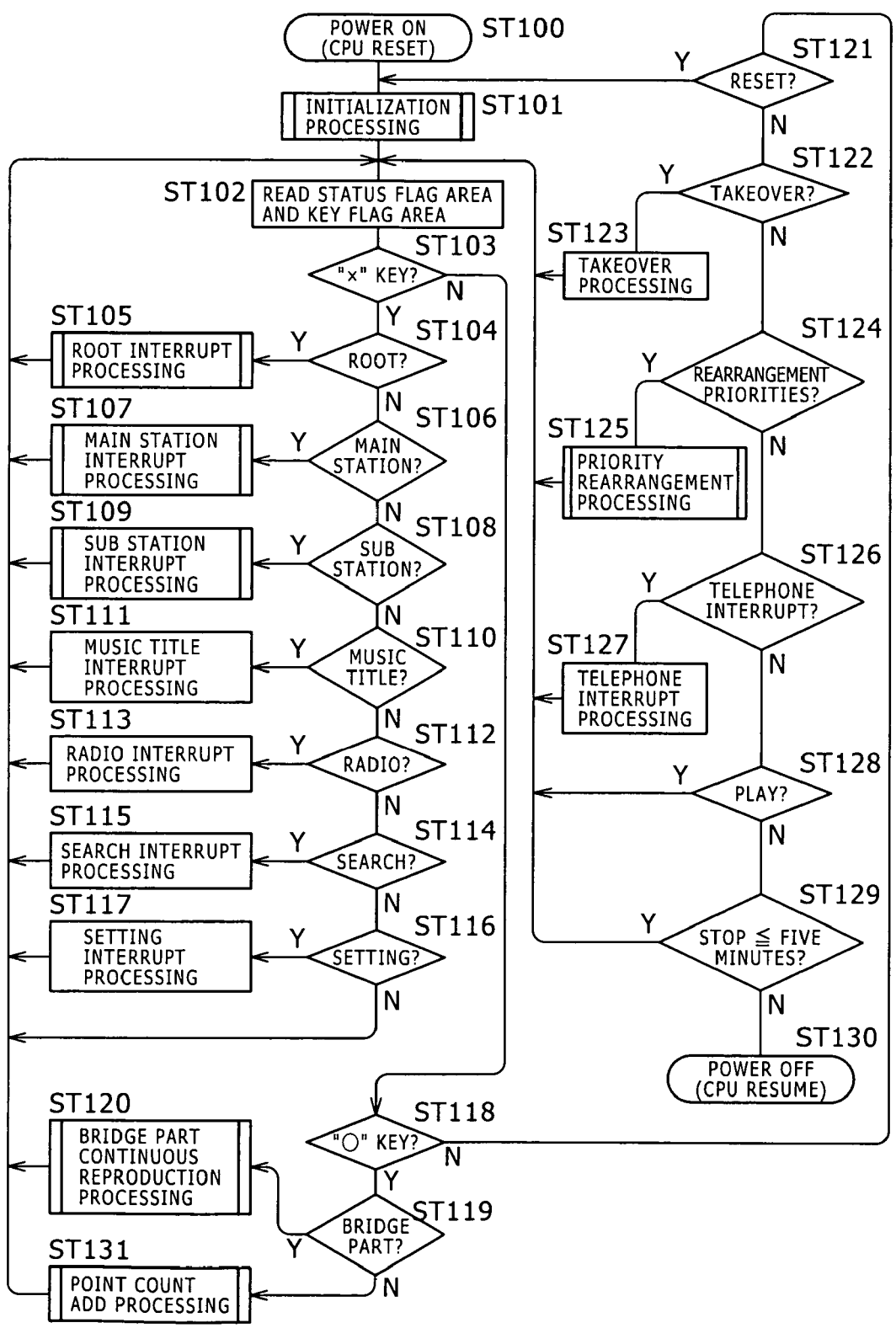
FIG. 6 is a flowchart indicative of normal processing according to an embodiment of the present invention.
Figure 7:
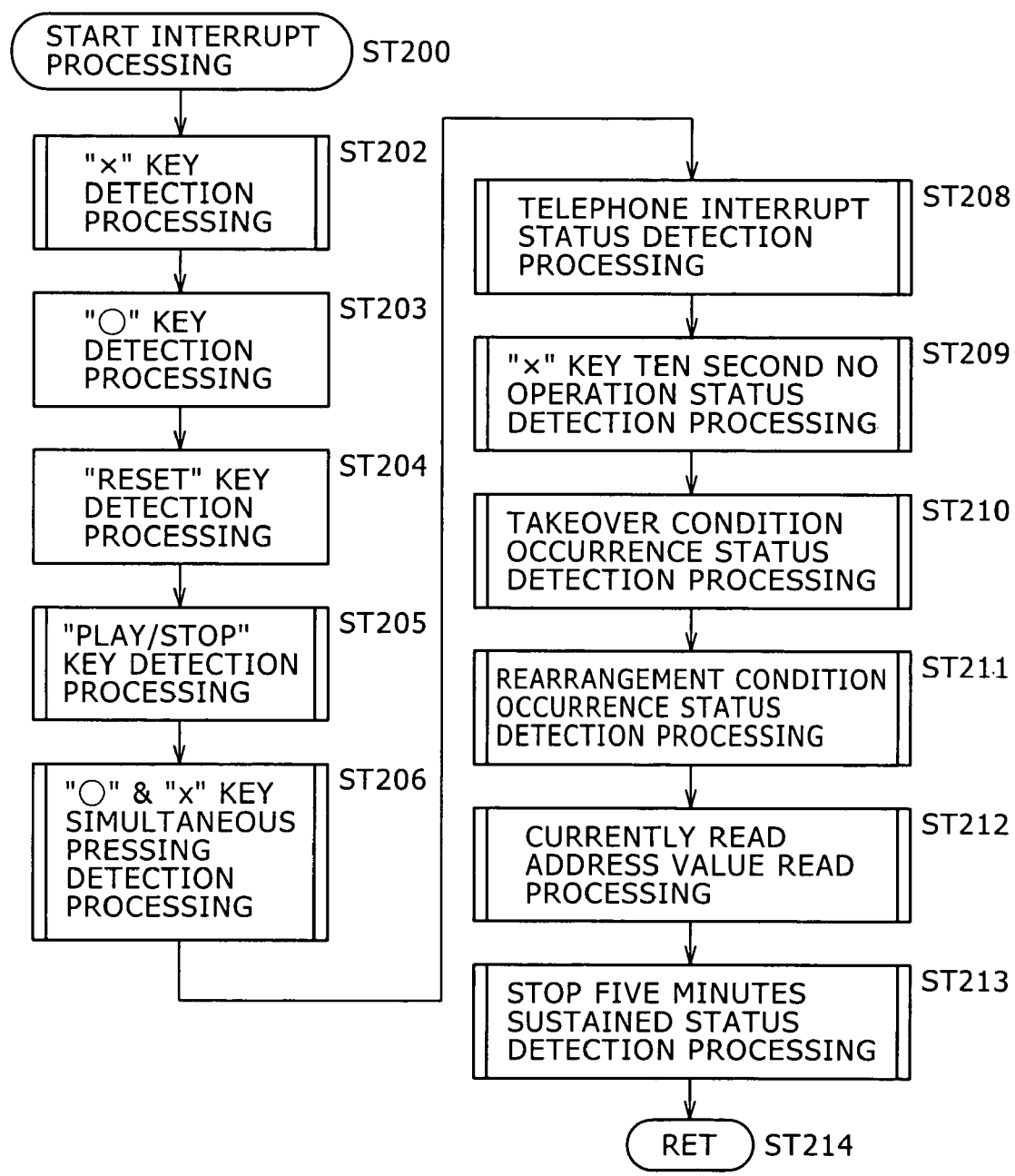
FIG. 7 is a flowchart indicative of interrupt processing according to an embodiment of the present invention.

Referring to FIG. 6, there is outlined a processing routine for normal processing in the CPU 40. Referring to FIG. 7, there is outlined an interrupt processing routine.

The routine for normal processing shown in FIG. 6 forms a loop and therefore is always executed except that it is interrupted by interrupt processing.

On the other hand, the interrupt processing shown in FIG. 7 is based on hardware timer interrupt, in which interrupt timing is controlled by interrupt signal Int generated by the interrupt signal generator circuit 49. To be more specific, every time interrupt signal Int is generated, the interrupt terminal of the CPU 40 is controlled to start the processing from an address of the PC (Program Counter) written to a hardware interrupt table area arranged in the CPU 40 in advance.

This interrupt processing includes a plurality of processing operations for detecting from a key signal the operation of plural keys to generate a key flag ("x" key detection processing, "o" key detection processing, reset key detection processing, play/stop key detection processing, and "x" & "o" keys simultaneously pressing detection processing) and a plurality of processing operations for detecting various operation statuses to generate status flags (telephone interrupt status detection processing, "x" key ten seconds no-operation status detection processing, takeover condition occurrence detection processing, currently read address value read processing, status flag area storage area processing, and stop five minutes sustained status detection processing).

Therefore, an interrupt interval is determined by considering normal person's key operation speed and ability of detecting content instantaneous discontinuation. Because the CPU 40 is able to process instructions equal to the number obtained by dividing the interrupt interval by the period of master clock Mck, the period of master clock Mck is selected so as to end all processing operations in the interrupt interval within this interrupt time.

Normal Processing:

First, a processing routine for normal processing shown in FIG. 6 will be described. Detail description of each sub routine that is referenced in the normal processing will be made in a batch. Therefore, the following outlines each of the sub routines in a necessary range.

The normal processing may be outlined that the CPU 40 detects the statuses of key flag and status flag which were generated by the interrupt processing to determine how a next status transition is executed and writes a result of this decision to the read sequence specification sequencer of the data storage controller 46. In addition, the normal processing includes radio interrupt processing, search interrupt processing and setting interrupt processing to be executed when the "x" key 21 is pressed in each stage and takeover processing to be executed when a takeover operation occurs, priority rearrangement processing to be executed to update reproduction priority, and telephone interrupt processing to be executed when an interrupt is caused from a telephone.

When the battery 50 is loaded for the first time, a Reset signal of the power-on reset circuit 47 controls the reset terminal of the CPU 40 to write a start interrupt address written to an interrupt table to the program counter of the CPU 40, upon which the normal processing starts (step ST100).

If the play/stop key 22 is pressed with the CPU 40 in the resumed mode, the CPU 40 returns from the resume mode to the normal operation mode to control the power supply block 51. Then, the power is supplied to each component unit of the audio content reproduction apparatus 10, upon which the start interrupt address is written to the program counter of the CPU 40, thereby starting the processing (step ST100).

Next, the procedure goes to initialization processing (step ST101) to start initialization processing. In this processing, the following processing operations are executed.

A key flag area to which whether or not each key has been operated is written is initialized. Also, a status flag area to which various statuses including a current reproduction status are written is initialized. In addition, Bluetooth module initialization, IEEE 1394 initialization, and audio CODEC initialization are executed. It should be noted that the key flag area and the status flag area are arranged at predetermined positions in the RAM 41.

As the last step of the initialization routine, the sequence of content to be read is specified into the read sequence specification sequencer of the data storage controller 46, upon which control is returned to the normal processing routine.

Next, reading of the status flag area and the reading of the key flag area are executed (step ST102).

The reading of the status flag area indicates where the reproduction status of current content has shifted in each stage of the following normal processing, whether a telephone interrupt status has been entered, whether a "x" key ten seconds no-operation status has been entered, whether a takeover condition has occurred, whether a play status has been entered, and whether stop is sustained for five minutes. Also, reading the key flag area in each stage of the normal processing indicates how each key has been operated.

Next, the CPU 40 determines whether the "x" key 21 has been pressed (step ST103).

If the "x" key 21 is found pressed (namely, if the most significant bit (MSB) of the "x" key flag is "1"), the procedure moves to step ST104, otherwise, the procedure moves to step ST118. The following describes the processing subsequent to step ST104 and then the processing subsequent to step ST118.

Processing to be Executed if "x" Key Operation is Detected:

In step ST104, whether the status is "root" is determined by checking the status flag ("root" status if the most significant bit of the root status flag is "1").

If the status is found to be "root", then the procedure moves to root interrupt processing (step ST105). This allows the user who wants to shift the status directly to main station without hearing greetings to do so.

On the other hand, if the status is found not to be "root", then the procedure goes to a next step.

Next, the status flag is checked to determine whether the status is a main station navigation message (if the most significant bit of the main station status flag is "1" and the lower 8 bits (or the 8 bits from the least significant bit (LSB) inclusive) are "0"s (binary), it indicates the status in which a main station navigation message is reproduced) (step ST106).

If the status is found to be the stage of main station navigation message status, then the procedure moves to main station interrupt processing (step ST107). Namely, the procedure moves to the next main station. If this main station is the last main station, the status moves to "radio".

On the other hand, if the status is found not to be a main station navigation message, then the procedure moves to the step.

Next, the status flag is checked to determine whether the status is a sub station navigation message (the most significant bit of the sub station status flag is "1" and the least significant bit is "1", it indicates the status in which a sub station navigation message is reproduced) (step ST108).

If the status is found to be a sub station navigation message, then the procedure moves to sub station interrupt processing (step ST109). Namely, the status moves to the next sub station. If the sub station is the last sub station, the status moves to the navigation message of sub station 1.

On the other hand, if the status is not to be a sub station navigation message, then the procedure moves to a next step.

Next, the status flag is checked to determine whether the status is music reproduction (a music reproduction status if the most significant bit of the music status flag is "1") (step ST110).

If the status is found to be music reproduction, then the procedure moves to music interrupt processing (step ST111). Namely, the procedure moves to a next music title. If the music title is the last one, then the status shifts to the beginning (or a navigation message) of the sub station to which that music title belongs.

On the other hand, if the status is found not to be music reproduction, the procedure moves to a next step.

Next, the status flag is checked to determine whether the status is the reproduction of a radio navigation message (the most significant bit of the radio status flag is "1" and 2SB is also "1") (step ST112).

If the status is found to be the reproduction of a radio navigation message, then the procedure moves to radio interrupt processing (step ST113). Namely, the procedure moves to a next preset.

On the other hand, if the status is found not to be the reproduction of a radio navigation message, the procedure moves to a next step.

Next, the status flag is checked whether the status is "search" (the most significant bit of the search status flag is "1" and 2SB is also "1") (step ST114).

If the status is found to be "search", then the procedure moves to "search" interrupt processing (step ST115). Namely, the procedure moves to a next item in the same layer.

On the other hand, if the status is fount not to be "search", then the procedure moves to a next step.

Next, the status flag is checked to determine whether the status is "setting" (the most significant bit of the setting status flag is "1" and 2SB is also "1") (step ST116).

If the status is found to be "setting", then the procedure moves to "setting" interrupt processing (step ST117). Namely, the procedure moves to a next item in the same layer in "setting".

On the other hand, if the status is fount not to be "setting", then the procedure moves to step ST102. If each of the above-mentioned interrupt processing operations has been completed, the procedure moves to step ST102.

Processing to be Executed if "x" Key has Not Been Detected:

If the "x" key 21 is found not pressed (the most significant bit of the "x" key flag is "0") in step ST103, then the procedure moves to step ST118.

In step ST118, it is determined whether the "o" key 20 has been pressed.

If the "o" key 20 is found pressed (the most significant bit of the "o" key flag is "1") and it is determined whether the status is the reproduction of a bridge part (the most significant bit of the bridge part status flag is "1") (step ST119). If the status is found to be a bridge part, then the procedure moves to bridge part continuous reproduction processing (step ST120), thereby reproducing a music title starting from the bridge part thereof.

On the other hand, if the status is found not to be a bridge part (the most significant bit of the bridge part status flag is "0"), then the procedure moves to point count add processing and establishing processing (step ST131). When the above-mentioned processing has been completed, the procedure moves to step ST102.

On the other hand, if the "o" key 20 is found not pressed in step ST118, then the procedure moves to a next step.

Processing to be Executed if the "x" Key 21 and the "o" Key 20 are Found Not Pressed:

First, the "reset" key flag is checked to determine whether the reset key 23 has been pressed (step ST121).

If the reset key 23 is found pressed, the procedure moves to the initialization step (step ST101).

On the other hand, if the reset key 23 is found not pressed, then the procedure moves to a next step.

Next, the status flag is checked to determine whether "takeover" has occurred (step ST122).

If "takeover" is found caused (the most significant bit of the takeover status flag is "1"), the procedure moves to takeover processing and, depending on the nature of "takeover", the transition of reproduction status takes place (step ST123).

On the other hand, if a "takeover" condition is not found caused, then the procedure moves to a next step.

Next, the status flag is checked to determine whether a priority rearrangement condition has occurred (step ST124).

If a priority rearrangement condition is found caused (the most significant bit of the priority rearrangement status flag is "1"), the procedure moves to priority rearrangement processing (step ST125).

In priority rearrangement processing, a necessary range of rearrangement is identified by the priority rearrangement status flag. Namely, if a status transition takes place from one sub station to another, the music titles belonging to the source sub station are rearranged; if a status transition takes place from one sub station to a main station, the sub stations belonging to the source main station are rearranged; and if a status transition takes place from a main station to "radio", the main stations are rearranged in priority.

On the other hand, if a priority rearrangement condition is found not caused, then the procedure moves to a next step.

Next, the status flag is checked to determine whether a telephone interrupt has been caused (the most significant bit of the telephone interrupt status flag is "1") (step ST126).

If a telephone interrupt is found caused, then the procedure moves to telephone interrupt processing (step ST127). In this processing, if a telephone interrupt has been caused, simultaneously pressing the "o" key 20 and the "x" key 21 allows the user to answer the telephone call.

On the other hand, if a telephone interrupt is found not caused, then the procedure moves to a next step.

Next, the status flag is checked to determine whether the play status is on (the most significant bit of the play status flag is "1") (step ST128).

If the play status is found to be on, then the procedure moves to step ST102.

On the other hand, if the play status is found not to be on, it indicates that a stop status is on, so that the procedure moves to a decision processing (step ST129) whether the stop status is less than five minutes.

In step ST128, it is determined whether an uninterrupted stop status is less than five minutes (the most significant bit of the stop five minutes status flag is "0"), if the status is found to be less than five minutes, the procedure moves to step ST102. If the status is found not to be less than five minutes (the most significant bit of the stop five minutes status flag is "1"), the procedure moves to power-off processing (step ST130). It should be noted that, in the power-off status, the CPU 40 is in the resume mode for power saving. In the resume mode, if the play/stop key 22 is pressed, the pressed can be detected, so that the power-on status is entered again. It should be noted that, in the above-mentioned processing, if the reset status is detected or the stop status continues for five minutes or more, the procedure moves to step ST102.

It should be noted that, in the above-mentioned normal processing steps shown in FIG. 6, the processing is executed in a cascade manner, however, the sequence of these steps shown in FIG. 6 is not limited to that mentioned above. Therefore, the sequence of these steps may be changed from time to time to achieve the same effects as a whole as those mentioned above with reference to FIG. 6.

The following describes each of normal processing sub routines.

Figure 8:
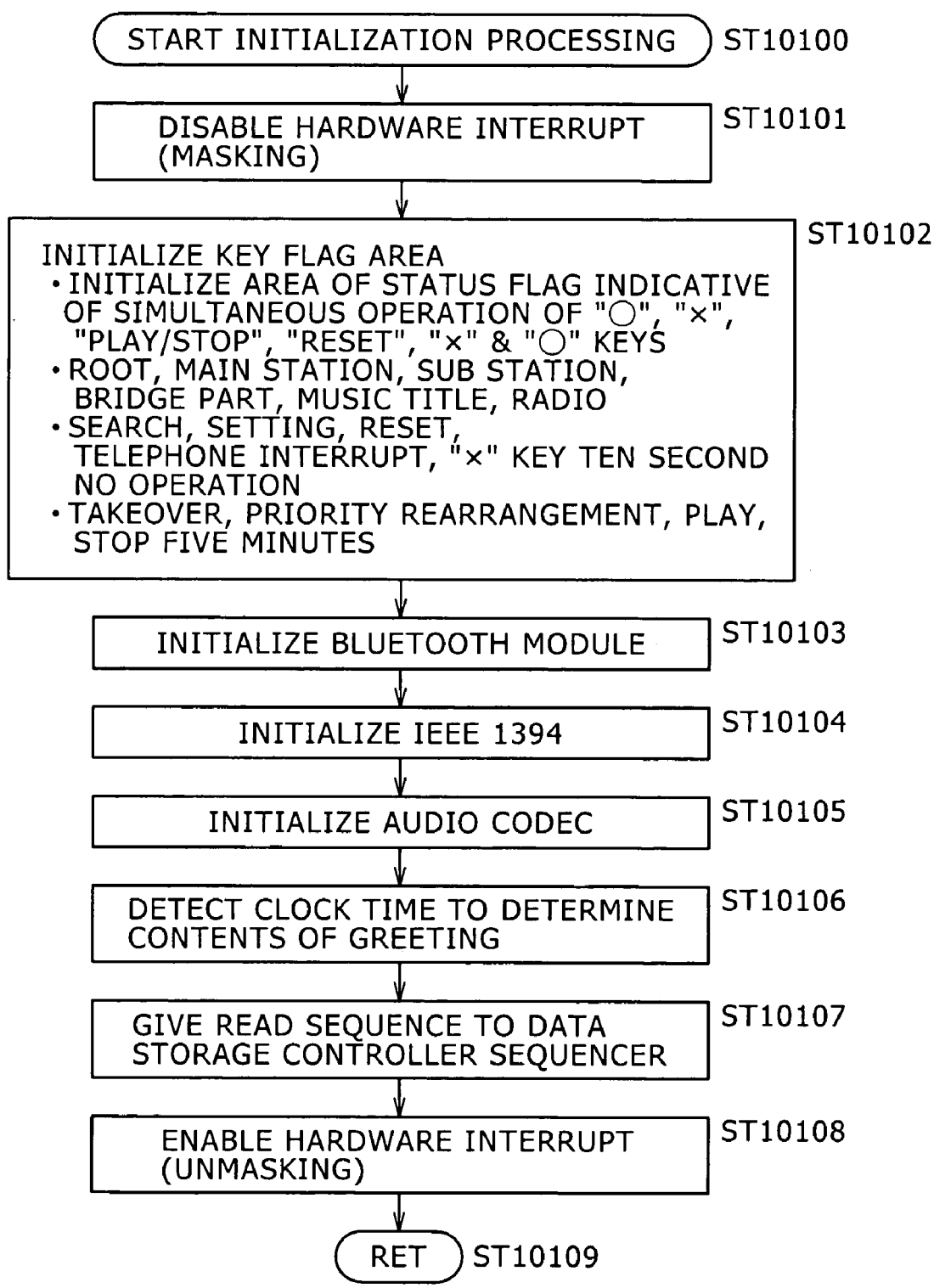
FIG. 8 is a flowchart indicative of initialization processing according to an embodiment of the present invention.
Figure 9:
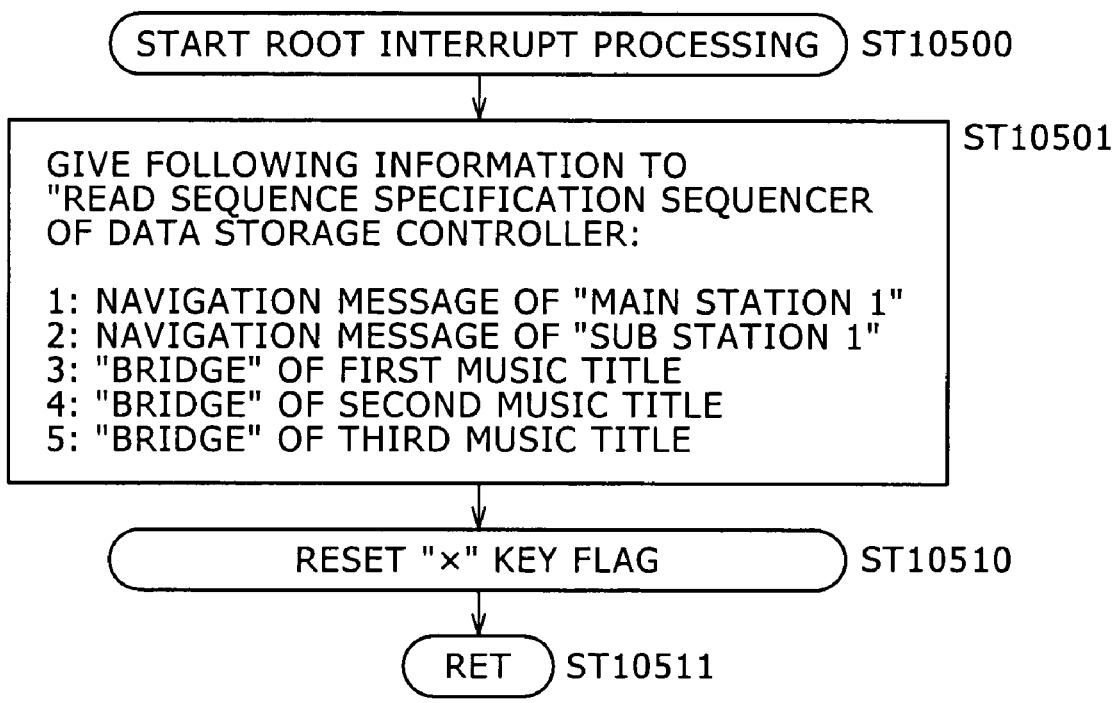
FIG. 9 is a flowchart indicative of root interrupt processing according to an embodiment of the present invention.
Figure 10:
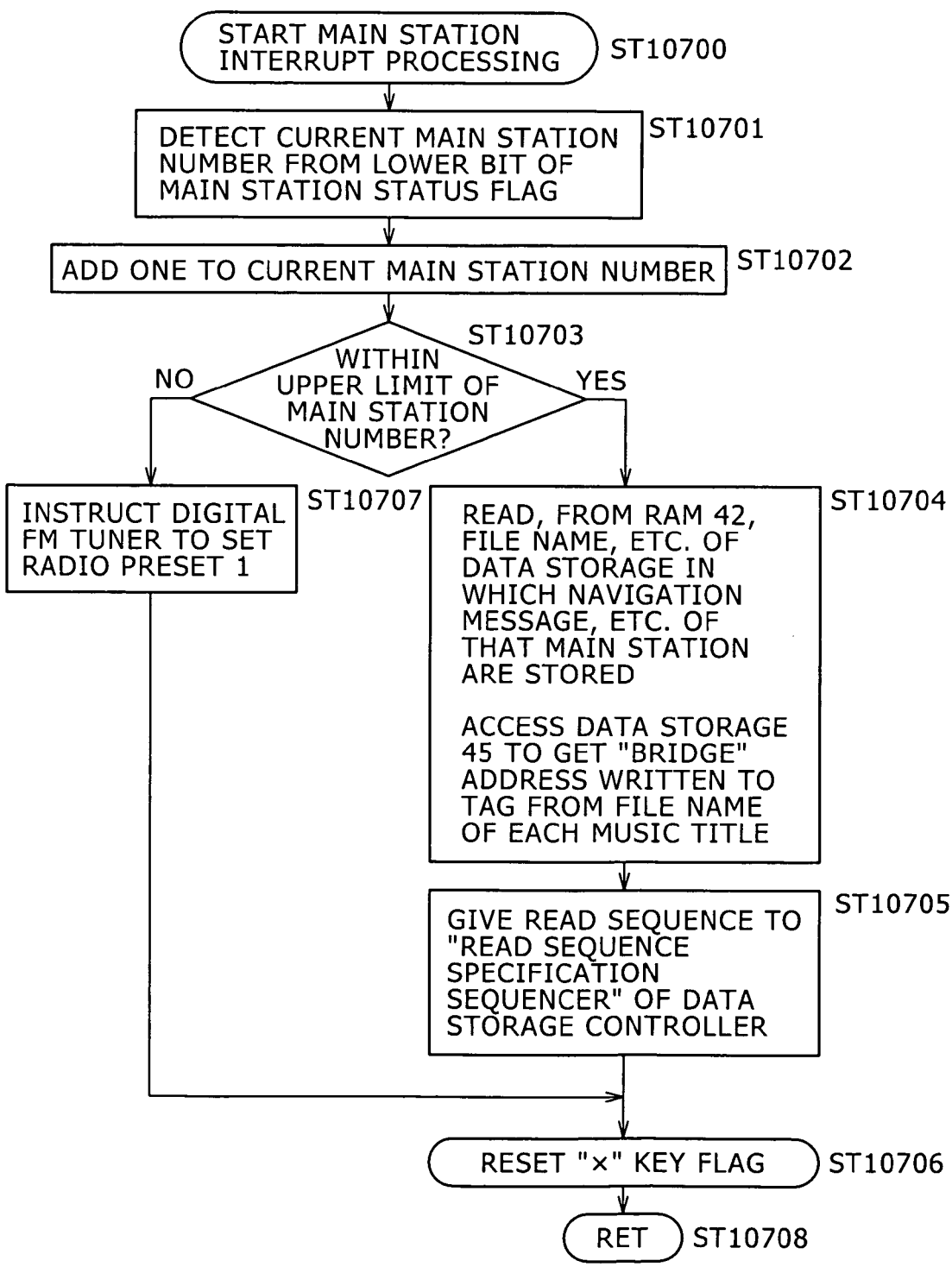
FIG. 10 is a flowchart indicative of main station interrupt processing according to an embodiment of the present invention.
Figure 11:
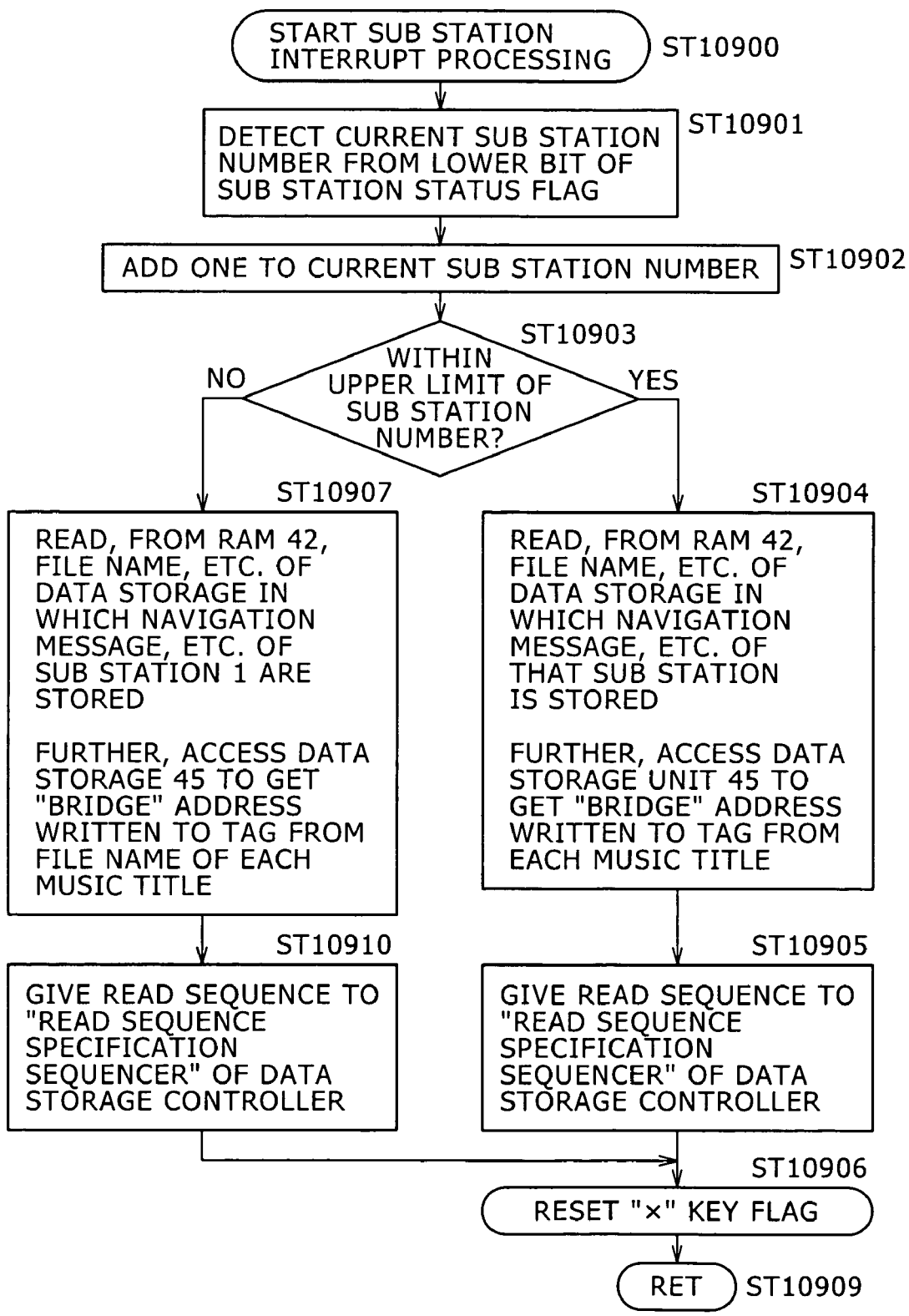
FIG. 11 is a flowchart indicative of sub station interrupt processing according to an embodiment of the present invention.
Figure 12:
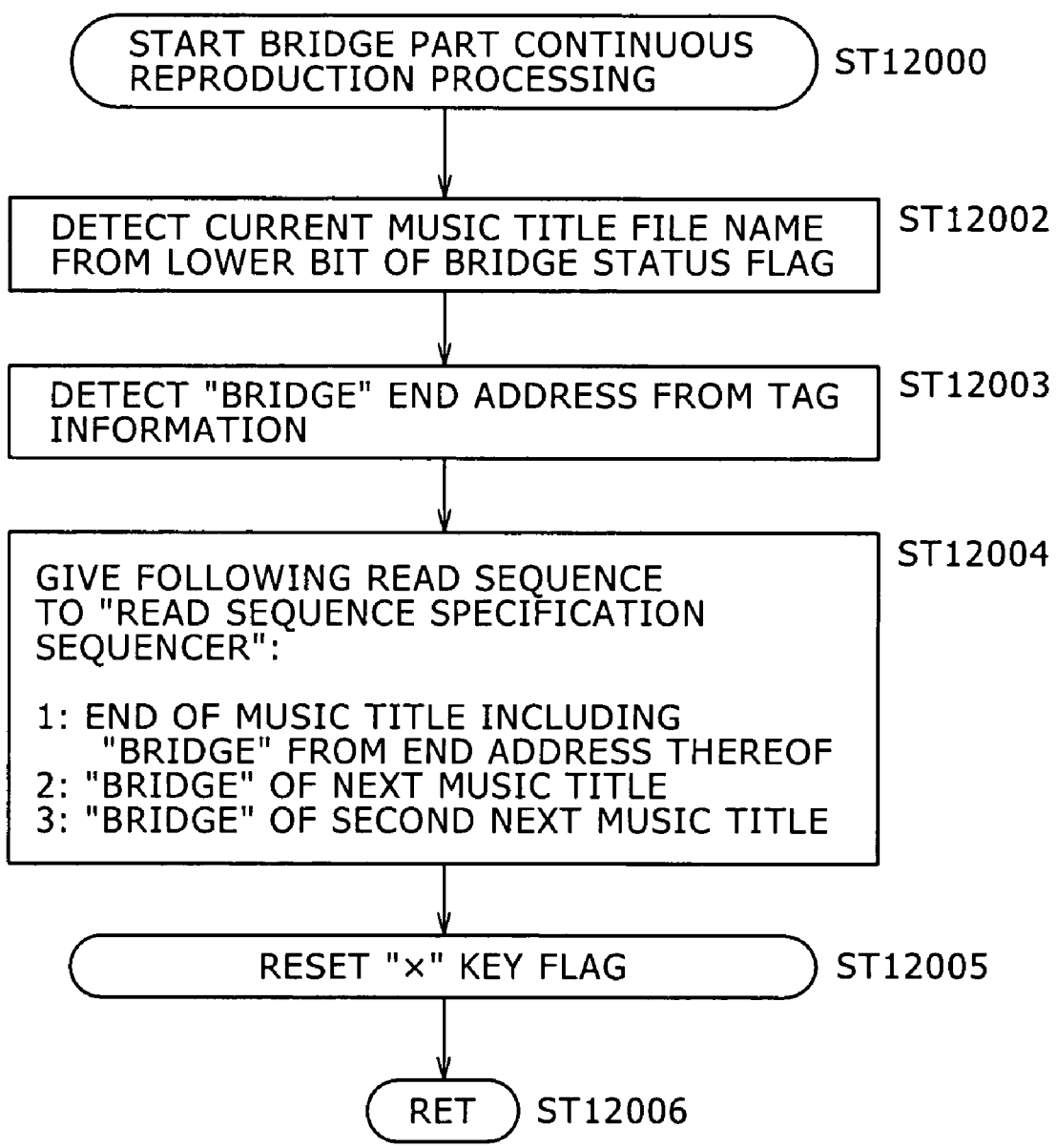
FIG. 12 is a flowchart indicative of bridge continuous reproduction processing according to an embodiment of the present invention.
Figure 13:
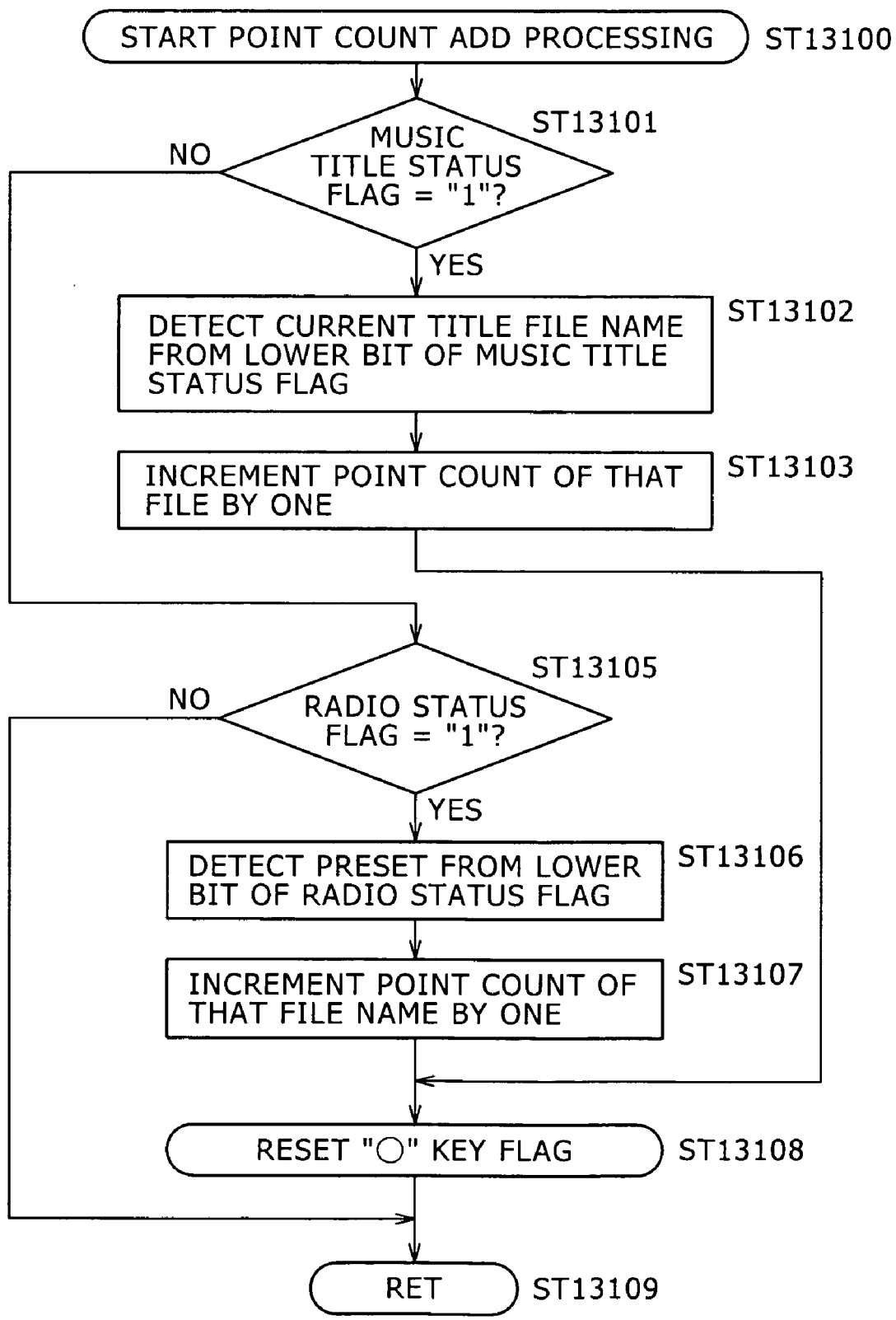
FIG. 13 is a flowchart indicative of point count add processing according to an embodiment of the present invention.
Figure 15:
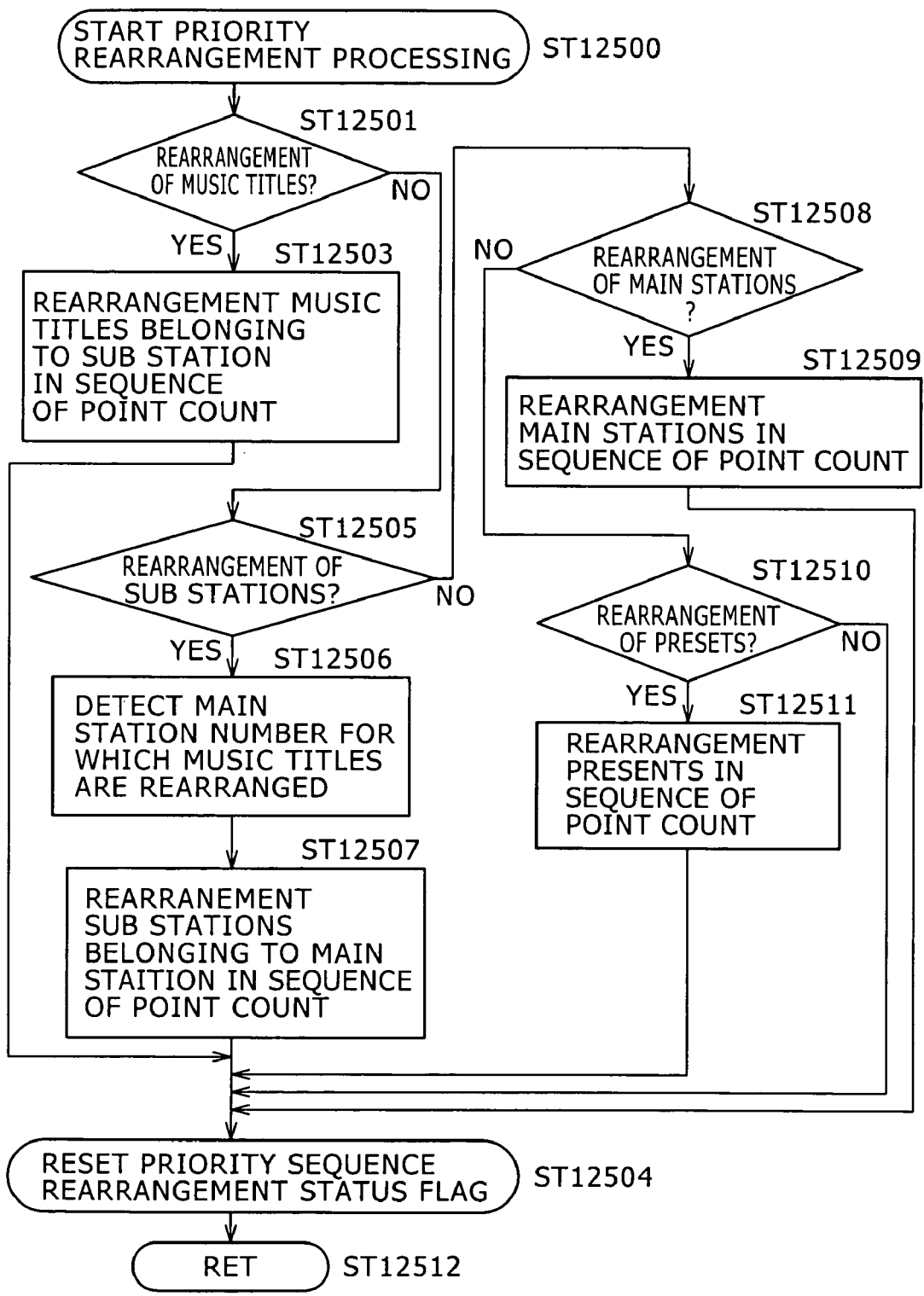
FIG. 15 is a flowchart indicative of priority rearrangement processing according to an embodiment of the present invention.
Figure 16:
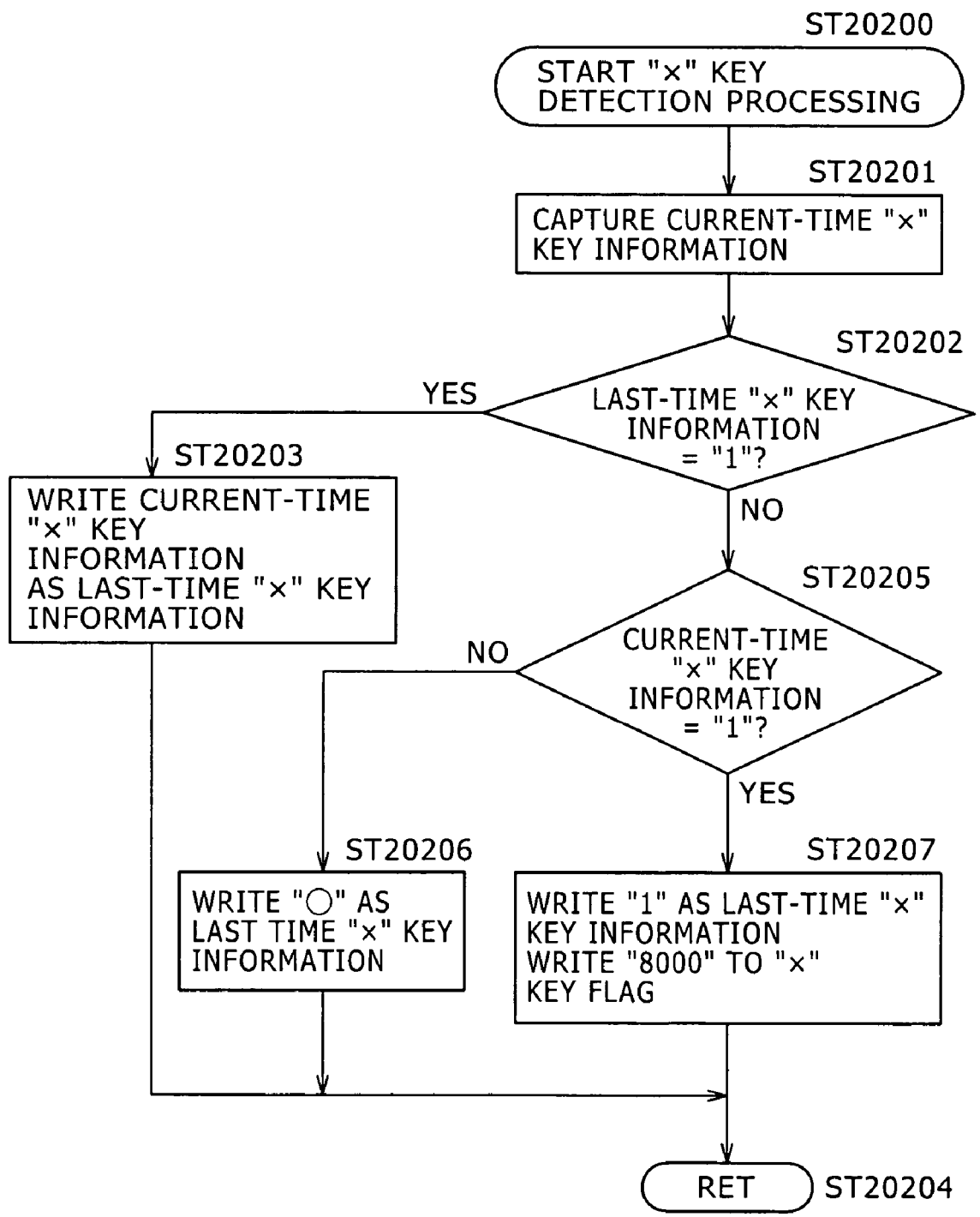
FIG. 16 is a flowchart indicative of "x" key detection processing according to an embodiment of the present invention.
Figure 17:
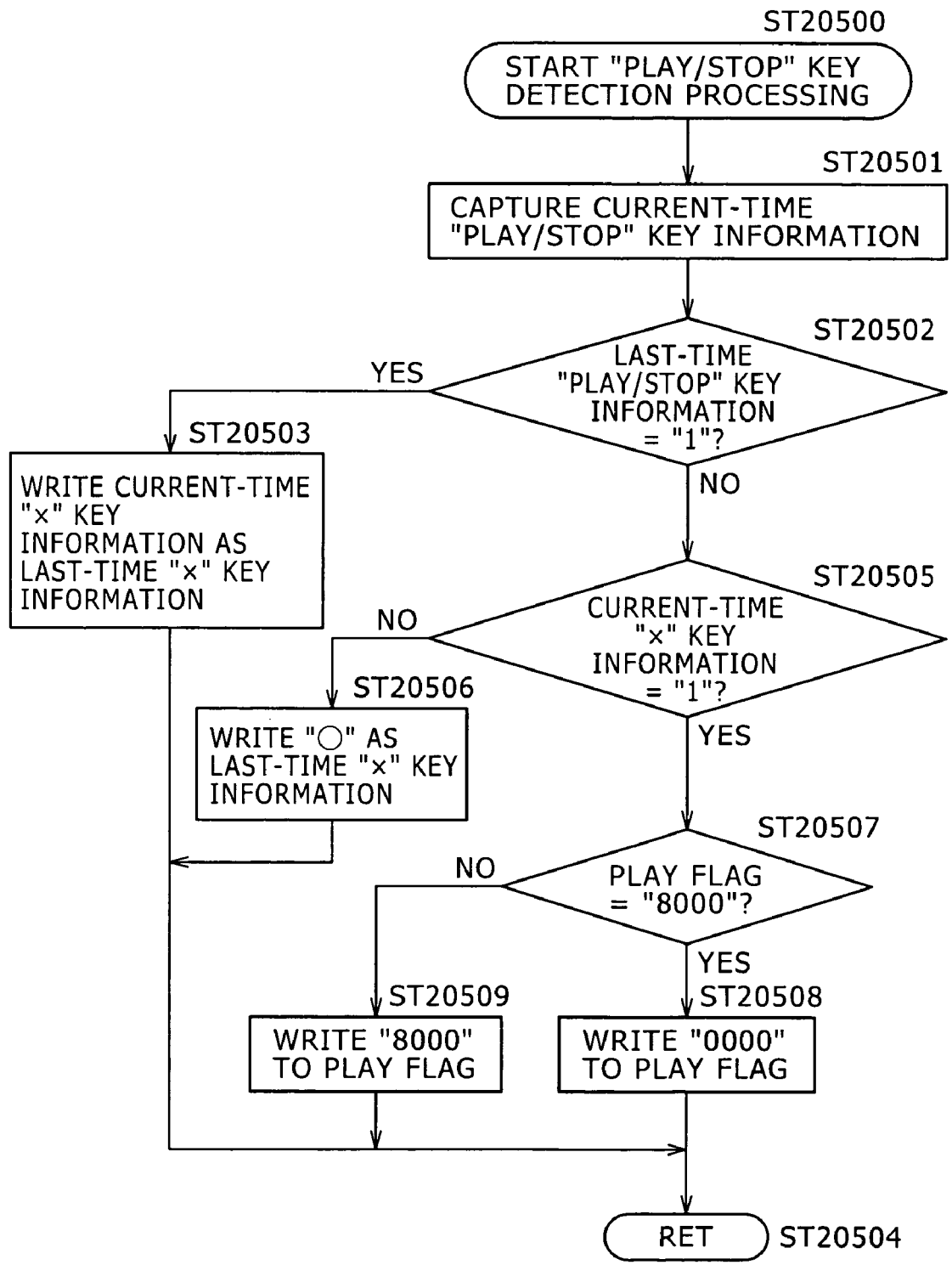
FIG. 17 is a flowchart indicative of play/stop key detection processing according to an embodiment of the present invention.
Figure 18:
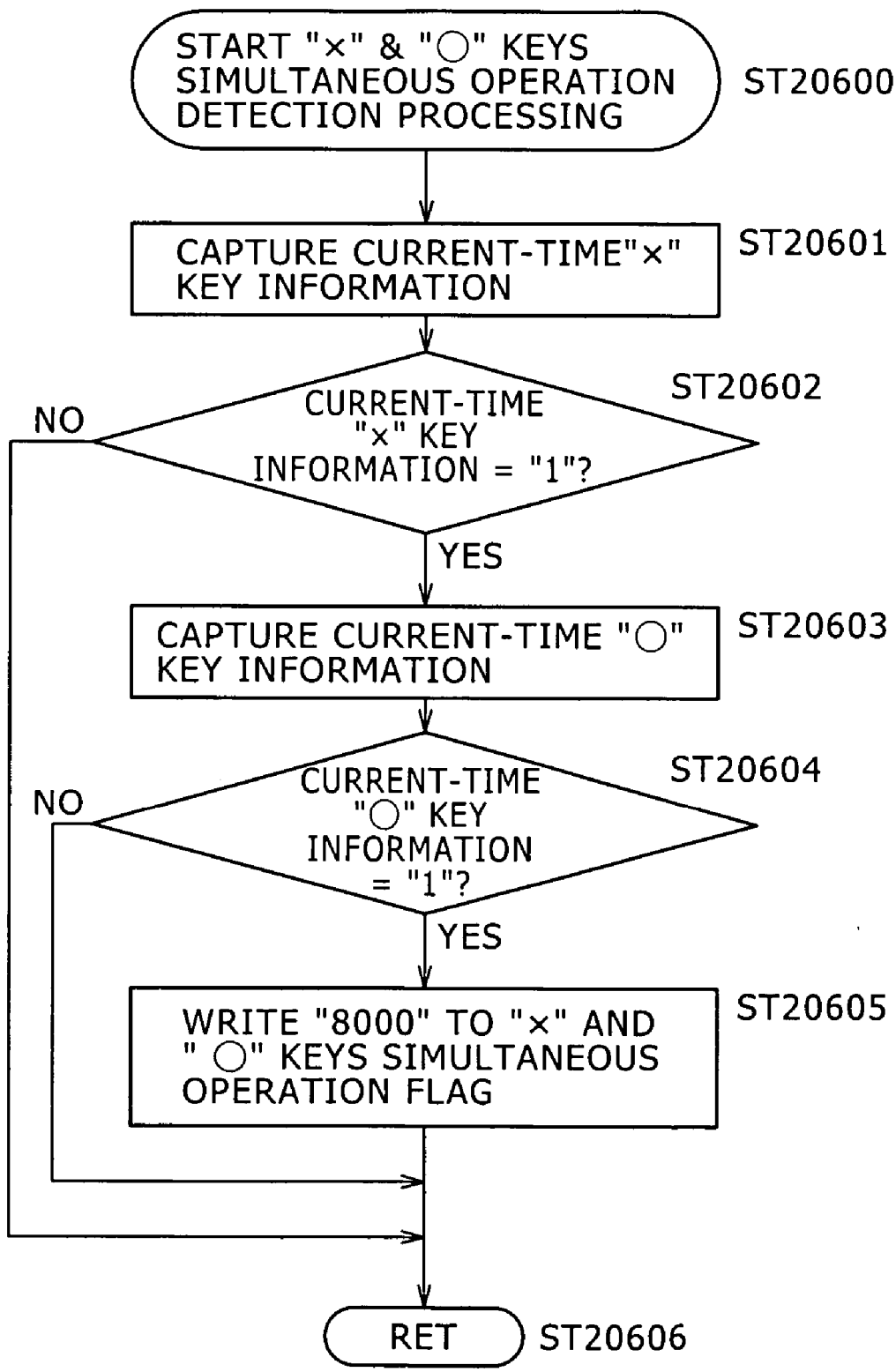
FIG. 18 is a flowchart indicative of "x" & "o" keys simultaneous pressing detection processing according to an embodiment of the present invention.
Figure 19:
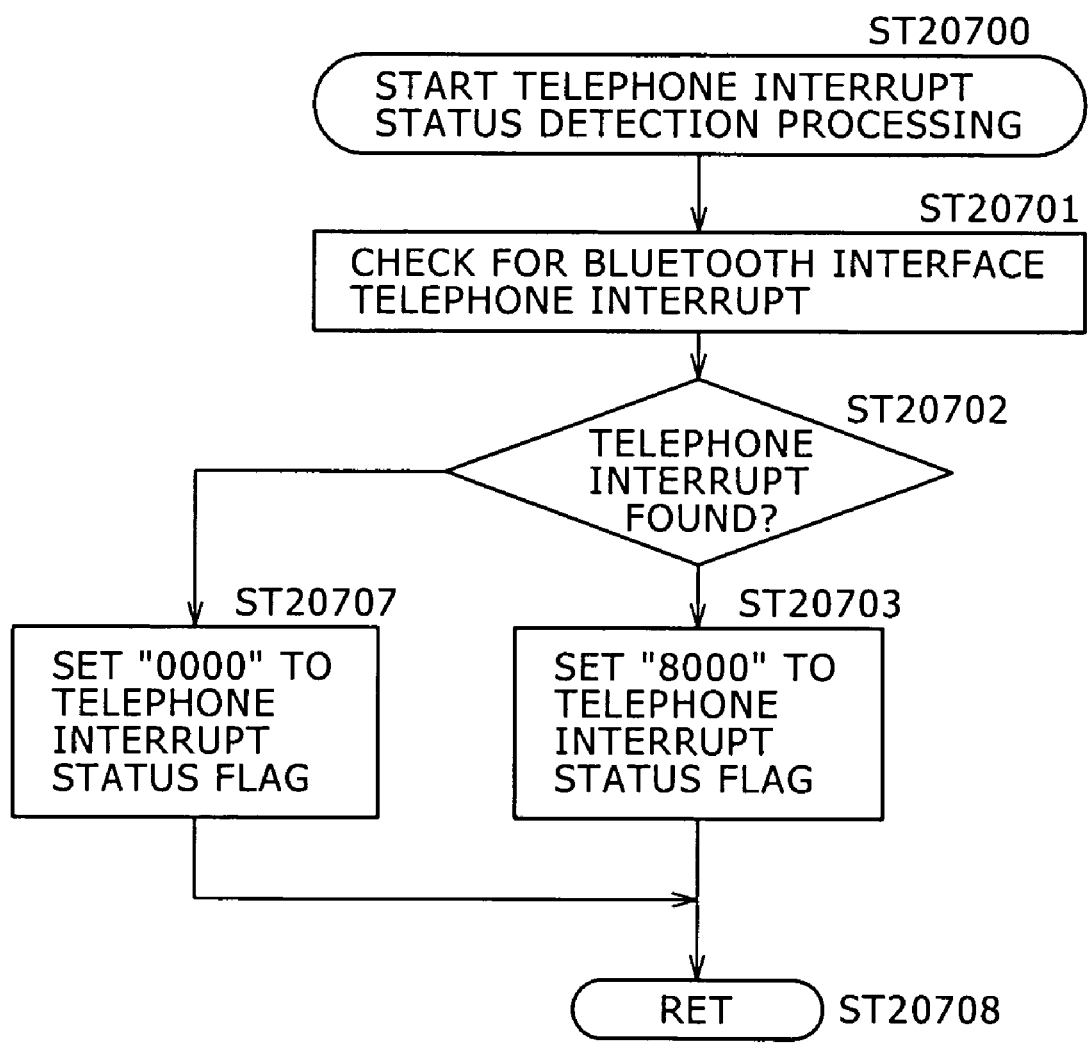
FIG. 19 is a flowchart indicative of telephone interrupt processing according to an embodiment of the present invention.
Figure 20:
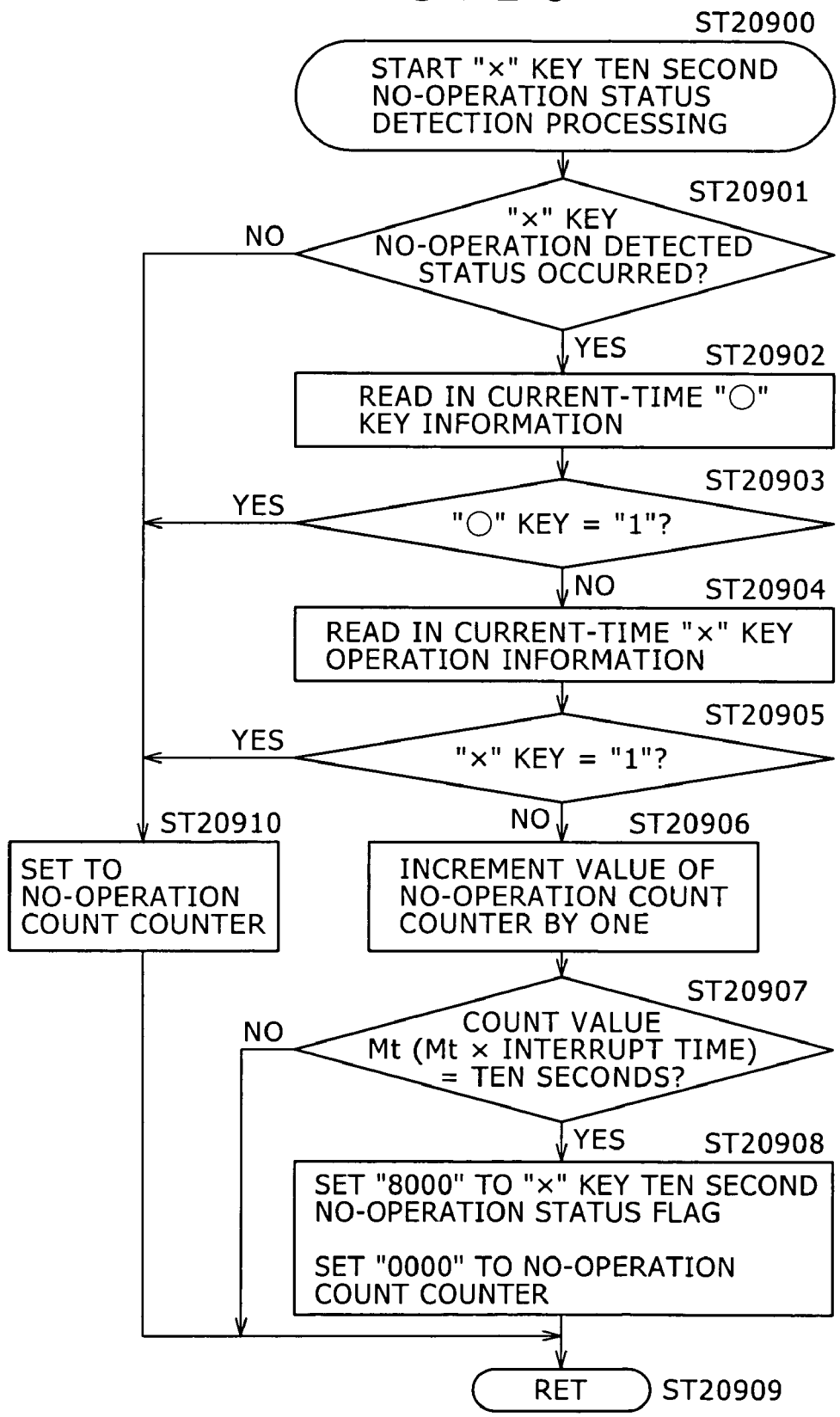
FIG. 20 is a flowchart indicative of "x" key ten second no-operation status detection processing according to an embodiment of the present invention.

Initialization Processing (Step ST101, Refer to FIG. 8):

The following describes in detail initialization processing (step ST101) with reference to FIG. 8.

First, the procedure moves to the start of initialization processing (step ST10100).

Then, a hardware interrupt is disabled, namely, interrupt signal Int and reset signal Reset is masked, thereby preventing the interrupt processing from being executed by any signal (step ST10101).

Next, the key flag area and the status flag area are initialized (step ST10102). It should be noted that predetermined locations in the RAM 41 are allocated to the key flag area and the status flag area. The key flag area is written with a status of each key every time an interrupt is caused. Initially, the setting value of each key flag made up of 16 bits is "0000" (hexadecimal notation). In the initialization of the status flag, "8000" is written to the root status flag, "0000" (hexadecimal notation) being written to the others.

Next, the Bluetooth module is initialized (step ST10103), the IEEE 1394 is initialized (step ST10104), and the audio CODEC is initialized (step ST10105), thereby enabling mutual communication between in the audio content reproduction apparatus 10 and the mutual communication between the audio content reproduction apparatus 10 and external devices.

Next, the time given by a clock arranged on the power supply block 51 is detected to classify the detected time into one of time zones, morning, noon, evening, night, midnight, and early morning, thereby determining greetings accordingly (step ST10106).

Next, as the last step of the initialization routine, the sequence of content to be read to the read sequence specification sequencer of the data storage controller 46 is specified (step ST10107). The sequence to be set to the read sequence specification sequencer is set as follows.

1: Message, such as "Good morning" created according to the current time

2: navigation message of "Main station 1"

3: navigation message of "Sub station 1"

4: "bridge" of first music title

5: "bridge" of second music title

6: "bridge" of third music title

7: ...

It should be noted that a range of contents that is to be sent to read sequence specification sequencer is dependent on the capability thereof. In principle, the contents up to the completion of a sequence of predetermined reproducing operations are written to the sequencer. In the above-mentioned example, subsequent to seven ("7"), the bridge of the 14th music title is written, followed by the file names of the content of the first music title through the 14th music title sequentially. If the repeat reproduction for the first music title through the 16th music title is selected, this selection is sent to the read sequence specification sequencer to set the repeat reproduction of the first music title through the 14th music title to the sequencer.

However, because the contents to be reproduce are subject to change by the operation of the "x" key 21 or a takeover operation halfway in the reproduction and the CPU 40 is able to update the contents of the read sequence specification sequencer, from time to time during interrupt processing, the contents may only be written in a range that will not discontinue the reproduction.

Because the location at which the file names of message "Good morning", navigation message "main station 1", and navigation message "sub station 1" are predetermined (refer to FIG. 5), the user is easily able to access these pieces of content. For the bridge of the first music title, the location at which the file name of the first music title is predetermined (refer to FIG. 5), so that the user is easily able to know the storage location of that file. Further, from the tag information associated with this file name, the user is able to get a bridge address (refer to FIG. 4) and write the file name of this music title and its bridge address (or the time information in that music title) to the read sequence specification sequencer of the data storage unit 45, thereby easily accessing the bridge from the data storage unit 45.

Next, hardware interrupt is enabled, namely, the interrupt signal is unmasked, thereby enabling interrupt processing (step ST10108).

Then, the procedure is returned to the normal processing (step ST10109).

Description of Key Flag and Status Flag:

The following briefly describes the meaning of each key flag to be written to the key flag area and each status flag to be written to the status flag area. Five key flag areas are allocated for the "o" key 20, the "x" key 21, the play/stop key 22, the reset key 23, and the simultaneous pressing of "x" key 21 and the "o" key 20.

The writing to each of these key flag areas is executed every time interrupt processing is executed. To each key flag area, "8000" (hexadecimal notation) is written when a corresponding key operation is executed (or the corresponding key is pressed) and "0000" (hexadecimal notation) is written when a corresponding key operation is not executed (or the corresponding key is not pressed). It should be noted that each key flag is written in the interrupt processing routine upon pressing of the corresponding key (actually with a delay of interrupt period at most) and is accepted by the CPU 40 as the pressing only once unless the key is pressed again.

The status flag is indicative which stage of processing the audio content reproduction apparatus 10 is executing. It should be noted that the status flag allows the detection of the register contents of "currently read address value register" arranged in the data storage controller 46 during the reproduction of audio content supplied from the data storage unit 45, thereby indicating which reproduction status the audio content stored in the data storage unit 45 is in. On the basis of the detected reproduction status, the root status flag, the main station status flag, the sub station status flag, the bridge part status flag, the music title status flag, the radio status flag, the search status flag, the setting status flag, the reset status flag, the takeover status flag, the telephone interrupt status flag, the priority rearrangement status flag, the play status flag, and stop five minutes status flag are set in the interrupt processing routine.

If the most significant bit is "1" (decimal notation) and the 16 bits as a whole are "8000" (hexadecimal notation), then the root status flag indicates that the status is in "root". If the most significant bit is "0" and the 16 bits as a whole are "0000", then the root status flag indicates that the status is not in "root".

If the most significant bit is "1" (decimal notation), the main station status flag indicates that the status is any one of main stations.

Referring to the content file names represented in 12-bit address shown in FIG. 5, if the least significant (LSB) 8 bits (8SB from LSB) are "0" (decimal notation), it indicates that a main station navigation message is in the reproduction status, otherwise, a main station navigation message is not in the reproduction status.

For example, if the main station status flag is "9000" (hexadecimal notation), the navigation message of main station 1 is reproduced, if it is "9100" (hexadecimal notation), the navigation message of main station 2 is reproduced (refer to FIG. 5).

It should be noted that, if the most significant bit is "0" (binary notation), then it indicates that the status is not in main station.

If the most significant bit is "1" (binary notation), the sub station status flag indicates that the status is in any one of sub stations.

If the least significant bit is "1" (decimal notation) in correspondence to the file name of content represented in 12-bit address shown in FIG. 5, it indicates the reproduction status of a sub station navigation message, otherwise, it does not indicate the reproduction status of a sub station navigation message.

9SB through 12SB are indicative of the number of that sub station and 5SB through 8SB are indicative of the number of the main station to which that sub station belongs.

For example, if the sub station status flag is "9001" (hexadecimal notation), it is indicative of the reproduction status of the navigation message of sub station 1 belonging to main station 1 and, if the flag is indicative of "9011" (hexadecimal notation), it is indicative of the reproduction status of the navigation message of sub station 1 belonging to main station 2 (refer to FIG. 5).

It should be noted that, if the most significant bit is "0" (binary notation), it indicates that the status is not in sub station.

If the most significant bit is "1" (binary notation), the bridge part status flag indicates "bridge" of which music title in sub station is currently reproduced.

In correspondence with the file name of content represented in 12-bit address shown in FIG. 5, the least significant 4 bits (13SB through LSB) are indicative of the number of a music title containing that bridge; 9SB through 12SB are indicative of the number of the sub station to which the music title containing that bridge belongs; and 5SB through 8SB are indicative of the number of the main station to which the music title containing that bridge belongs.

For example, if the sub station status flag is "9002" (hexadecimal notation), it is indicative of the reproduction status of the bridge of the first music title of sub station 1 of main station 1 and, if the flag is "9102" (hexadecimal notation), it is indicative of the reproduction status of the bridge of the first music title of sub station 1 of main station 2 (refer to FIG. 5).

It should be noted that, if the most significant bit is "0" (binary notation), it indicates that the status is not in the reproduction of bridge.

If the most significant bit is "1" (binary notation), the music title status flag indicates that the status belongs to any one of music titles, reproducing that music title.

In correspondence with the file name of content represented in 12-bit address shown in FIG. 5, the least significant 4 bits (13SB through LSB) are indicative of the number of that music title; 9SB through 12SB are indicative of the number of the sub station to which that music title belongs; and 5SB through 8SB are indicative of the number of the main station to which that music title belongs.

For example, if the sub station status flag is "9002" (hexadecimal notation), it is indicative of the reproduction status of the first music title of sub station 1 of main station 1 and, if the flag is "9102" (hexadecimal notation), it is indicative of the reproduction status of the first music title of sub station 1 of main station 2 (refer to FIG. 5).

It should be noted that, if the most significant bit is "0" (binary notation), it indicates that the status is not in the reproduction of music title.

If the most significant bit is "1" (binary notation), the radio status flag indicates the status belongs to any one of radios. Bit 2 (2SB) indicates that a top navigation message (for example, "This is a radio") is reproduced. The lower 14 bits are indicative of the number of a preset. Therefore, theoretically, 16K (K=1024) presets may be set. If bit 3 (3SB) through the least significant bit (LSB) are all "0"s, it indicates that the allocation to "radio" of the first layer, so that navigation message "This is a radio" is ready for announcement.

If the most significant bit is "1" (binary notation), the search status flag indicates that the status belongs to any one of "searches". If 2SB is "1", it indicates that the top navigation message (for example, "This is a "search") in "search" is reproduced. The lower 14 bits are indicative of more detail information about "search".

If the most significant bit is "1" (binary notation), the "setting" status flag indicates that the status belongs to any one of "settings". If 2SB is "1", it indicates that the top navigation message (for example, "This is a "setting") in "setting" is reproduced. The lower 14 bits are indicative of more detail information about "setting".

If the most significant bit is "1" (binary notation), the reset flag indicates that the reset status is on. If the most significant bit is "0", the flag indicates that the reset status is off.

If the most significant bit is "1" (binary notation), the play status flag indicates that the audio content reproduction apparatus 10 is in any significant operation status. Namely, this indicates that the audio content reproduction apparatus 10 is in a service status for providing the user with music content, for example.

On the other hand, if the most significant bit is "0" (binary notation), the play status flag indicates that the stop status is on.

If the most significant bit is "1" (binary notation), the takeover status flag indicates that the takeover status has been entered. The contents of the entered takeover status are represented in the lower bits.

In correspondence with the file name of content represented in 12-bit address shown in FIG. 5, 5SB through 8SB are indicative of the number of the main station to be taken over and 9SB through 12SB are indicative of the number of the sub station to be taken over.

For example, if the takeover status flag is "9100" (hexadecimal notation), it indicates that takeover is made by main station 2; if the takeover status flag is "9011" (hexadecimal notation), it indicates that takeover is made by sub station 2 of main station 1 (refer to FIG. 5).

It should be noted that, if the most significant bit is "0" (binary notation), it indicates that no takeover has occurred.

If the most significant bit is "1" (binary notation), the priority rearrangement status flag indicates that the priority rearrangement status has occurred. The lower bits indicate in which part of which layer the priority is rearranged.

The telephone interrupt status flag indicates that a call has come in the telephone. If a call has come, the most significant bit of the telephone interrupt status flag is set to "1" (binary notation).

It should be noted that, if the most significant bit is "0", it indicates that the telephone interrupt status has not occurred.

The stop five minutes status flag is indicative of the stop status. If the most significant bit of the stop five minutes flag is "0", it indicates that the stop status is for less than five minutes; the most significant bit is "1", it indicates that the stop status is for five minutes or more.

"Root" Interrupt Processing (Refer to Step ST105, FIG. 9):

If the "x" key 21 is pressed halfway through greetings in the "root" status, the procedure moves to "root" interrupt processing (step ST105).

Now, "root" interrupt processing starts (step ST10500).

A read sequence is given to the read sequence specification sequencer of the data storage controller (step ST10501). The sequence to be set to the read sequence specification sequencer is set as follows.

1: Navigation message of "Main station 1"
2: navigation message of "Sub station 1"
3: "bridge" of first music title
4: "bridge" of second music title
5: "bridge" of third music title
6: . . .

Next, the setting of the "x" key flag is cleared to "0000" (hexadecimal notation) (step ST10510).

Then, the procedure returns to the normal processing routine (step ST10511), the status shifting to step ST102.

Main Station Interrupt Processing (Step ST107, FIG. 10):

If the "x" key 21 is pressed with a navigation message of main station currently in the reproduction status, the procedure moves to main station interrupt processing (step ST107).

Now, main station interrupt processing starts (step ST10700).

First, the number of the current main station is detected from the lower bits of the main station status flag (step ST10701).

Next, the number of the current main station is incremented by one (step ST10702).

Next, it is determined whether the incremented number is below the upper limit of existing main station numbers, namely, 16 (step ST10703).

If the main station number is found below the upper limit, the file name of the navigation message of the incremented main station, the file name of sub station 1 belonging to that main station, and the file name of each music title belonging to sub station 1 belonging to that main station are sequentially read from the RAM 42. Then, the data storage unit 45 is accessed to get the "bridge" address written to the tag from the file name of each music title (step ST10704).

Next, a read sequence is given to the read sequence specification sequencer of the data storage controller 46 (step ST10705). A sequence to be given to the read sequence specification sequencer is set as follows. It should be noted that, although number five and on are omitted, the file names of first music title through 14th music title are appropriately written subsequent to "bridge" of the 14th music title. As described above, an extent to which a sequence is written to the read sequence specification sequencer may be determined from time to time. If an amount of file names to be written to the read sequence specification sequencer is small and the sequencer becomes vacant of file names, then the CPU 40 may automatically write files names to be automatically read next, thereby continuing reproduction.

1: Navigation message of a next main station
2: Navigation message of sub station 1 belonging to that main station
3: "bridge" of first music title
4: "bridge" of second music title
5: . . .

Next, the "x" key flag is cleared to "0000" (hexadecimal notation) (step ST10706).

Then, the procedure returns to the normal processing routine (step ST10708), the status shifting to step ST102.

On the other hand, if the incremented number is found not below the upper limit of the numbers of existing main stations (16 in the present embodiment), the status shifts to "radio" and the digital FM tuner 39 is instructed to set preset 1 (step ST10707).

Next, the "x" key flag is cleared to "0000" (hexadecimal notation) (step ST10706).

Then, the procedure returns to the normal processing routine (step ST10708), the status shifting to step ST102.

Sub Station Interrupt Processing (Step ST109, FIG. 11):

If the "x" key 21 is pressed when the navigation message of a sub station is currently in the reproduction status, the procedure moves to sub station interrupt processing (step ST109).

Now, sub station interrupt processing starts (step ST10900).

First, the number of the current main station is detected from the lower bits of the main station status flag and the number of the current sub station is detected from the lower bits of the sub station status flag (step ST10901).

Next, the number of the current sub station is incremented by one (step ST10902).

Next, it is determined whether the incremented number is below the upper limit of existing sub station numbers, namely, 16 (step ST10903).

If the sub station number is found below the upper limit, the file name of the navigation message of the incremented sub station, the file name of the first music title belonging to that sub station, the file name of the second music title, and so on are sequentially read from the RAM 42. Further, the data storage unit 45 is accessed to get the "bridge" address written to the tag from the file name of each music title (step ST10904).

Next, a read sequence is given to the read sequence specification sequencer of the data storage controller 46 (step ST10905). A sequence to be set to the read sequence specification sequencer is set as follows. It should be noted that, for number five and so on, the file names of the "bridge" of the first music title through the 14th music title are written subsequent to "bridge" of the fourth music title.

1: Navigation message of a next sub station
2: "bridge" of first music title
3: "bridge" of second music title
4: "bridge" of third music title
5: . . .

Next, the "x" key flag is cleared to "0000" (hexadecimal notation) (step ST10906).

Then, the procedure returns to the normal processing routine (step ST10909), the status shifting to step ST102.

On the other hand, if the incremented number is not below the upper limit of the numbers of existing sub stations (16 in the present embodiment), the file name of the navigation message of sub station 1, the file name of the first music title belonging to sub station 1, the file name of the second music title, and on are sequentially read from the RAM 42. Further, the data storage unit 45 is accessed to get "bridge" address written to the tag of the file name of each music title (step ST10907).

Next, the following sequence is given to the read sequence specification sequencer of the data storage controller 46 (step ST10910). It should be noted that, for number five and so on, the files of the first music title through the 14th music title are written subsequent to "bridge" of the fourth music title.

1: Navigation message of sub station 1
2: "bridge" of first music title
3: "bridge" of second music title
4: "bridge" of third music title
5: . . .

Next, the "x" key flag is cleared to "0000" (hexadecimal notation) (step ST10906).

Then, the procedure returns to the normal processing routine (step ST10909), the status shifting to step ST102.

Music Title Interrupt Processing (step ST111, Not Shown):

If the "x" key 21 is pressed when the status is in music title reproduction, the procedure moves to music title interrupt processing (step ST111).

When the music title interrupt processing starts, the number of the current main station is detected from the lower bits of the music title status flag, the number of the sub station is detected from the lower bits of the music title status flag, and the number of the current music title is detected from the lower bits of the music title status flag.

Next, the point count written to the address corresponding to the current music title in a point table (refer to FIG. 14) is decremented by one.

Next, the number of the current music title is incremented by one.

Next, it is determined whether the incremented number of the music title is below the upper limit of the numbers of existing music titles, namely 14.

If the incremented number is found below the upper limit, the file name of that music title, the file name of the next music title, and so on are sequentially read from the RAM 42.

Next, a read sequence is given to the read sequence specification sequencer of the data storage controller 46. A sequence to be set to the read sequence specification sequencer is set as follows. It should be noted that, for number five and on, the ninth music title through the 14th music title are set.

1: Sixth music title (if the current music title is the fifth)
2: Seventh music title
3: Eighth music title
4: Ninth music title
5: . . .

Then, the procedure returns to the normal processing routine, the status shifting to step ST102.

On the other hand, if the incremented number is found not below the upper limit (14 in the present embodiment), the read sequence specification sequencer of the data storage controller 46 specifies a read sequence so as to sequentially return from the first music title.

Radio Interrupt Processing (Step ST113, Not Shown):

If the "x" key 21 is pressed when the status is currently in "radio", the procedure moves to radio interrupt processing (step ST113).

For example, if the radio status flag is currently "8000" (hexadecimal notation), the status is in "radio" of the first layer, so that the procedure moves to "search". To move the procedure to "search", the file name of a navigation message of the first layer of "search" is read from the RAM 41 to be transmitted and the file name is written to the read sequence specification sequencer.

If the radio status flag is currently "8001" (hexadecimal notation), the status is in preset 1 of the second layer, so that the current number of preset is incremented by one.

Next, it is determined whether preset 2, the incremented preset number, is below the upper limit of existing preset numbers, thereby determining that preset 2 is below the upper limit.

The address at which the navigation message of preset 2 is stored is read from the RAM 42 to be written to the read sequence specification sequencer.

Next, it is determined that the navigation message has ended by checking that bit 2 (2SB) of the radio status flag has turned from "1" to "0". Then, an instruction is given to the digital FM tuner 39 to select preset 2.

The procedure returns to the normal processing routine, the status shifting to step ST102.

On the other hand, if the incremented number is found not below the upper limit, then the file name of the navigation message of preset 1 is read from the RAM 42 to be written to the read sequence specification sequencer.

Next, it is determined that the navigation message has ended by checking that bit 2 (2SB) of the radio status flag has turned from "1" to "0". Then, an instruction is given to the digital FM tuner 39 to select preset 1.

After clearing the "x" key flag, the procedure returns to the normal processing routine, the status shifting to step ST102.

Search Interrupt Processing (Step ST115, Not Shown):

If the "x" key 21 is pressed when the status is current in "search", the procedure moves to "search" interrupt processing (step ST115).

If the search status flag is currently in "search" of the first layer, the status is shifted to "setting" as shown below.

The file name of the navigation message of "setting" is read from the RAM 42.

The read sequence specification sequencer of the data storage controller is instructed to read the navigation message.

Then, after clearing the "x" key flag, the procedure returns to the normal processing routine, the status shifting to step ST102. It should be noted that the description of the search interrupt processing to be executed when the "x" key 21 is pressed in the second and lower layers is omitted.

Setting Interrupt Processing (Step ST117, Not Shown):

If the "x" key 21 is pressed when the status is currently in "setting", the procedure moves to setting interrupt processing (step ST117).

If the setting status flag is currently indicative of "setting" in the first layer, the status is moved to main station 1 as described below.

A read sequence is given to the read sequence specification sequencer of the data storage controller. A sequence to be set to the read sequence specification sequencer is set as follows.

1: Navigation message of main station 1
2: Navigation message of sub station 1
3: "bridge" of first music title
4: "bridge" of second music title
5: "bridge" of third music title
6: . . .

Then, after clearing the "x" key flag, the procedure returns to the normal processing routine, the status shifting to step ST102. It should be noted that the description of the setting interrupt processing to be executed when the "x" key 21 is pressed in the second and lower layers is omitted.

Bridge Part Continuous Reproduction Processing (Step ST120, Refer to FIG. 12):

Bridge part continuous reproduction processing starts the reproduction of a particular piece of content that contains this characteristic part. The location at which the reproduction of a music title (or content) is started is set in "setting", namely, whether to start the reproduction subsequent to the bridge continuously or from the beginning of the music title. If the reproduction of the bridge is suspended and the reproduction is made from the beginning of a music title, the cross-fade technique is used in which the volume of bridge is gradually lowered (fade-out) and, at the same time, the volume of the beginning of music is gradually raised (fade-in) in an overlap manner.

If the "o" key 20 is pressed during bridge reproduction, this processing starts.

The processing starts from bridge part continuous reproduction processing (step ST12000).

The file name of a music title to which that bridge belongs is detected by the lower 12 bits of the bridge part status flag (step ST1202).

Next, the end address of that bridge is detected from the tag (refer to FIG. 4 (step STS12003).

Next, the read sequence after the end of the currently reproduced bridge is given to the read sequence specification sequencer of the data storage controller 46 (step ST12004).

The sequence to be set to the read sequence specification sequencer is set as follows.

1: End of a music title containing "bridge" from the bridge end address thereof
2: "bridge" of next music title
3: "bridge" of further next music title
4: . . .

Next, the "o" key flag is cleared to "0000" (hexadecimal notation) (step ST12005).

Then, the procedure returns to the normal processing routine (step ST12006), the status shifting to step ST102.

Thus, the procedure returns to "bridge part" again, thereby allowing the user to listen to "bridge" continuously again.

Point Count Add Processing (Step ST131, Refer to FIG. 13):

When the "o" key 20 is operated and if the most significant bit of the bridge part status flag is "0", this processing starts.

Now, point count add processing starts (step ST13100).

First, it is determined whether the most significant bit of the music title status flag is "1" (step ST13101).

If the most significant bit of the music title status flag is found "1", it indicates that the music title is being reproduced, so that the file name of that music title is identified by the lower bits (step ST13102).

Then, the point count of the music title represented by that file name is incremented (step ST13103). It should be noted that a value obtained by incrementing a point count table (refer to FIG. 14) by one is written to the point count.

Next, "o" key flag is cleared to "0000" (hexadecimal notation) (step ST13108).

Then, the procedure returns to the normal processing routine (step ST13109), the status shifting to step ST102.

On the other hand, if the most significant bit of the music title status flag is not "1", it is determined whether the most significant bit of the radio status flag is "1" (step ST13105).

If the most significant bit of the radio status flag is found "1", then it indicates that radio reproduction is being executed, so that a current preset location is checked (step ST13106).

Then, the current point count of that preset is incremented by one (step ST13107). It should be noted that a value obtained by incrementing a radio point count table (not shown) by one is written to the point count.

Next, "o" key flag is cleared to "0000" (hexadecimal notation) (step ST13108).

Then, the procedure returns to the normal processing routine (step ST13109), the status shifting to step ST102.

If the most significant bit of the radio status flag is not "1", then the procedure returns to the normal processing routine (ST13109), the status shifting to step ST102.

Takeover Processing (Step ST123, Not Shown):

If the most significant bit of the takeover status flag is "1", it indicates that a takeover condition has been caused. The lower bits of this flag indicate by which status the takeover has been executed.

The following describes how a takeover destination is identified by the lower bits. In principle, the takeover destination is described in correspondence with the content arrangement structure shown in FIG. 5.

For example, if the lower 12 bits are "011", it indicates that the takeover has been made by a navigation message of sub station 2 of main station 1; if the lower 12 bits are "100", it indicates that the takeover has been made by a navigation message of main station 2.

If the lower 12 bits are "100", a read sequence is given to the read sequence specification sequencer of the data storage controller. The sequence to be set to the read sequence specification sequencer is set as follows.

1: Navigation message of main station 2
2: Navigation message of sub station 1
3: "bridge" of first music title
4: "bridge" of second music title
5: "bridge" of third music title
6: . . .

Then, the value of the takeover status flag is cleared to "0000". The procedure returns to the normal processing routine, the status shifting to step ST102. Thus, the takeover status flag provides the information about the occurrence of a takeover condition and by which status a takeover has been made, thereby handling not only the above-mentioned takeover by main station but also any other forms of takeover.

Priority Rearrangement Processing (Step ST125, Refer to FIG. 15):

This processing is executed when the most significant bit of the priority rearrangement status flag is "1".

Now, priority rearrangement status processing starts (step ST12500).

From the lower bits of the priority rearrangement status flag, it is determined whether the rearrangement is for music titles in a sub station (step ST12501). If the rearrangement is found for music titles in a sub station, the following processing is executed, otherwise, the procedure moves to step ST12505.

First, from the lower bits of the priority rearrangement status flag, the numbers of the main station and the sub station in which music titles are rearranged are detected and a new point count of each music title belonging to that sub station is detected from the point count table (refer to FIG. 14) to rewrite the content arrangement table (refer to FIG. 5) in the RAM 42 in the descending order of point counts (step ST12503). Namely, music titles having greater point counts are arranged at lower addresses for higher priority.

Next, the priority rearrangement status flag is cleared to "0000" (hexadecimal notation) (step ST12504).

Then, the procedure returns to the normal processing routine (step ST12512), the status shifting to step ST102.

In step ST12505, it is determined from the lower bits of the priority rearrangement status flag whether the rearrangement is for sub stations in a main station. If the rearrangement is found to be for sub stations in a main station, the following processing is executed, otherwise, the procedure moves to step ST12508.

First, from the lower bits of the priority rearrangement status flag, the number of the main station in which sub stations are to be rearranged is detected (step ST12506).

Next, a new point count of each sub station belonging to that main station is detected from the point count table (refer to FIG. 4) to rewrite the content arrangement table (refer to FIG. 5) in the RAM 42 in the descending order of point counts (step ST12507). Namely, sub stations having greater point counts are arranged at lower addresses for higher priority.

Next, the priority rearrangement status flag is cleared to "0000" (hexadecimal notation) (step ST12504).

Then, the procedure returns to the normal processing routine (step ST12512), the status shifting to step ST102.

In step ST12508, it is determined from the lower bits of the priority rearrangement status flag whether the rearrangement is in a sequence of main stations. If the rearrangement is found to be in a sequence of main stations, the following processing is executed, otherwise, the procedure moves to step ST12510.

First, a new point count of each main station is detected from the point count table (refer to FIG. 4) to rewrite the content arrangement table (refer to FIG. 5) in the RAM 42 in the descending order of point counts (step ST12509). Namely, main stations having greater point counts are arranged at lower addresses for higher priority.

Next, the priority rearrangement status flag is cleared to "0000" (hexadecimal notation) (step ST12504).

Then, the procedure returns to the normal processing routine (step ST12512), the status shifting to step ST102.

In step ST12510, it is determined from the lower bits of the priority rearrangement status flag whether the rearrangement is for presets in "radio". If the rearrangement is found to be for presets in "radio", the following processing is executed, otherwise, the procedure moves to step ST12504.

First, a new point count of each preset is detected from the point count table (refer to FIG. 4) to rewrite the content arrangement table (refer to FIG. 5) in the RAM 42 in the descending order of point counts (step ST12511). Namely, presets having greater point counts are arranged at lower addresses for higher priority.

Next, the priority rearrangement status flag is cleared to "0000" (hexadecimal notation) (step ST12504).

Then, the procedure returns to the normal processing routine (step ST12512), the status shifting to step ST102.

Telephone Interrupt Processing (Step ST127, Not Shown):

When the status moves to telephone interrupt processing, navigation message "A call from so-and-so. To answer, press "x" key and "o" key at the same time" is sounded.

If the "x" key 21 and the "o" key 20 are pressed at the same time in response, the call is established, allowing the user to make a talk by use of the headphones 36 and the microphone 37. When the talk starts, the "x" & "o" keys simultaneous pressing status flag is cleared to "0000".

To disconnect the call by the user, the user presses the "x" key 21 and the "o" key 20 at the same time again. Then, the call is disconnected, upon which the "x" & "o" keys simultaneous pressing status flag is cleared to "0000" again.

Then, the suspended reproduction of a music title is resumed from the suspended position. It should be noted that if the calling party disconnects the call, the suspended reproduction is also resumed from the suspended position.

"x" Key Detection Processing (Step ST202, Refer to FIG. 16):

Next, it is determined whether the "x" key 21 has been pressed. To be more specific, a rising edge caused by the pressing of the "x" key 21 is detected. The detection of the pressing of the "x" key 21 is detected in the following steps.

Now, "x" key detection processing starts (step ST20200).

Current-time "x" key information for detecting whether the "x" key 21 is currently pressed is captured through the key interface 30 (step ST20201). If the "x" key 21 is found pressed, "1" is captured, otherwise, "0" is captured.

Next, it is determined whether last-time "x" key information (or a value of the "x" key information written in the interrupt caused last time) is "1" (step ST20202). It should be noted that the last-time "x" key information is stored in a last-time "x" key information area, which is a predetermined area in the RAM 41.

If the last-time "x" key information is found to be "1", the procedure moves to step ST20203.

In step ST20203, current-time "x" key information is written to the last-time "x" key information area for storage. Then, the procedure exits the "x" key detection processing (step ST20204).

On the other hand, if the last-time "x" key information is found not to be "1" (found to be "0"), the procedure moves to step ST20205.

In step ST20205, it is determined whether the current-time "x" key information is "1".

If the current-time "x" key information is found not to be "1", "0" is written to the last-time "x" key information area (step ST20206). Then, the procedure exits the "x" key detection processing (step ST20204).

If the current-time "x" key information is found to be "1" in step ST20205, then the "x" key flag is set to "8000" (step ST20207). Then, the procedure exits the "x" key detection processing (step ST20204).

By the above-mentioned processing, the rising edge of the "x" key information caused by the pressing of the "x" key 21 can be correctly detected. When the "x" key flag is set to "8000", the pressing of the "x" key 21 is stored.

"o" Key Detection Processing (Step ST203, Not Shown):

Next, in the "o" key detection processing, it is determined whether the "o" key 20 has been pressed. This detection is executed in the following steps.

The "o" key detection processing is generally the same as the "x" key detection processing if current-time "o" key information is used for current-time "x" key information and last-time "o" key information is used for last-time "x" key information. To be more specific, the "o" key flag is set to "8000" only if the last-time "o" key information is "0" and the current-time "o" key information is "1", otherwise, the current-time "o" key information is stored as the last-time "o" key information.

Reset Key Detection Processing (Step ST204, Not Shown):

Next, in reset key detection processing, it is determined whether the reset key 23 has been pressed. This detection is executed in the following steps.

The reset key detection processing is generally the same as the "x" key detection processing if current-time reset key information is used for current-time "x" key information and last-time reset key information is used for last-time "x" key information. To be more specific, the reset key flag is set to "8000" only if the last-time reset key information is "0" and the current-time reset key information is "1", otherwise, the current-time reset key information is stored as the last-time reset key information.

Play/Stop Key Detection Processing (Step ST205, Refer to FIG. 17):

Next, in play/stop key detection processing, it is determined whether the play/stop key 22 has been pressed. The play/stop key 22 is a toggle key, so that the meaning of the pressing depends on whether the last status was play or stop. A play operation and a stop operation are contradictory to each other and either is always in an operated status, so that the operation of this toggle key is detected in the following steps.

Now, the play/stop key detection processing starts (step ST20500).

Through the key interface 30, current-time play/stop key information for detecting whether the play/stop key 22 is currently pressed is captured (step ST20501). If the play/stop key 22 is found pressed, "1" is captured, otherwise, "0" is captured.

Next, it is determined whether last-time play/stop key information (a value of the play/stop key information written in an interrupt caused last) is "1" (step ST20502). It should be noted that the last-time play/stop key information is stored in the last-time play/stop key information area, which is a predetermined area in the RAM 41.

If the last-time play/stop key information is found to be "1", then the procedure moves to step ST20503.

In step ST20503, current-time play/stop key information is written to the last-time play/stop key information area. Then, the procedure exits the play/stop key detection processing (step ST20504).

On the other hand, if the last-time play/stop key information is found not to be "1" (namely, found to be "0"), then the procedure moves to step ST20505.

In step ST20505, it is determined whether the current-time play/stop key information is "1".

If the current-time play/stop key information is found not to be "1", "0" is written to the last-time play/stop key information area for storage (step ST20506). Then, the procedure exits the play/stop key detection processing (step ST20504).

In step ST20505, if the current-time play/stop key information is found to be "1", then the procedure moves to step ST20507.

In step ST20507, it is determined whether the play status flag is "8000" (set to "play"). If the play status flag is found to be "8000", the play status flag is cleared to "0000" (step ST20508), otherwise (namely, the play status flag is "0000"), the play status flag is set to "8000" (step ST20509), upon which the procedure exits the play/stop key detection processing (step ST20504).

"x" & "o" Keys Simultaneous Pressing Detection Processing (Step ST206, Refer to FIG. 18):

Next, it is detected whether the "o" key 20 and the "x" key 21 have been pressed at the same time. If a telephone call is detected, the "o" key 20 and the "x" key 21 can be pressed at the same time. For this purpose, the following steps are executed.

Now, "x" & "o" keys simultaneous pressing detection starts (step ST20600).

Current-time "x" key information for detecting whether the "x" key 21 is currently pressed is captured (step ST20601). It is determined whether the "x" key 21 is pressed (step ST20602). If the "x" key 21 is found pressed, the procedure moves to step ST20603; otherwise, the processing exits (step ST20606).

In step ST20603, current-time "o" key information for detecting whether the "o" key 20 is currently pressed. Then, it is determined whether the "o" key 20 is currently pressed (step ST20604). If the "o" key 20 is found pressed, the procedure moves to step ST20605; otherwise, the processing exits (step ST20606).

In step ST20605, the "x" & "o" simultaneously pressing status flag is set to "8000". Then the processing exits (step ST20606).

Telephone Interrupt Status Detection Processing (Step ST208, Refer to FIG. 19):

Next, it is determined whether a telephone interrupt status has occurred. This detection is executed in the following steps.

Now, telephone interrupt status detection processing starts (step ST20700).

A check signal for detecting whether a telephone interrupt has been caused on the Bluetooth interface is detected (step ST20701). Then, it is determined whether a telephone interrupt has been caused (step ST20702). If a telephone interrupt is found caused, the telephone interrupt status flag is set to "8000" (step ST20703), upon which the processing exits (step ST20708); otherwise, the telephone interrupt status flag is set to "0000" (step ST20707), upon which the processing exits (step ST20708).

"x" Key Ten Seconds No-Operation Status Detection Processing (Step ST209, Refer to FIG. 20):

Next, it is detected whether the "x" key 21 has not been operated for ten seconds or more. This detection is executed in the following steps.

Now, "x" key ten seconds no-operation status detection processing starts (step ST20900).

First, it is determined whether it is necessary for detecting a status in which the "x" key 21 has not been operation for ten seconds for more (step ST20901). Because the necessity for this detection occurs after the end of each navigation message, the end of a navigation message is detected in this step. If it is unnecessary to detect the "x" key ten seconds no-operation status, the procedure moves to step ST20910, in which a no-operation count counter is set to 0, upon which the processing exits (step ST20910).

Next, current-time "o" key information is read (step ST20902). Then, it is determined whether the "o" key 20 has been pressed (step ST20903). If the "o" key 20 is found pressed, the procedure moves to step ST20910, in which the no-operation count counter is set to 0, upon which the processing exits (step ST20910). In the embodiment shown in FIG. 3, pressing the "o" key 20 once clears the operation of the "x" key 21; this is the reason why this processing executed.

On the other hand, if the "o" key 20 is found not pressed, then the procedure moves to step ST20904.

In step ST20904, current-time "x" key information is read.

Next, it is determined whether the "x" key 21 has been pressed (step ST20905). If the "x" key 21 is found pressed, then the procedure moves to step ST20910, in which the no-operation count counter is set to 0.

On the other hand, if the "x" key 21 is found not pressed, the procedure moves to step ST20906.

In step ST20906, the no-operation count counter arranged in a predetermined area in the RAM 41 is incremented by one. Then, it is determined whether the value of this no-operation count counter is equal to predetermined value Mt (step ST20907). The value of Mt is set to ten seconds/interrupt period (decimal notation).

If the value of the no-operation count counter is found not equal to Mt (decimal notation) in step ST20907, the processing exits (step ST20909).

On the other hand, if the value of the no-operation count counter is found equal to Mt (decimal notation) in step ST20907, the "x" key ten seconds no-operation status flag is set to "8000" and the no-operation count counter is set to "0000" (step ST20908), upon which the processing exits (step ST20909).

Takeover Condition Occurrence Status Detection Processing (Step ST210, Refer to FIGS. 21, 22, 23, and 24):

Next, it is determined whether a takeover condition has occurred. This detection is executed in the following steps.

Figure 21:
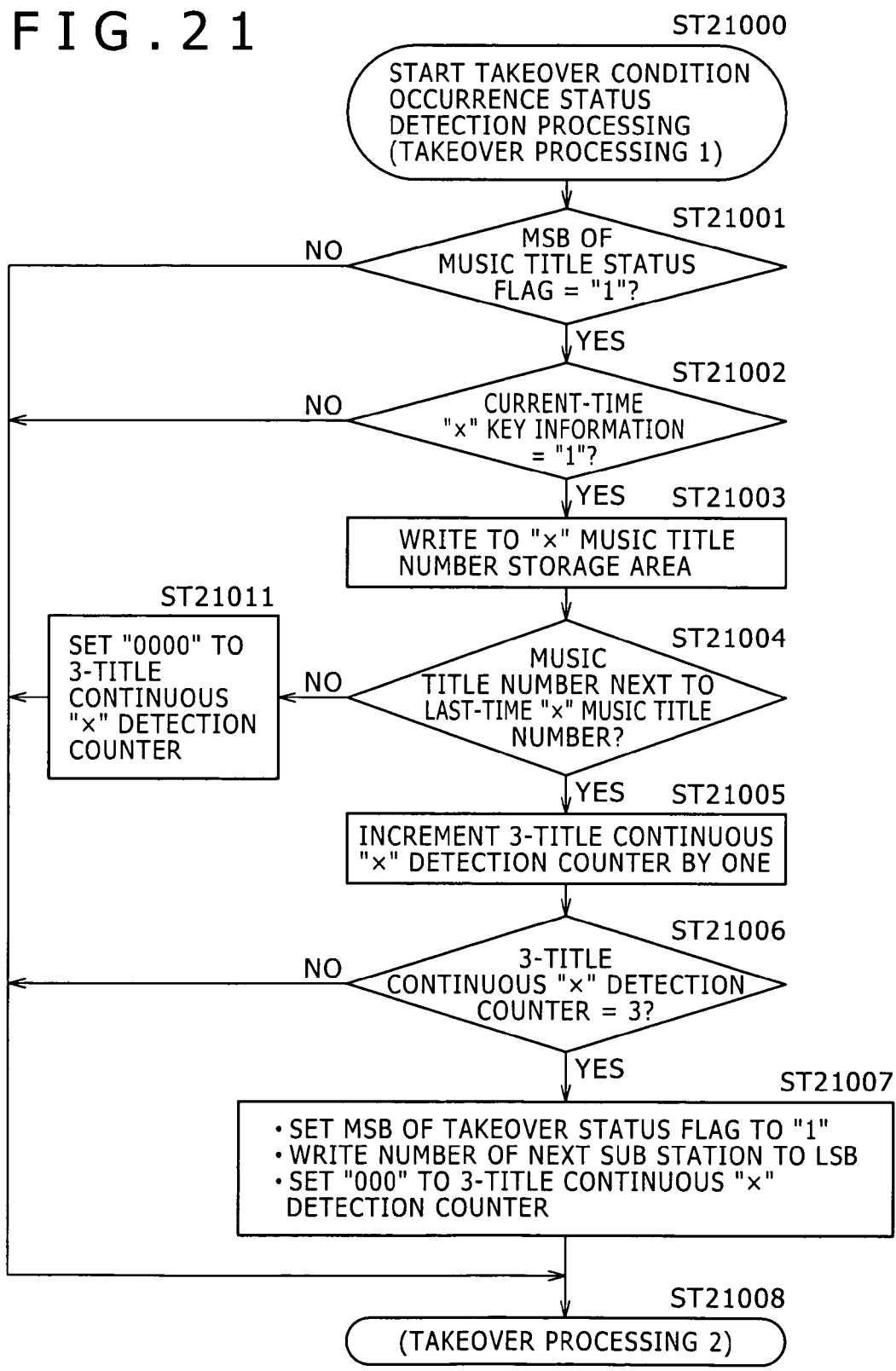
FIG. 21 is a flowchart indicative of takeover condition occurrence status detection processing according to an embodiment of the present invention.
Figure 22:
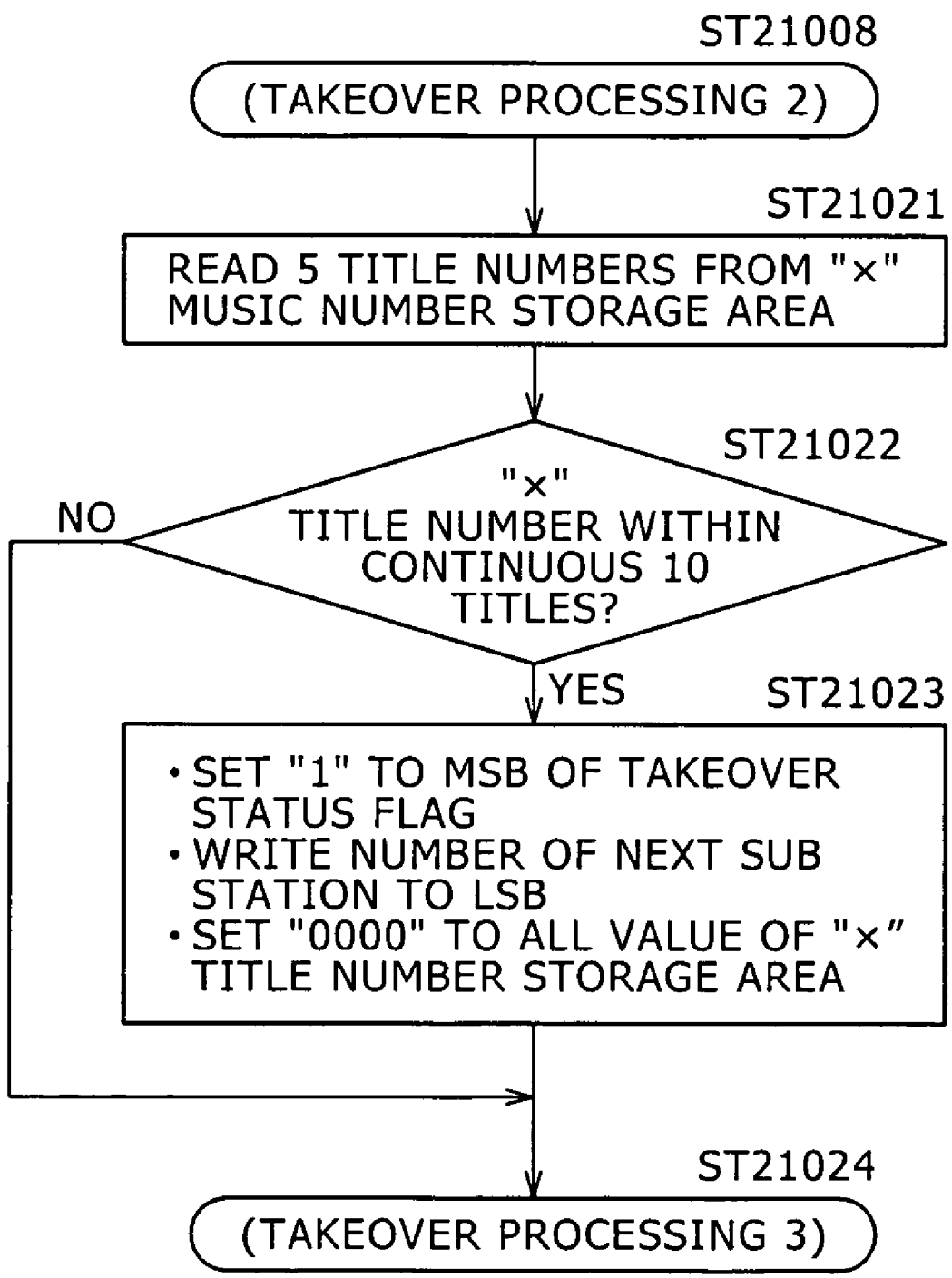
FIG. 22 is another flowchart indicative of takeover condition occurrence status detection processing according to an embodiment of the present invention.

FIG. 21 shows a takeover operation by a sub station to be executed when the "x" key 21 is pressed for three music titles continuously in the process of music reproduction. FIG. 22 shows a takeover operation by a sub station to be executed if "x" key 21 is pressed five times or more in nearest 10 music titles.

Figure 23:
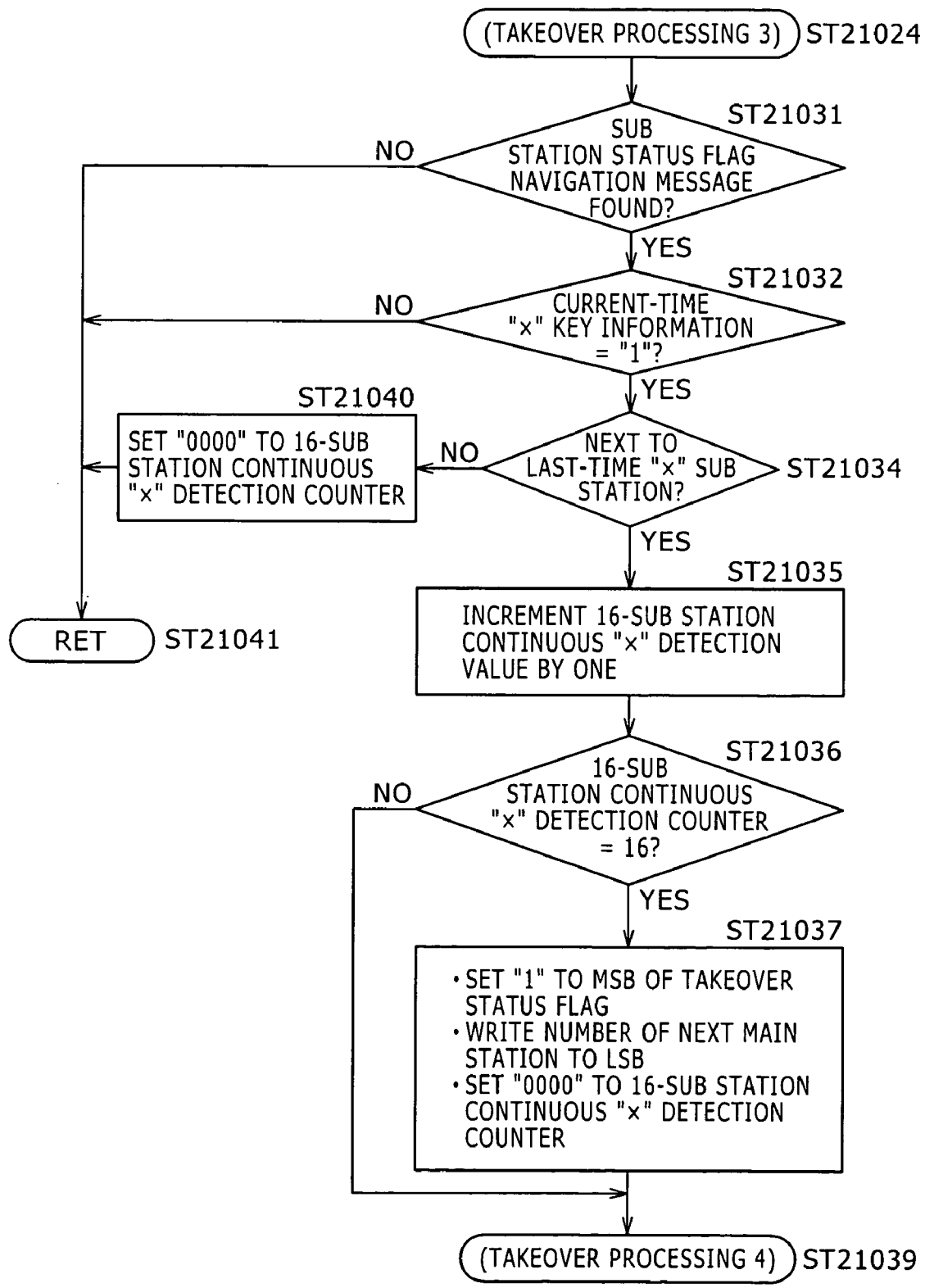
FIG. 23 is still another flowchart indicative of takeover condition occurrence status detection processing according to an embodiment of the present invention.
Figure 24:
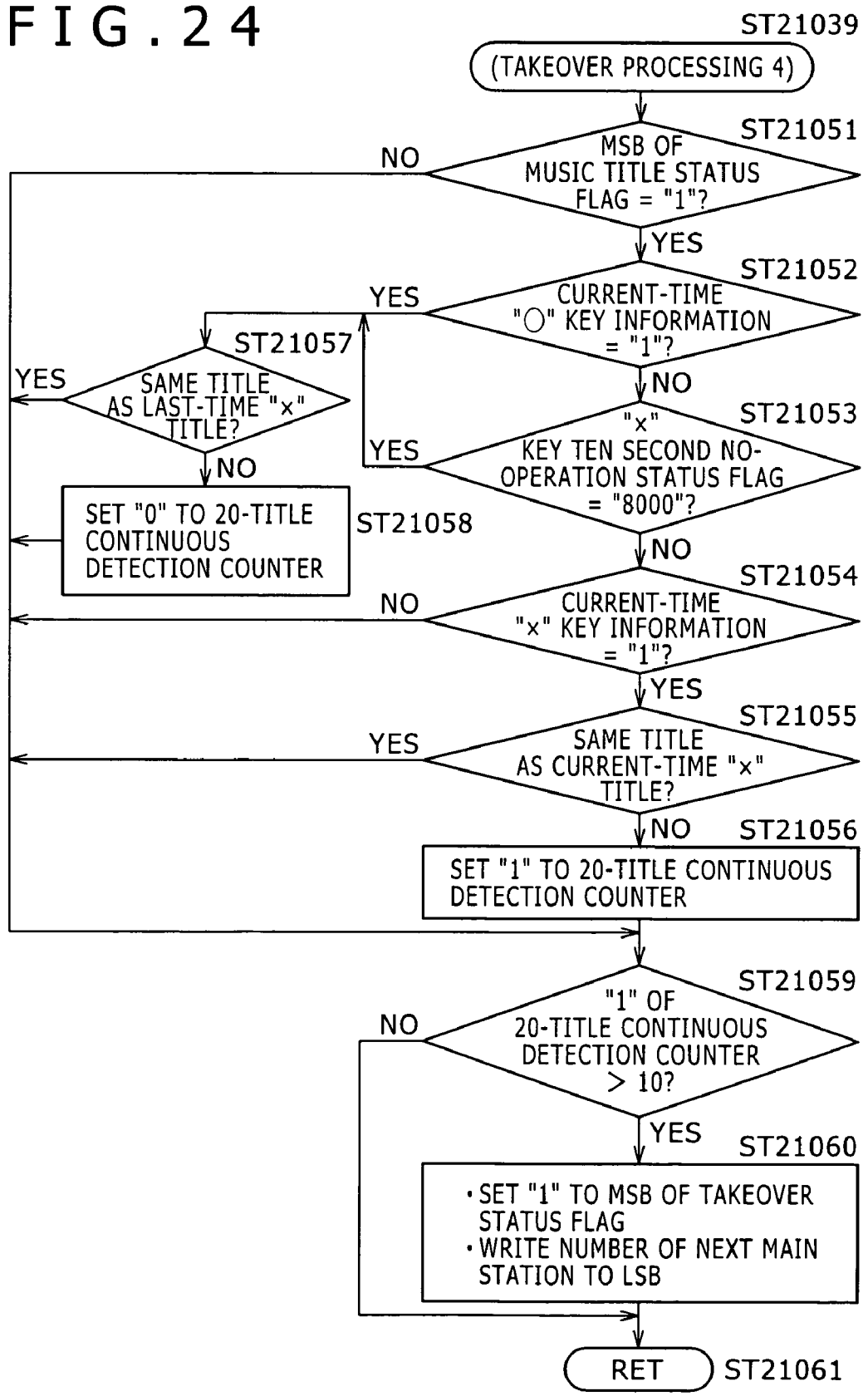
FIG. 24 is yet another flowchart indicative of takeover condition occurrence status detection processing according to an embodiment of the present invention.
Figure 25:
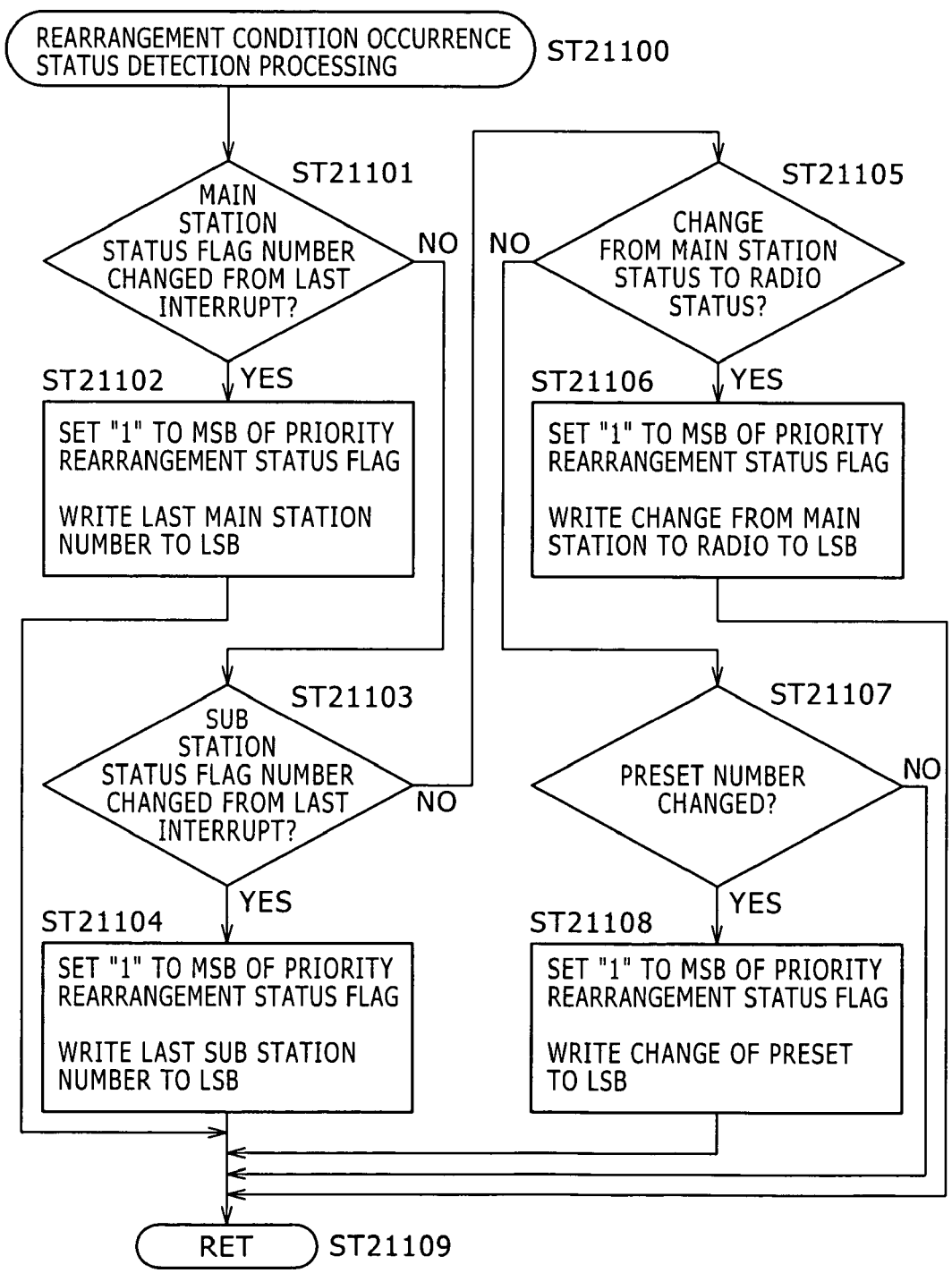
FIG. 25 is a flowchart indicative of rearrangement condition occurrence status detection processing according to an embodiment of the present invention.
Figure 26:
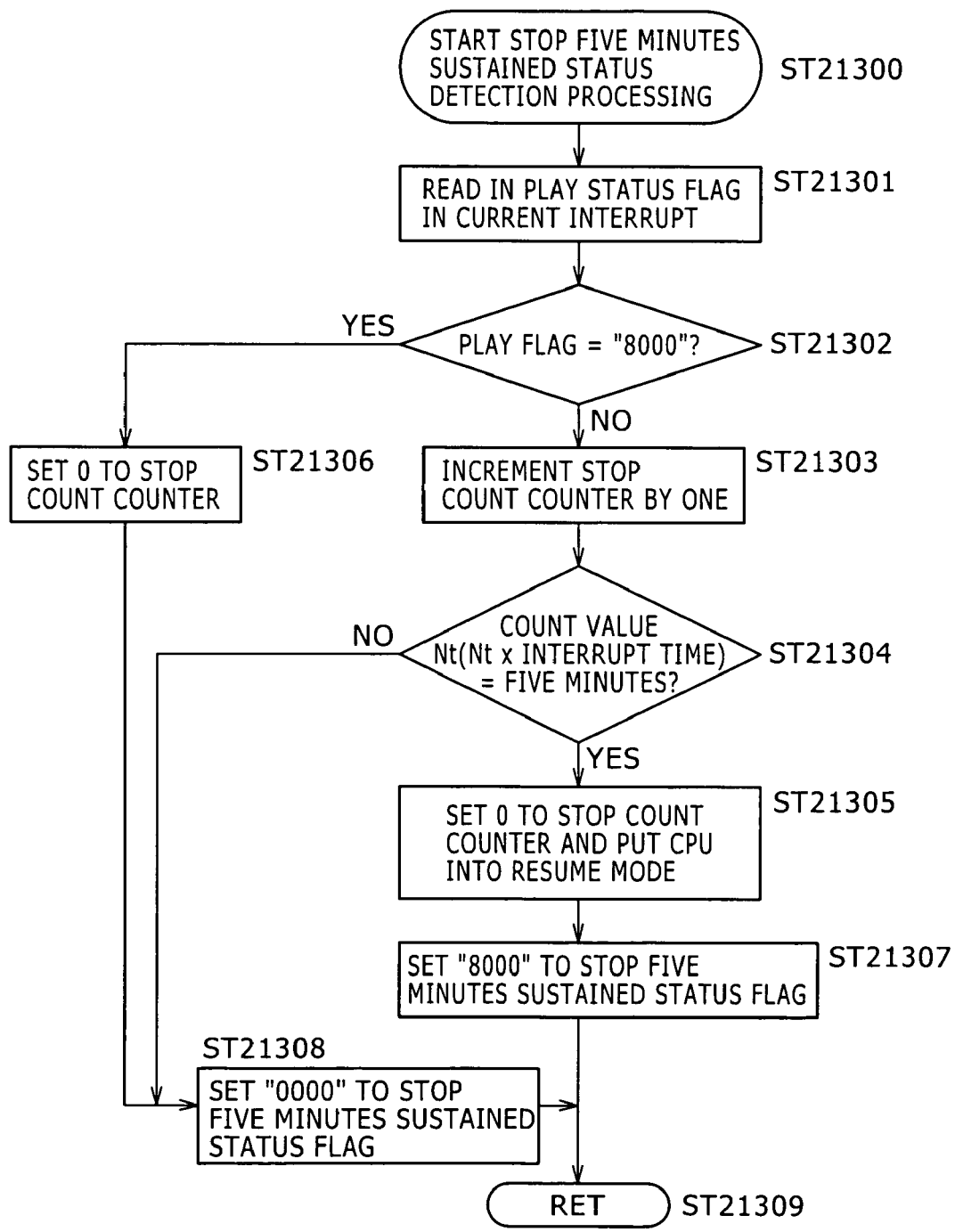
FIG. 26 is a flowchart indicative of stop five minutes sustained status detection processing according to an embodiment of the present invention.

FIG. 23 shows a takeover operation by a next main station if none of music titles belonging to all sub stations belonging to a current main station (any music title that has not been heard for at least ten seconds is regarded not heard at all). FIG. 24 shows a takeover operation by a next main station to be executed when the pressing of the "x" key 21 is detected in 10 music titles among nearest 20 music titles over a plurality of sub stations. It should be noted that if a takeover operation by a sub station and a takeover operation by a main station take place at the same time, the takeover operation by a main station is preferred.

The following describes steps in which a takeover operation is executed by a sub station when the "x" key 21 is pressed for three music titles continuously, with reference to FIG. 21.

Now, takeover condition occurrence status detection processing starts (step ST21000).

First, it is determined whether the most significant bit of the music title status flag is "1" to check if a music title is being reproduced (step ST21001).

Next, it is determined from current-time "x" key information whether the "x" key 21 has been pressed (step ST21002).

Next, a music title number for which the "x" key 21 has been pressed is written to a "x" music title address storage area in the RAM 41 (step ST21003).

Next, it is determined whether the music title number is next to the music title number written last to the "x" music title number address storage area (step ST21004).

If the music title number is found to be next to the music title number last written to the "x" music title address storage area, then the a 3-music-title continuous "x" detection counter in RAM 41 is incremented by one (step ST21005).

Next, it is determined whether the 3-music-title continuous "x" detection counter is 3 (decimal notation) (step ST21006).

If the value of this counter is found to be 3, the most significant bit of the takeover status flag is set to "1", the number of a next sub station is written to the lower bits after detection of the number of the currently reproduced sub station, and the 3-music-title continuous "x" detection counter is cleared to "0000" (step ST21007).

Thus, the main flow of the takeover processing has been described. The following describes branch flow steps.

In the above-mentioned steps, if the most significant bit of the music title status flag is not "1" in step ST21001 and the current-time "x" key information is not "1" in step ST21002, the status shifts to takeover processing 2 (step ST21008). If the music title number is not the next one in step S21004, the 3-music-title continuous "x" detection counter is cleared to "0000", upon which the status shifts to takeover processing 2 (step ST21008).

The following describes steps in which a takeover operation is executed by a sub station if the "x" key 21 is pressed five times or more in nearest 10 music titles, with reference to FIG. 22.

The processing is continued from takeover processing 2 (step ST21008).

First, five music title numbers are read from the "x" music title number storage area (step ST21021). It should be noted that the music title number was written to the "x" music title number storage area in step ST21003.

Next, it is determined whether five "x" music title numbers are among continuous 10 music titles (step ST21022).

If the five "x" music title numbers are found to be among continuous 10 music titles, the most significant bit of the takeover status flag is set to "1", the number of a next sub station is written to the lower bits, and the 3-music-title continuous "x" detection counter is cleared to "0000" (step ST21023), upon which the procedure moves to takeover processing 3 (step ST21024).

Thus, the main flow of the takeover processing has been described. The following describes branch flow steps. If the five "x" music title numbers are not found to be among 10 continuous music titles in step ST21022, the procedure moves to takeover processing 3 (step ST21024).

The following describes steps in which a takeover operation by a next main station is executed if none of music titles belonging to sub stations belonging to that main station, namely, each of 16 sub stations, is heard, with reference to FIG. 23.

The processing is continued from takeover processing 3 (step ST21024).

First, it is determined whether the most significant bit of the sub station status flag is "1" and the least significant bit thereof is "1" to check if a navigation message of a sub station is being reproduced (step ST21031).

If a sub station navigation message is found being reproduced, then it is determined whether the "x" key 21 has been pressed from current "x" key information (step ST21032).

If the "x" key 21 is found pressed, it is determined whether the sub station is next to the last-time "x" sub station (step ST21034).

If the sub station is found to be next one, 16-sub-station continuous "x" detection counter in the RAM 41 is incremented by one (step ST21035).

Next, it is determined whether the 16-sub-station continuous "x" detection counter is 16 (step ST21036).

If this counter is found to be 16, then the most significant bit of the takeover status flag is set to "1" and the number of a next main station is written to the lower bits, the 16-sub-station continuous "x" detection counter is cleared to "0000" (step ST21037), upon which the procedure shifts to takeover processing 4 (step ST21039).

Thus, the main flow of the takeover processing has been described. The following describes branch flow steps.

In the above-mentioned steps, the takeover processing exits if a sub station navigation message is found not being reproduced in step ST21031 and the current-time "x" key information is found not to be "1" in step ST21032 (step ST21041).

If the sub station is found not to be the next to the last-time "x" sub station in step ST21034, the 16-sub-station continuous "x" detection counter is cleared to "0000", upon which the takeover processing exits (step ST21041).

The following describes steps in which a takeover processing is executed by a next main station if the "x" key 21 is pressed in 10 music titles among nearest 20 music titles over a plurality of sub stations, with reference to FIG. 24.

The processing is continued from takeover processing 3 (step ST21039).

First, it is determined whether the most significant bit of the music title status flag is "1" (step ST21051).

If the most significant bit of the music title status flag is found to be "1", then it is determined whether current-time "o" key information is "1" (step ST21052).

If the current-time "o" key information is found to be "1", then it is determined whether the "x" key ten seconds no-operation status flag is "8000" (step ST21053).

If the "x" key ten seconds no-operation status flag is found to be "8000", it is determined whether the current-type "x" key information is "1" (step ST21054).

If the current-time "x" key information is found to be "1", then it is determined whether the music title is the same as last-time "x" music title (step ST21055).

If the music title is found not the same as the last-time "x" music title, then the 20-music-title continuous detection counter is set to "1" (step ST21056). It should be noted that the 20-music-title continuous detection counter is a 20-step shift register formed in a ring and always stores "1" or "0" for each of the last 20 music titles, the other conditions being sequentially deleted.

Next, it is determined whether a sum of values "1" of the 20-music-title continuous detection counter is equal to 10 or more (decimal notation) (step ST21059).

If the sum is found to be 10 or more (decimal notation), the most significant bit of the takeover status flag is set to "1" and the number of the next main station is written to the lower bits (step ST21060).

Then, the takeover processing exits (step ST21061).

Thus, the main flow of the takeover processing has been described. The following describes branch flow steps.

In the above-mentioned steps, if the most significant bit of the music title status flag is not "1" in step ST21051, the current-time "x" key information is not "1" in step ST21054, and the music title for which the "x" key 21 has been pressed this time is the same as the music title number, the procedure goes to step ST21059 in which it is determined whether a sum of "1"s of the 20-music-title continuous detection counter is equal to 10 or more (decimal notation).

If the current-time "o" key information is "1" in step ST21052 and the "x" key ten seconds no-operation flag is "8000" in step ST21053, it is determined whether the music title is the same as the last-time "o" music title (step ST21057). If the music title is found to be not the same as the last-time "o" music title, the 20-music-title continuous detection counter is set to "0" (step ST21058), upon which the procedure moves to step ST21059. On the other hand, if the music title is found to be the same as the last-time "o" music title, the procedure goes to step ST21059.

Rearrangement Condition Occurrence Status Detection Processing (Step ST211, Refer to FIG. 25):

Next, it is determined whether a rearrangement condition has occurred. This detection is executed in the following steps.

Now, the rearrangement condition occurrence status detection processing starts (ST21100).

It is determined whether a change has occurred in the main station number from the last interrupt (step ST21101). This change may be detected by making a comparison between the current and last main station status flags.

If a main station number change is found, the most significant bit of the priority sequence rearrangement status flag is set to "1" and the main station number at the last interrupt is written to the lower bits, upon which this processing exits (step ST21109). It should be noted that, if a main station number change occurs, sub station priority rearrangement in the main station at the last interrupt is executed in the priority rearrangement processing (ST125).

On the other hand, if no main station number change is detected, the procedure moves to step ST21103, in which it is determined whether a sub station number has changed from the last interrupt. A sub station number change is detected by detecting the sub station status flag to make a comparison between the last time and the current time.

If a sub station number change is detected, the most significant bit of the priority rearrangement status flag is set to "1" and the sub station number at the time of the last interrupt is written to the lower bits, upon which this processing exits (step ST21109). It should be noted that if a sub station number change has occurred, music title priority rearrangement in the sub station at the time of the last interrupt is executed in the priority rearrangement processing (ST125).

On the other hand, if no sub station number change is detected, the procedure moves to step ST21105, in which it is determined whether the status is the main station status in the last interrupt and the radio status in the current interrupt.

If a status transitions is found taken place from a main station to "radio", the most significant bit of the priority rearrangement status flag is set to "1" and the transition to "radio" is written to the lower bits, upon which this processing exits (step ST21109). It should be noted that, if a transition to "radio" has taken place, main station priority rearrangement is executed in the priority rearrangement processing (step ST125).

Next, in "radio", it is determined whether a preset number change has occurred (step ST21107).

If a preset number change is found, then the most significant bit of the priority rearrangement status flag is set to "1" and the preset number at the time of the last interrupt is written to the lower bits; if no preset number change is found, nothing is written, upon which this processing exits (step ST21109).

Currently Read Address Value Read Processing (Step ST212, Not Shown):

Next, currently read address value read processing is executed.

This processing is to read the value of a currently read address value register of the data storage controller 46, the value being indicative of which status the present apparatus is in and what kind of data is transmitted from the data storage controller 46 to the audio CODEC 34.

Stop Five Minutes Sustained Status Detection Processing (Step S213, Refer to FIG. 26):

Next, it is determined whether a stop five minutes sustained status has occurred.

Now, the stop five minutes sustained status detection processing starts (step ST21300).

The play status flag in the current interrupt is read (step ST21301).

It is determined whether the most significant bit of the play status flag is "1" (binary notation) or "8000" (hexadecimal notation) (step ST21302).

If the most significant bit of the play status flag is found to be "1", then the stop count counter in the RAM 41 is cleared to "0000" (step ST21306) and the stop five minutes sustained status flag is set to "8000" (step S21308), upon which this processing exits (step ST21309).

On the other hand, if the most significant bit of the play status flag is found not to be "1", the stop count counter is incremented by one (step ST21303).

Next, it is determined if the stop count counter is equal to Nt (step ST21304). It should be noted that Nt is equivalent to five minutes, a value (decimal notation) obtained by dividing 300 seconds by an interrupt period.

If the value of the stop count counter is equal to Nt, then the stop count counter is cleared to "0000" to put the CPU 40 into the resume mode, upon which this processing exits (step ST21309). If the value of the stop count counter is not equal to Nt, then the stop five minutes sustained status flag is set to "8000" (step ST 21308), upon which this processing exits (step ST 21309).

Thus, the interrupt processing has been outlined. It should be noted that, in the above-mentioned interrupt processing steps shown, the processing is executed in a cascade manner; the sequence of this processing may be changed appropriately.

Other Embodiments

The above-mentioned embodiment is illustrative only; for example, the following embodiments are also practicable.

In the above-mentioned embodiment, a flash memory is used for the data storage unit 45. The data storage unit 45 may be either a reproduction-only data storage device or a recording/reproducing data storage device as long as it can store music content; for example, the data storage unit 45 may be implemented by any one of CD (Compact Disc), MD (Mini Disc), HDD (Hard Disc Drive), and so on.

In the audio content reproduction apparatus 10 shown in FIG. 1, the data storage unit 45, the data storage controller 46, the audio CODEC 34, the CPU 40, the OSC circuit 48, the interrupt signal generator circuit 49, the power-on reset circuit 47, the OSC circuit 48, the RAM 41, the RAM 42, the ROM 43, the digital FM tuner 39, the amplifier 35, the Bluetooth module 32, the key interface 30, and the IEEE 1394 interface 31 may be configured as a single-chip IC (Integrated Circuit) containing these functions provided by these components or as two or more ICs over which these functions are distributed.

In the above-mentioned embodiment, the keys or the key interface 30 and the main device are interconnected in a wired manner as shown in FIG. 2; however, this connection may be made in a wireless manner. In addition, the operator section having the "o" key 20, the "x" key 21, and the play/stop key 22, the reset key 23 may be configured in a standalone manner or with the headphones 36, the microphone 37, the battery 50, the power supply block 51, the "o" key 20, the "x" key 21, the play/stop key 22, and the reset key 23 in an integrated manner.

Further, a Bluetooth module (not shown) may be attached to the data storage controller 46 and another Bluetooth module (not shown) to the data storage unit 45, thereby arranging the data storage unit 45 away from other components, in a bag for example. This configuration in which the data storage unit 45 is separately arrange increases the allowable spatial range of the data storage unit 45, thereby making it practicable to increase the size of audio content to be stored in the data storage unit 45.

Also, the data storage controller 46 may also be detachable from the main device via the IEEE 1394 interface. In this case, if the point count and the priority table currently stored in the RAM 42 and the navigation messages stored in the data storage controller may be stored in the data storage unit 45, thereby allowing the other components (in the main device) of the audio content reproduction apparatus 10 to be easily changed in music content and priority settings in accordance with the preferences of two or more users sharing the audio content reproduction apparatus 10. For example, a user may send a flash memory storing the above-mentioned information to another user to inform him of the sending user's preference.

Only one of the "o" key 20 and the "x" key 21 is enough for causing status transitions, so that only one of these keys may be arranged as described below.

Figure 27:
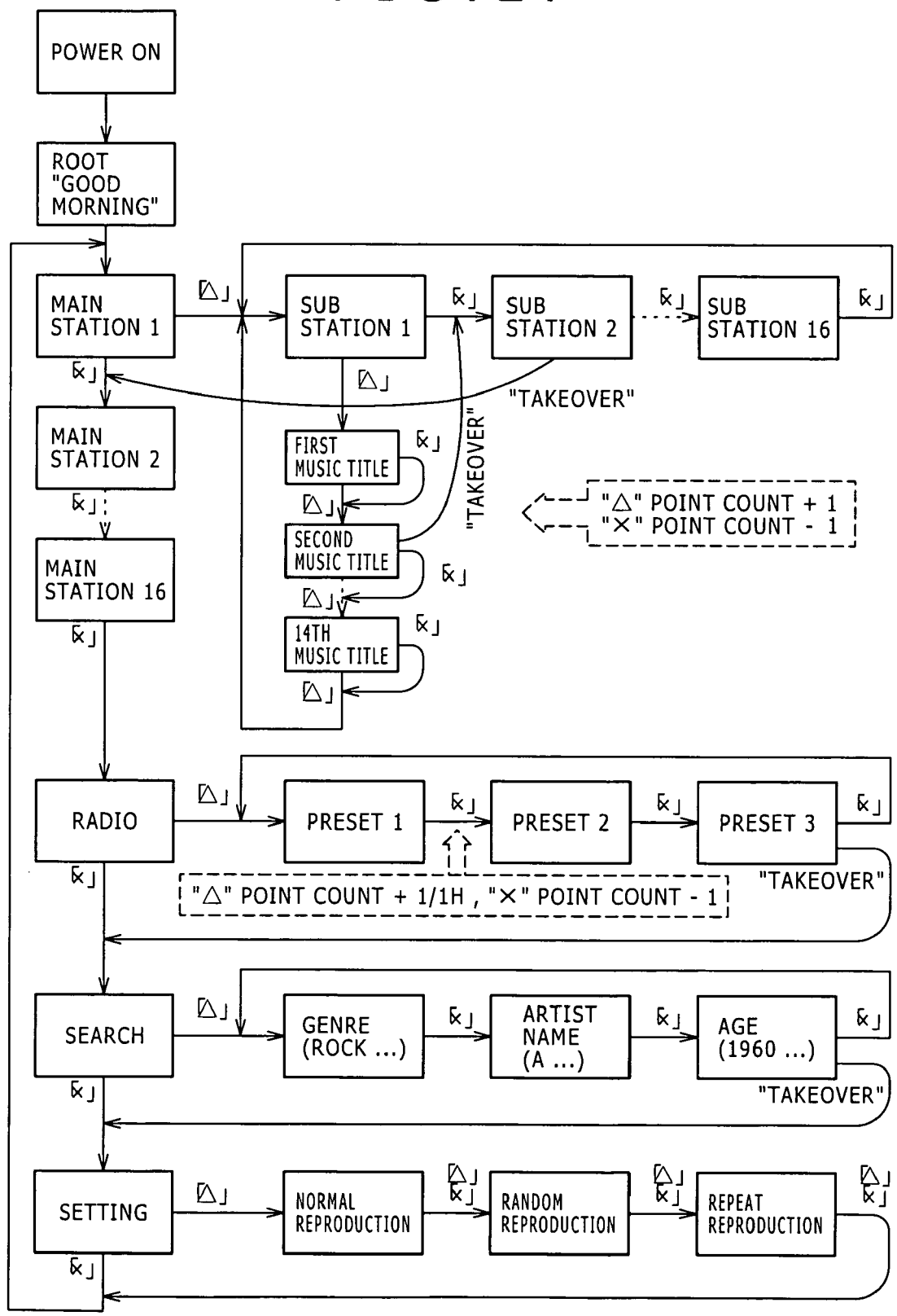
FIG. 27 is another status transition diagram of the above-mentioned audio content reproduction apparatus.

Referring to FIG. 27, there is shown a status transition that is executed if only the "x" key 21 is arranged. Because the "o" key 20 is not arranged, if the "x" key 21 is not pressed, there is no function for positively establishing this condition. Therefore, a predetermined wait time (ten seconds, for example) is provided and, if the "x" key 21 has not been pressed during the period of time, it is determined that the "x" key 21 has not been pressed. Namely, in the present embodiment, pressing of the "x" key 21 corresponds to the entry of first operation information and not pressing of the "x" key 21 for a predetermined period of time corresponds to the entry of second operation information. The point count may be incremented by one if a music title has been heard to the last. In "radio", the point count may be incremented by one every one H (hour) in listening to a same preset.

Figure 28:
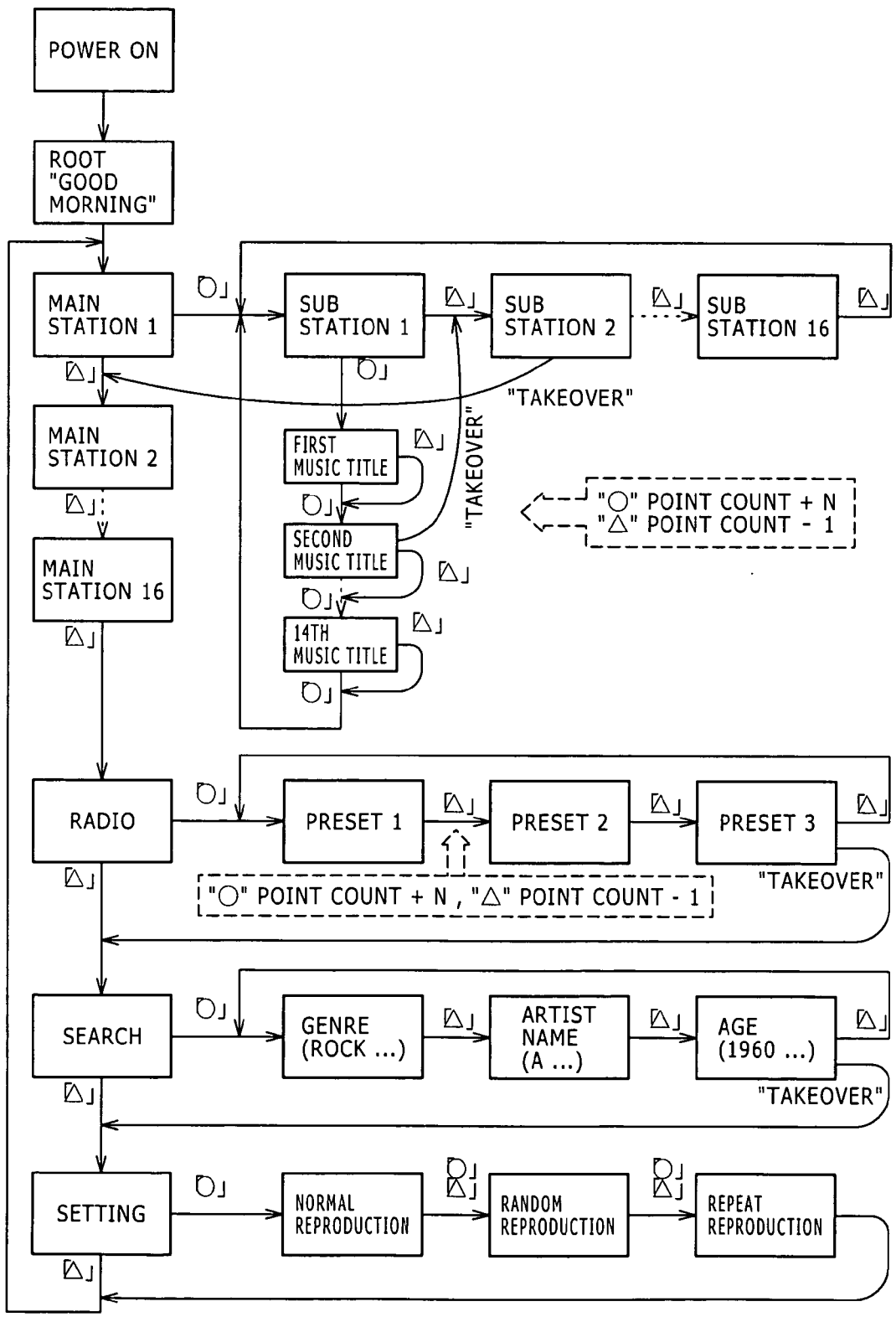
FIG. 28 is still another status transition diagram of the above-mentioned audio content reproduction apparatus.

Referring to FIG. 28, there is shown a status transition that takes place if only the "o" key 20 is arranged. Because the "x" key 21 is not arranged, if the "o" key 20 has not been pressed, there is no function for positively establishing that the "o" key 20 has not been pressed. Therefore, if the "o" key 20 has not been pressed for a predetermined period of time (ten seconds, for example), it is determined that the "o" key 20 has not been pressed. An operation associated with a status transition functions in the same manner as when the "x" key 21 has been pressed in the embodiments shown in FIGS. 3 and 27. Namely, a status transition takes place to a next status. In the present embodiment, pressing of the "o" key 20 corresponds to the entry of second operation information and not pressing of the "o" key 20 for a predetermined period of time corresponds to the entry of first operation information. On the other hand, the point count of that music title is decremented by one. The time of continuous listening of "radio" is extended by one hour every time the "o" key 20 is pressed. If continuously listening to a same preset, the count is incremented by one every hour. It should be noted that, if the "o" key 20 is not pressed, navigation message "Do you want to extend?" may be sounded.

Figure 29:
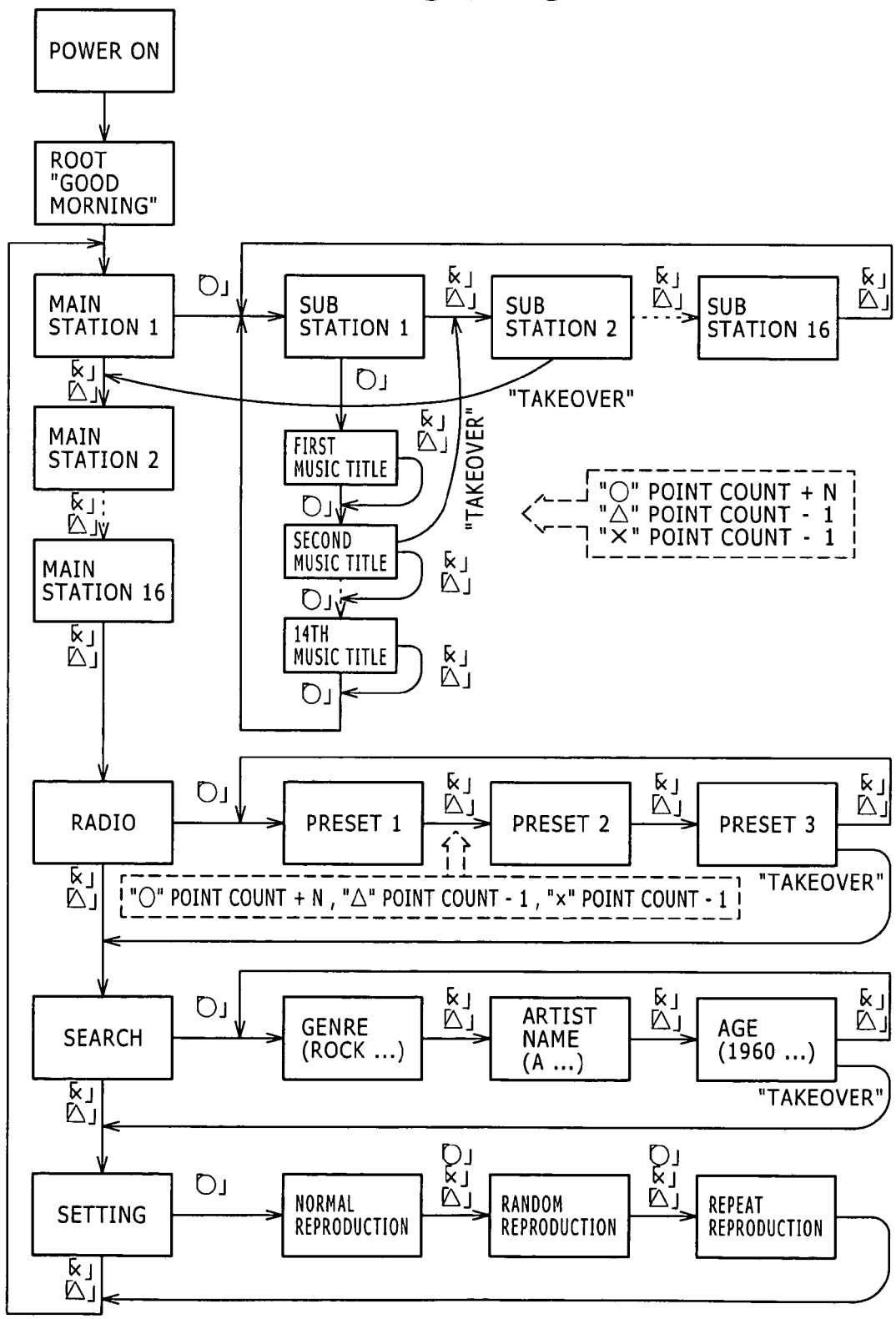
FIG. 29 is yet another status transition diagram of the above-mentioned audio content reproduction apparatus.

In an arrangement in which both the "o" key 20 and the "x" key 21 are provided, the logic in which neither the "o" key 20 nor the "x" key 21 has not been pressed is reverse to the status transition shown in FIG. 3. Namely, none of the keys has been pressed, it may be assumed that the "x" key 21 have been pressed. To be more specific, in the present embodiment, pressing of the "x" key 21 and pressing of none of the keys for a predetermined period of time correspond to the entry of first operation information and pressing of the "o" key 20 corresponds to the entry of second operation information. The status transition in this case is shown in FIG. 29. It should be noted that, in FIGS. 3 and 27 to 29, two of status transition conditions "o", "x", and "Δ" are written to indicate that, if one of the two is established, a status transition occurs.

The point count in the embodiment shown in FIG. 28 may be incremented by one every time the "o" key 20 is pressed during music title reproduction and decremented by one if the "x" key 21 is pressed or a predetermined time passes after the end of each navigation message, the status transitions taking place to the beginning of a next music title.

It is also practicable to use an audio signal picked up by the microphone 37 of the audio content reproduction apparatus 10 instead of the operation keys. In this case, the user may generate a music title, which is made reproducible, on the basis of the utterance thereof, by an audio recognition program operating on the CPU 40 or on the basis of the first feature part (or a short-cut phrase) of the uttered music title. Alternatively, the key operation may be replaced by user's short utterances "Yes" and "No" or no utterance at all. Because only two words are used for voice recognition in this case, a simple computer program having a small number of steps allows voice recognition and the operation of the audio content reproduction apparatus 10 based thereon.

The hierarchical classification of main station and sub station may be of any form as long as a group of pieces of content belonging to a layer have a same individuality. For example, any classification made be made by artist name, album name, composer name, ranking, and so on, or by introductory English conversation, middle-level English conversion, game-of-Go course, and so on.

Not only "bridges" of all music title belonging to each sub station are collected, but also only "bridge" of one music title (a typical title) representing a particular sub station may be registered. Namely, in this case, in each sub station, only the bridge of a music title representing that sub station is sounded. The reproduction of the bridge of only the representative music title allows the user to easily understand the characteristics of that sub station. Namely, this configuration allows the user to instantly judge whether to remain in that sub station.

"Bridge" may be provided after each navigation message of a main station. In this case, the bridge of only a music title (a typical title) representing a particular main station may be also registered. In this case, the user can listen to the bridge part of that typical music title to instantly judge whether to remain in that main station.

Further, with both the "o" key 20 and the "x" key 21 provided, the "o" key 20 alone or "x" key 21 alone may be made valid by setting the "setting" status, thereby, if the key other than the valid key is operated, allowing the selection of the operation of the audio content reproduction apparatus 10 without considering that operation. Alternatively, if none of the keys has been operated a predetermined period of time (ten seconds for example) after a navigation message, the user may select the setting in which the pressing of the "o" key 20 is recognized or pressing of the "x" key 21 is recognized.

In addition, in "setting", a sequence of sub station, main station, and preset may be given in the ascending order of point counts, thereby raising the priority of those music titles which have been heard less frequently.

Besides, in "setting", a sequence of sub station, main station, and preset is not limited to that shown above; for example, a jump may be made to the sub station, main station, and preset that are the opposite in nature to those having predetermined priorities. Then, the user is prompted to make a decision whether to remain in these opposite sub station, main station, and preset. If the user wants to remain, these opposite sub station, main station, and preset are selected. Otherwise, the status transition takes place to the sub station, main station, and preset having the predetermined priorities.

To be more specific, if the reproduction of all sub stations is rejected by the "x" key 21 and, if the "x" key 21 is pressed in 10 music titles among nearest 20 music titles, then "takeover" occurs. If such "takeover" occurs, a jump is once made to a main station (for example, the main station of classical music) that is opposite in trend to the main station (for example, the main station of rock). Then, the user is prompted to make a decision whether to remain in the rock main station. If the user wants to remain there, the rock main station is selected. Otherwise, the status may be shifted to the main station having a predetermined priority. In order to implement this configuration, the main stations opposite to the main stations having predetermined priorities are registered in the RAM 42 in the form of a table in advance. Status transitions are made by referencing this table. Thus, jumping to the stations opposite in trend allows the user to quickly reach a desired station.

Further, in "setting", a rule for point count addition and subtraction may be selected from among several rules. For example, if the "o" key 20 is pressed more often than a certain value in a comparatively short time, a large number of points may be given, thereby inputting the user preference into the audio content reproduction apparatus 10 more impressively.

The above-mentioned audio content reproduction apparatus according to an embodiment of the present invention may be operated by the user only by giving a command which of the two statuses to select by operating or not operating an operation key or by an audio section.

Consequently, as compared with related-art audio content reproduction apparatuses, the audio content reproduction apparatus practiced one embodiment of the invention has the following advantages.

Unlike related-art audio content reproduction apparatuses, the audio content reproduction apparatus according to an embodiment of the present invention need not have a display device for prompting the user to select an operation from some options, a comparatively expensive LCD, for example. This novel configuration significantly reduce the cost of the audio content reproduction apparatus.

Further, the novel configuration allows the user to operate the audio content reproduction apparatus without looking at the display device thereof, thereby making it practicable not only for the user to operate the apparatus while walking for example but also for visually handicapped users to operate the apparatus without much inconvenience.

Still further, as compared with related-art audio content reproduction apparatuses, the audio content reproduction apparatus according to an embodiment of the present invention may be operated with significantly less number of operator key operations (or significantly less number of words to be uttered for operation), thereby allowing the user and, even children, to easily get familiar with the operation of the apparatus. Further, since the number of operation keys is small, operation of the audio content reproduction apparatus in a crowded electric train or in the crowed may be easily executed.

Yet further, since content in the audio content reproduction apparatus according to an embodiment of the present invention is classified in a hierarchical structure in which desired music titles are reached, the user is able to easily and quickly reach desired music titles. In addition, on each of the layers in this structure, a navigation message characteristic to each layer is sounded in a disc jockey manner for example, thereby saving the user from feeling a waste time until a desired music title is reached. Especially, this navigation message is preceded by the bridge of a desired music title, the user is able to know whether the music title to be reproduced is of user preference.

Besides, the audio content reproduction apparatus according to an embodiment of the present invention is capable of incrementing and decrementing point counts from time to time to learn user preference, thereby growing into an audio content reproduction apparatus of user preference. As a result of the learning of user preference, the apparatus is capable of reproducing music titles of user preference with comparatively small number of operations. Especially, if music titles of no user preference are continuously reproduced, a takeover operation is executed for the audio content reproduction apparatus to recommend music titles of user preference, thereby making this apparatus user-friendly seldom seen before.

In addition, the audio content reproduction apparatus according to an embodiment of the present invention is capable of changing the types of music title selection and navigation messages in accordance with time zones, thereby making this apparatus fun to operate. Especially, since audio navigation messages always advise the user for operations to be made, this apparatus operates with less soundlessly in term of user operation, thereby enhancing user friendliness.

The audio content reproduction apparatus according to an embodiment of the present invention has a content accumulation section for accumulating content related with additional information including attribute information about content that is grouped by the attribute information, a content reproduction section for reproducing the accumulated content, an operator input block for the user to enter operation information, and a controller for controlling the content accumulation section and the content reproduction section in accordance with the operation information. This controller reproduces group identification information for identifying the attribute of each content group accumulated in the accumulation section and, when the group identification information is being reproduced, reproduces, upon entering of first operation information, group identification information for identifying a group different from that to be identified by the group identification information being reproduced.

For example, the content to be handled by the audio content reproduction apparatus according to an embodiment of the present invention is not limited to music content shown in the above-described embodiments; the content may also be video content, for example. The content accumulation section is not limited to the semiconductor memory (or the flush memory) and the rotary recording media (CD, HDD, and MD); for example, a tape streamer and a hologram memory may also be used. The content reproduction section is not limited to the audio CODEC and the headphone; for example, a video CODEC and a video display may also be used. The operator input block is not limited to one through which operation information is entered by means of keys and voice commands as described in the above-mentioned embodiments; for example, the operator input block may also be configured by a sensor attached on the operator body for detecting operator's muscle movement, a detected signal being supplied to the audio content reproduction apparatus according to an embodiment of the present invention. The controller is not limited to the above-mentioned configuration mainly based on a CPU and software; for example, the controller may also be configured by hardware.

While preferred embodiments of the present invention have been described using specific terms, such description is for illustrative purpose only, and it is to be understood that changes and variations may be made without departing from the spirit or scope of the following claims.

What is claimed is:

1. A content player, comprising:
   a memory device storing content grouped at least in a first group and in a second group;
   an audio reproduction section configured to reproduce the content, a first group identifier of the first group, and a second group identifier of the second group;
   an operation input section configured to receive at least one of a first operation and a different second operation from a user; and
   a hardware controller configured to direct the audio reproduction section to audibly reproduce:
      the first group identifier;
      the second group identifier if the first operation is received from the user while audibly reproducing the first group identifier;
      first content data if the second operation is entered while reproducing the first group identifier; and
      second content data, different from the first content data, if the first operation is entered while reproducing the first content data, irrespective of whether or not the second operation is entered.

2. The content player of claim 1, wherein the controller directs the reproduction section to reproduce the second group identifier upon detecting that a number of instances that the first operation was received while reproducing the first and second content data is more than a threshold.

3. The content player of claim 1, wherein the controller calculates a first point count for the first content data according to a number of times the first operation and the second operation are received while reproducing the first content data.

4. The content player of claim 3, wherein the controller calculates a second point count for the second content data according to a number of times the first operation and the second operation are received while reproducing the second content data.

5. The content player of claim 3, wherein the controller sets the first content data before the second content data in a sequence of reproduction if the first point count is higher than the second point count, and sets the second content data before the first content data in the sequence of reproduction if the second point count is higher than the first point count.

6. The content player of claim 1, wherein the first group identifier is based on attribute data of the first content data, and wherein the first content data is grouped into the first group according to the first attribute data.

7. The content player of claim 1, wherein:
   the first content data and second content data comprise songs, each of the songs comprising a feature portion;
   the feature portions are recognizable portions of the songs; and
   the first group identifier comprises the feature portion of at least one of the songs.

8. The content player of claim 1, wherein:
   the first group identifier comprises a feature portion of the first content data;
   the controller directs the reproduction section to reproduce the feature portion; and
   the controller directs the reproduction section to fade-out the feature portion, and to fade-in the first content data if the second operation is received while reproducing the feature portion.

9. The content player of claim 1, wherein:
   the first group is a sub-group of a first main group, and the second group is a sub-group of a second main group;
   the controller directs the reproduction section to reproduce a first main group identifier; and
   the controller directs the reproduction section to reproduce a second main group identifier if the first operation is received while reproducing the first main group identifier.

10. The content player of claim 9, wherein the controller directs the reproduction section to reproduce the first group identifier if the second operation is received while reproducing the first main group identifier.

11. The content player of claim 9, wherein the controller directs the reproduction section to reproduce the second main group identifier upon detecting that a number of instances that the first operation was received while reproducing data within the first main group is greater than a threshold.

12. A method for playing content, the method comprising:
   storing content in a memory device grouped at least in a first group and in a second group;
   audibly reproducing a first group identifier of the first group;

receiving at least one of a first operation and a different second operation from a user;

audibly reproducing a second group identifier of the second group if the first operation is received from the user while audibly reproducing the first group identifier;

audibly reproducing first content data if the second operation is entered while reproducing the first group identifier; and audibly reproducing second content data, different from the first content data, if the first operation is entered while reproducing the first content data, irrespective of whether or not the second operation is entered.

13. The method of claim 12, further comprising:

calculating a first point count for the first content data according to a number of times the first operation and the second operation are received while reproducing the first content data;

calculating a second point count for the second content data according to a number of times the first operation and the second operation are received while reproducing the second content data;

setting the first content data before the second content data in a sequence of reproduction if the first point count is higher than the second point count; and setting the second content data before the first content data in the sequence of reproduction if the second point count is higher than the first point count.

14. The method of claim 12, further comprising:

reproducing the second group identifier upon detecting that a number of instances that the first operation was received while reproducing the first and second content data is more than a threshold.

15. The method of claim 12, wherein:

the first and second content data comprise songs, each of the songs comprising a feature portion;

the feature portions are recognizable portions of the songs; and the first group identifier comprises the feature portion of at least one of the songs.

16. The method of claim 12, wherein the first group identifier comprises a feature portion of the first content data, the method further comprising:

reproducing the feature portion; and fading-out the feature portion and fading-in the first content data, if the second operation is received while reproducing the feature portion.

17. A computer-readable medium comprising program instructions which, when executed by a processor, cause the processor to perform a method, the method comprising:

storing content grouped in at least a first group and in a second group;

audibly reproducing a first group identifier of the first group;

receiving operation information from a user, the operation information comprising at least one of a first operation and a different second operation;

audibly reproducing a second group identifier of the second group if the first operation is received from the user while audibly reproducing the first group identifier;

audibly reproducing the first content data if the second operation is entered while audibly reproducing the first group identifier; and audibly reproducing the second content data if the first operation is entered while audibly reproducing the first content data, irrespective of whether or not the second operation is entered.

* * * * *